(12) United States Patent  
Yoshida et al.

(10) Patent No.: US 8,913,295 B2  
(45) Date of Patent: Dec. 16, 2014

(54) PRINTING CONTROL DEVICE AND IMAGE FORMATION SYSTEM

(71) Applicants: Makoto Yoshida, Kanagawa (JP); Hiroaki Suzuki, Chiba (JP)

(72) Inventors: Makoto Yoshida, Kanagawa (JP); Hiroaki Suzuki, Chiba (JP)

(73) Assignee: Ricoh Company, Limited, Tokyo (JP)

( * ) Notice: Subject to any disclaimer, the term of this patent is extended or adjusted under 35 U.S.C. 154(b) by 45 days.

(21) Appl. No.: 13/859,883

(22) Filed: Apr. 10, 2013

(65) Prior Publication Data

US 2013/0265608 A1    Oct. 10, 2013

(30) Foreign Application Priority Data

Apr. 10, 2012 (JP) ................................. 2012-089626

(51) Int. Cl.
| | |
|---|---|
| G06K 15/02 | (2006.01) |
| G06F 3/12 | (2006.01) |
| H04N 1/405 | (2006.01) |
| B41J 29/393 | (2006.01) |
| H04N 1/60 | (2006.01) |

(52) U.S. Cl.  
CPC ........... G06K 15/1878 (2013.01); B41J 29/393 (2013.01); H04N 1/6033 (2013.01)  
USPC ........................... 358/2.1; 358/1.15; 358/3.06

(58) Field of Classification Search  
USPC ........ 358/1.9, 3.06, 2.1, 1.15; 399/67, 81, 82, 399/341  
See application file for complete search history.

(56) References Cited

U.S. PATENT DOCUMENTS

| | | | |
|---|---|---|---|
| 2012/0050801 A1* | 3/2012 | Itami ............................ | 358/1.15 |
| 2012/0062956 A1 | 3/2012 | Kitagawa et al. | |
| 2012/0063802 A1 | 3/2012 | Suzuki et al. | |

FOREIGN PATENT DOCUMENTS

JP        2010-102239        5/2010

* cited by examiner

*Primary Examiner* — Charlotte M Baker  
(74) *Attorney, Agent, or Firm* — Oblon, Spivak, McClelland, Maier & Neustadt, L.L.P.

(57) ABSTRACT

In the present invention, a printing control device comprises: a generation unit that generates a clear toner plane data based on a type of a surface effect which is applied to a recording medium and gloss control plane data for specifying an area in the recording medium to which the surface effect is applied; a first gradation correction unit that performs first gradation correction that varies per combination of a color of colored plane data and the surface effect, with respect to each of a plurality of items of colored plane data that configures the colored plane data; and an output unit that outputs the image data generated based on the clear toner plane data generated by the generation unit and the colored plane data to which the first gradation correction is applied.

9 Claims, 31 Drawing Sheets

COLORED PLANE IMAGE DATA

| GLOSS CONTROL NAME | SOLID GLOSS | DEVIATION |
|---|---|---|
| MIRROR GLOSS (PG) | Gs≥80 | ΔGs≤10 |
| SOLID GLOSS (G) | Gs=Gs (SOLID GLOSS) | ΔGs≤10 |
| HALFTONE MATTE (M) | Gs=Gs (1C30% HALFTONE) | ΔGs≤10 |
| MATTE (PM) | Gs≤10 | ΔGs≤10 |

GLOSS CONTROL PLANE IMAGE DATA

▨ : PG DESIGNATED AREA (DENSITY VALUE 98%)

▨ : G DESIGNATED AREA (DENSITY VALUE 90%)

▤ : M DESIGNATED AREA (DENSITY VALUE 16%)

CLEAR PLANE IMAGE DATA

| TYPE OF SURFACE EFFECT DESIGNATED BY USER | DENSITY VALUE (%) OF GLOSS CONTROL PLANE |
|---|---|
| PG | 98% |
| G | 90% |
| M | 16% |
| PM | 6% |

| DRAWING OBJECT | COORDINATE | DENSITY VALUE |
|---|---|---|
| A, B, C (QUADRILATERAL) | (x1,y1)-(x2,y2) | 98% |
| | (x3,y3)-(x4,y4) | 90% |
| ... | ... | ... |

FIG.15

| DENSITY (%) | DENSITY REPRESENTATIVE VALUE | NUMERICAL VALUE RANGE | | EFFECT | GLOSSER ON/OFF (ON/OFF INFORMATION) | CLEAR TONER PLANE 1 (PRINTER) | CLEAR TONER PLANE 2 (LOW TEMPERATURE FIXING UNIT) |
|---|---|---|---|---|---|---|---|
| 98% | 250 | 248 | 255 | MIRROR GLOSS TYPE A | ON | INVERSE MASK A | NO DATA |
| 96% | 245 | 243 | 247 | MIRROR GLOSS TYPE B | ON | INVERSE MASK B | NO DATA |
| 94% | 240 | 238 | 242 | MIRROR GLOSS TYPE C | ON | INVERSE MASK C | NO DATA |
| 92% | 235 | 233 | 237 | RESERVED | | | |
| 90% | 230 | 228 | 232 | SOLID GLOSS TYPE 1 | OFF | INVERSE MASK 1 | NO DATA |
| 88% | 224 | 222 | 227 | SOLID GLOSS TYPE 2 | OFF | INVERSE MASK 2 | NO DATA |
| 86% | 219 | 217 | 221 | SOLID GLOSS TYPE 3 | OFF | INVERSE MASK 3 | NO DATA |
| 84% | 214 | 212 | 216 | SOLID GLOSS TYPE 4 | OFF | INVERSE MASK 4 | NO DATA |
| 82% | 209 | 207 | 211 | RESERVED | | | |
| 46% | 117 | 115 | 119 | RESERVED | | | |
| 44% | 112 | 110 | 114 | WATERMARK 3 (XXX) | OFF | NO DATA | TILE CHARACTER STRING 3 |
| 42% | 107 | 105 | 109 | WATERMARK 2 (COPY PROHIBITED) | | NO DATA | TILE CHARACTER STRING 2 |
| 40% | 102 | 100 | 104 | WATERMARK 1 (SAMPLE) | | NO DATA | TILE CHARACTER STRING 1 |
| 38% | 97 | 95 | 99 | RESERVED | | | |
| 36% | 92 | 90 | 94 | RESERVED | | | |
| 34% | 87 | 85 | 89 | WOVEN PATTERN 3 (XXX) | | NO DATA | TILE WOVEN PATTERN 3 |
| 32% | 82 | 80 | 84 | WOVEN PATTERN 2 (GRID) | | NO DATA | TILE WOVEN PATTERN 2 |
| 30% | 76 | 74 | 79 | WOVEN PATTERN 1 (WAVE) | | NO DATA | TILE WOVEN PATTERN 1 |
| 28% | 71 | 69 | 73 | RESERVED | | | |
| 26% | 66 | 64 | 68 | RESERVED | | | |
| 24% | 61 | 59 | 63 | TACTILE SENSATION PATTERN TYPE 3 (ROUGH) | | NO DATA | TILE HALFTONE PATTERN 3 |
| 22% | 56 | 54 | 58 | TACTILE SENSATION PATTERN TYPE 2 (MIDDLE) | | NO DATA | TILE HALFTONE PATTERN 2 |
| 20% | 51 | 49 | 53 | TACTILE SENSATION PATTERN TYPE 1 (FINE) | | NO DATA | TILE HALFTONE PATTERN 1 |
| 18% | 46 | 44 | 48 | RESERVED | | | |
| 16% | 41 | 39 | 43 | HALFTONE MATTE TYPE 4 | OFF | HALFTONE 4 | NO DATA |
| 14% | 36 | 34 | 38 | HALFTONE MATTE TYPE 3 | OFF | HALFTONE 3 | NO DATA |
| 12% | 31 | 29 | 33 | HALFTONE MATTE TYPE 2 | OFF | HALFTONE 2 | NO DATA |
| 10% | 25 | 23 | 28 | HALFTONE MATTE TYPE 1 | OFF | HALFTONE 1 | NO DATA |
| 8% | 20 | 18 | 22 | RESERVED | | | |
| 6% | 15 | 13 | 17 | MATTE TYPE C | ON&OFF | NO DATA | SOLID |
| 4% | 10 | 8 | 12 | MATTE TYPE B | ON&OFF | NO DATA | SOLID |
| 2% | 5 | 1 | 7 | MATTE TYPE A | ON&OFF | NO DATA | SOLID |
| 0% | 0 | 0 | 0 | NONE | OFF | NO DATA | NO DATA |

PRINTING CONTROL DEVICE AND IMAGE FORMATION SYSTEM

CROSS-REFERENCE TO RELATED APPLICATIONS

The present application claims priority to and incorporates by reference the entire contents of Japanese Patent Application No. 2012-089626 filed in Japan on Apr. 10, 2012.

BACKGROUND OF THE INVENTION

1. Field of the Invention

The present invention relates to a printing control device, and an image formation system.

2. Description of the Related Art

Conventionally, a technique is known which forms on a recording medium a patch image which shows an image used for calibration and changes (corrects) image formation conditions based on characteristics of this patch image. For example, Japanese Patent Application Laid-open No. 2010-102239 discloses a technique of detecting a gloss level of a patch image (gradation image) of transparent toner formed on a recording medium, and creating a gamma curve (gamma correction table) used for gamma correction, using the detected gloss level of the patch image.

Meanwhile, a toner image formed by transparent toner is fixed on a recording medium such as a transfer sheet on which an image is formed by CMYK toners. Although a visual effect or a tactile effect (referred to as a "surface effect") is realized on the surface of the recording medium as a result, the technique disclosed in Japanese Patent Application Laid-open No. 2010-102239 does not take into account at all a surface effect used in combination of colored plane data when gradation correction (gamma correction) of image data (colored plane data) of each color of CMYK is performed. Therefore, the technique disclosed in Japanese Patent Application Laid-open No. 2010-102239 has difficulty in realizing adequate color representation matching a combination with a surface effect.

SUMMARY OF THE INVENTION

In light of the above, there is needed to provide a printing control device, and an image formation system which can realize adequate color representation matching a combination with a surface effect.

It is an aim of the present invention to at least partially solve the problems in the conventional technology.

According to the present invention, there is provided: a printing control device that generates image data which comprises colored plane data for adhering colored toner and clear toner plane data for adhering colorless clear toner, the printing control device comprising: a generation unit configured to generate the clear toner plane data based on a type of a surface effect that is applied to a recording medium and gloss control plane data for specifying an area in the recording medium to which the surface effect is applied; a first gradation correction unit configured to perform first gradation correction that varies per combination of a color of the colored plane data and the surface effect, with respect to each of a plurality of items of colored plane data that configures the colored plane data; and an output unit configured to output the image data generated based on the clear toner plane data generated by the generation unit and the colored plane data to which the first gradation correction is applied.

The invention also provides an image formation system comprising: a printing control device configured to generate image data that comprises colored plane data for adhering colored toner and clear toner plane data for adhering colorless clear toner; and a printing device configured to perform printing based on the image data.

In the above-mentioned image formation system, the printing control device comprises: a generation unit configured to generate the clear toner plane data based on a type of a surface effect which is applied to a recording medium and gloss control plane data for specifying an area in the recording medium to which the surface effect is applied; a first gradation correction unit configured to perform first gradation correction that varies per combination of a color of the colored plane data and the surface effect, with respect to each of a plurality of items of colored plane data that configures the colored plane data; and an output unit configured to output the image data generated based on the clear toner plane data generated by the generation unit and the colored plane data to which the first gradation correction is applied.

The invention also provides an image formation system comprising: a printing device configured to perform printing based on image data that comprises colored plane data for adhering colored toner and clear toner plane data for adhering colorless clear toner; a printing control device configured to control the printing device; and a server device configured to be connected with the printing control device through a network.

In the above-mentioned image formation system, the printing control device comprising: a generation unit configured to generate the clear toner plane data based on a type of a surface effect that is applied to a recording medium and gloss control plane data for specifying an area in the recording medium to which the surface effect is applied; a first gradation correction unit configured to perform first gradation correction that varies per combination of a color of the colored plane data and the surface effect, with respect to each of a plurality of items of colored plane data that configures the colored plane data; and an output unit configured to output the image data generated based on the clear toner plane data generated by the generation unit and the colored plane data to which the first gradation correction is applied.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 15 is a view illustrating a data configuration of a surface effect selection table;

DETAILED DESCRIPTION OF THE PREFERRED EMBODIMENTS

Figure 1:
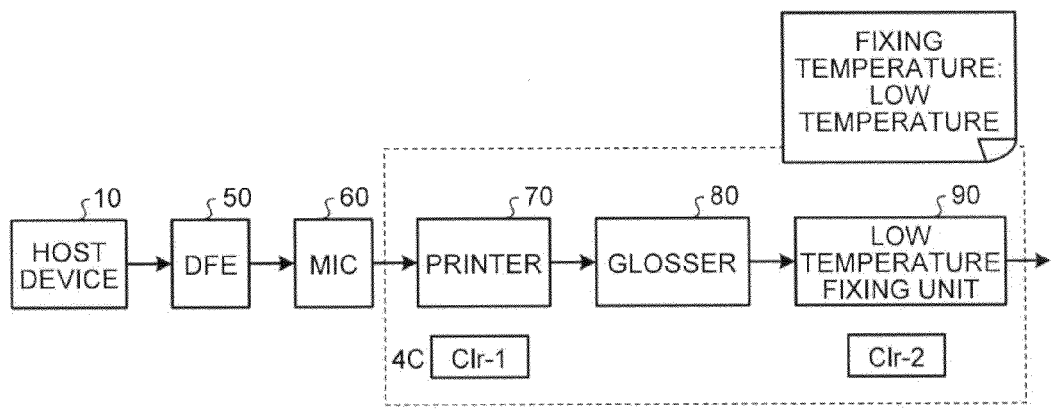
FIG. 1 is a view illustrating a configuration of an image formation system according to a first embodiment.

Embodiments of a printing control device, an image formation system and a computer-readable recording medium including a program will be described in detail below with reference to the accompanying drawings.

First Embodiment

First, a configuration of an image formation system according to the present embodiment will be described using FIG. 1. In the present embodiment, the image formation system employs a configuration in which a printer control device (DFE: Digital Front End) 50 (referred to as a "DFE 50" below), an interface controller (MIC: Mechanism I/F Controller) 60 (referred to as a "MIC 60" below), a printer 70, and a glosser 80 and a low temperature fixing unit 90 as post-processors are connected. The DFE 50 communicates with the printer 70 through the MIC 60, and controls formation of an image in the printer 70. Further, a host device 10 such as a PC (Personal Computer) is connected to the DFE 50, and the DFE 50 receives image data from the host device 10, generates image data which allows the printer 70 to form a toner image matching each toner of CMYK and clear toner using the image data, and transmits the image data to the printer 70 through the MIC 60. On the printer 70, at least CMYK toners and clear toner are mounted, and an image forming unit which has a photosensitive element, a charger, a developing unit and a photosensitive element cleaner, an exposing unit and a fixing unit of each toner are mounted.

The clear toner is transparent (colorless) toner which does not include a color material. In addition, transparent (colorless) means that, for example, transmittance is 70% or more.

The printer 70 emits an optical beam from the exposing unit according to image data transmitted from the DFE 50 through the MIC 60, forms on the photosensitive element a toner image matching each toner, transfers the toner image to a transfer sheet as a recording medium and fixes the toner image thereon by way of heating and pressing at a temperature (normal temperature) in a predetermined range using the fixing unit. By this means, an image is formed on the transfer sheet. A configuration of this printer 70 is known, and therefore will not be described in detail.

The glosser 80 is controlled to power on or off according to on/off information designated by the DFE 50, presses the image formed on the transfer sheet by the printer 70, at a high temperature and a high pressure when powered on, then cools the transfer sheet and peels from a main body the transfer sheet on which the image is formed. A total amount of adhered toner of each pixel to which a predetermined amount of toner is adhered in an entire image formed on the transfer sheet is uniformly compressed. The low temperature fixing unit 90 has an image forming unit which includes a photosensitive element, a charger, a developing unit and a photosensitive cleaner for clear toner, an exposing unit and a fixing unit which fixes the clear toner mounted thereon, and receives an input of clear toner plane image data generated by the DFE 50 to use the low temperature fixing unit 90. The low temperature fixing unit 90 forms a toner image of clear toner using the image data when the DFE 50 generates the clear toner plane image data (clear toner plane data) used by the low temperature fixing unit 90, superimposes the toner image on the transfer sheet pressed by the glosser 80, and fixes the toner image on the transfer image by way of heating at a temperature or pressing at a pressure lower than usual using the fixing unit.

Hereinafter, image data (document data) inputted from the host device 10 will be described. The host device 10 transmits to the DFE 50 image data generated by a pre-installed image processing application (for example, a data processing unit 120, a plane data generation unit 122 and a print data generation unit 123 described below). This image processing application can handle spot color plane image data for image data obtained by defining a value of density (referred to as a "density value") of each color of each colored plane such as RGB planes or CMYK planes per pixel. The spot color plane is image data for adhering special toner or ink such as white, gold or silver in addition to basic colors such as CMYK and RGB, and is data for a printer on which these special toners and inks are mounted. The spot color plane is in some cases obtained by adding R to basic colors of CMYK or adding Y to basic colors of RGB to improve color reproducibility. Generally, clear toner is handled as one of spot colors.

In the present embodiment, the clear toner of this spot color is used to produce a surface effect which is a visual or tactile effect to apply to a transfer sheet, and form a transparent image such as a watermark or a texture other than the surface effect on a transfer sheet.

Hence, for the inputted image data, the image processing application of the host device 10 generates gloss control plane image data and/or clear plane image data according to a user's designation as spot color plane image data in addition to colored plane image data.

Figure 2:
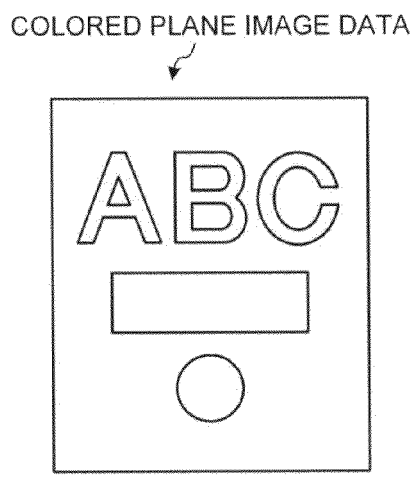
FIG. 2 is a view illustrating an example of colored plane image data.

Meanwhile, the colored plane image data is image data of defined density value of a color such as RGB or CMYK per pixel. With this colored plane image data, one pixel is represented by eight bits by user's designation of a color. FIG. 2 is an explanatory view illustrating an example of colored plane image data. In FIG. 2, density values associated with colors designated by the user using the image processing application are assigned per drawing object such as "A", "B" and "C".

Further, gloss control plane image data is image data which specifies an area to which a surface effect is applied and a type of the surface effect to perform control of adhered clear toner matching the surface effect which is a visual or tactile effect to be applied to a transfer sheet.

This gloss control plane is represented by an eight bit density value in a range of "0" to "255" per pixel similar to colored planes such as RGB or CMYK, and this density value is associated with a type of a surface effect (the density value may be represented by 16 bits or 32 bits or 0 to 100%). Further, an identical value is set to a range to which an identical surface effect needs to be applied irrespectively of a density of clear toner which actually adheres, so that it is possible to easily specify an area from image data where necessary without data which indicates an area. That is, the gloss control plane represents the type of a surface effect and an area to which a surface effect is applied (data which represents an area may be separately assigned). In this example, a density value of a gloss control plane can be regarded as a gloss control value for specifying a type of a surface effect which is a visual or tactile effect to be assigned to a recording medium and an area in a recording medium to which the surface effect is applied.

Meanwhile, the host device 10 sets the type of the surface effect to a drawing object designed by a user using the image processing application as a density value as a gloss control value per drawing object, and generates vector graphic gloss control plane image data (gloss control plane data).

Each pixel which forms this gloss control plane image data corresponds to a pixel of color plane image data. In addition, a density value represented by each pixel in each image data is a pixel value. Further, color plane image data and a gloss control plane are configured in page units.

Figures 3, 4:
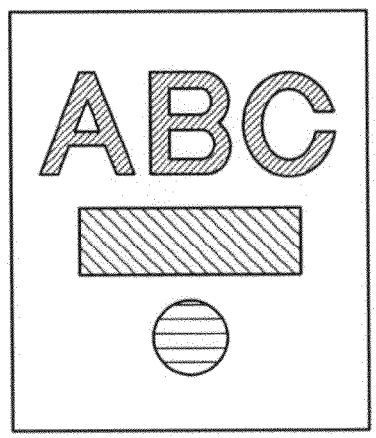
FIG. 3 is a view illustrating types of surface effects related to whether or not there is gloss.
FIG. 4 is a view illustrating an image of gloss control plane image data.

Types of surface effects roughly include whether or not there is gloss, surface protection, a watermark with information embedded and a texture. As illustrated in FIG. 3, the surface effect related to whether or not there is gloss roughly includes four types, and includes mirror gloss (PG: Premium Gloss), solid gloss (G: Gloss), halftone matte (M: Matt) and matte (PM: Premium Matt) in order of higher degrees of gloss (gloss levels). Hereinafter, mirror gloss, solid gloss, halftone matte and matte will also be referred to as "PG", "G", "M" and "PM", respectively.

Mirror gloss and solid gloss provide higher degrees to apply gloss and, by contrast with this, halftone matte and matte suppress gloss and, more particularly, matte realizes a lower gloss level than a gloss level of a normal transfer sheet. In FIG. 3, a gloss level Gs of mirror gloss is 80 or more, solid gloss has a solid gloss level of a primary color or a secondary color, halftone matte has a primary color and a gloss level of halftone 30%, and matte has a gloss level equal to or less than 10. Further, a deviation of the gloss level represents ΔGs, and is 10 or less. As to each type of such a surface effect, a higher density value is associated with a surface effect which provides a higher degree of gloss, and a low density value is associated with a surface effect which suppresses gloss. Intermediate density values are associated with surface effects such as a watermark and a texture. The watermark is, for example, a letter and a woven pattern. The texture represents a letter or a pattern, and can provide a visual effect and, in addition, a tactile effect. For example, a pattern of stained glass can be realized by clear toner. Surface protection is substituted with mirror gloss or solid gloss. In addition, to which area of an image represented by processing target image data a surface effect is applied or which type of a surface is applied to this area is designated by the user using the image processing application. The host device 10 which executes the image processing application generates gloss control plane image data by setting a density value associated with a type of the surface effect designated by the user to a drawing object which forms the area designated by the user. A correspondence between a density value and a type of a surface effect will be described below.

FIG. 4 is an explanatory view illustrating an example of gloss control plane image data. With an example of the gloss control plane in FIG. 4, the user applies a surface effect "PG (mirror gloss)" to a drawing object "ABC", applies a surface effect "G (solid gloss)" to a drawing object "(an oblong figure)" and applies a surface effect "M (halftone matte)" to a drawing object "(a circular figure)". In addition, a density value set to each surface effect is a density value set in association with a type of a surface effect in a density value selection value (see FIG. 9) described below.

Figure 5:
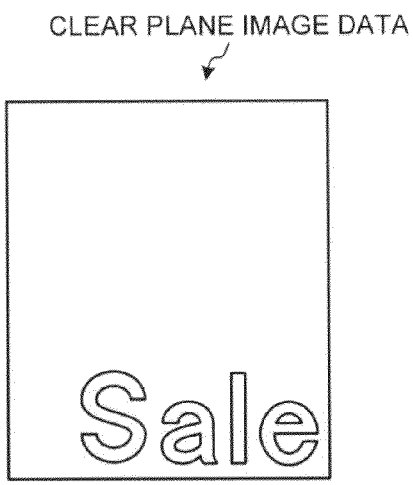
FIG. 5 is a view illustrating an example of clear plane image data.

Clear plane image data is image data obtained by specifying a transparent image such as a watermark or a texture other than the surface effect. FIG. 5 is an explanatory view illustrating an example of clear plane image data. In an example in FIG. 5, the user designates a watermark "Sale".

Thus, gloss control plane and clear plane image data which are spot color plane image data are generated in a plane other than colored plane image data by the image processing application of the host device 10. Further, although a PDF (Portable Document Format) format is used for each image data format of the colored plane image data, the gloss control plane image data and the clear plane image data, each plane image data of PDF is integrated to generate document data. In addition, a data format of each plane image data is not limited to PDF, and can adopt an arbitrary format.

Figure 6:
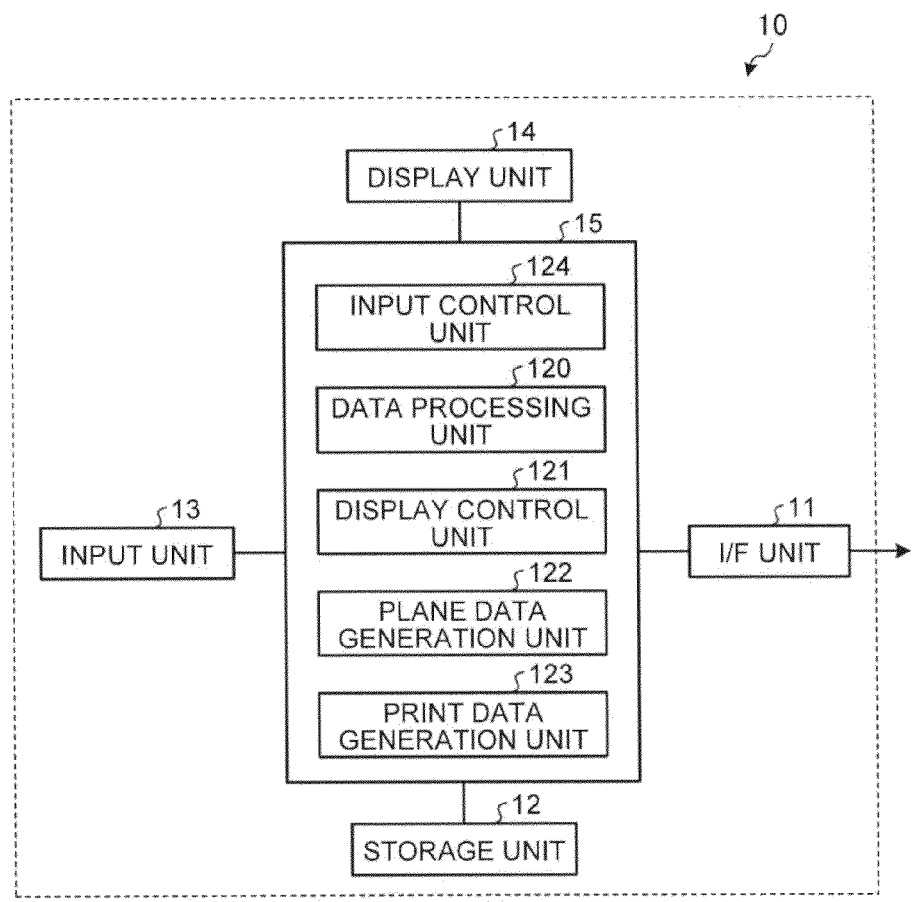
FIG. 6 is a block diagram illustrating a schematic configuration example of a host device.

Next, the host device 10 which generates such each plane image data will be described in detail. FIG. 6 is a block diagram illustrating a schematic configuration example of the host device 10. As illustrated in FIG. 6, the host device 10 has an I/F unit 11, a storage unit 12, an input unit 13, a display unit 14 and a control unit 15. The I/F unit 11 is an interface device which communicates with the DFE 50. The storage unit 12 is a hard disk drive device (HDD) or a storage medium such as memory which stores various items of data. The input unit 13 is an input device which receives an input of various operations from the user, and is formed by, for example, a keyboard or a mouse. The display unit 14 is a display device which displays various screens, and is formed with, for example, a liquid crystal panel.

The control unit 15 is a computer which controls the entire host device 10, and includes, for example, a CPU, ROM and RAM. As illustrated in FIG. 6, the control unit 15 mainly has an input control unit 124, a data processing unit 120, a display control unit 121, a plane data generation unit 122 and a print data generation unit 123. The input control unit 124 and the display control unit 121 of these units are realized when the CPU of the control unit 15 reads a program of an operating system stored in, for example, the ROM, expands the program on the RAM and executes the program. The data processing unit 120, the plane data generation unit 122 and the print data generation unit 123 are realized when the CPU of the control unit 15 reads the program of the image processing application stored in, for example, the ROM, expands the program on the RAM and executes the program. Meanwhile, the plane data generation unit 122 provides, for example, a plug-in function installed in the image processing application. In addition, at least part of these units can also be realized by a dedicated circuit (hardware).

The input control unit 124 receives various inputs from the input unit 13 and controls the inputs. For example, the user operates the input unit 13 to input image designation information for designating an image to which a surface effect needs to be applied among various images (for example, pictures, letters, figures and images obtained by synthesizing these) stored in the storage unit 12, that is, colored plane image data (also referred to as a "target image" below). In addition, a method of inputting image designation information is not limited to this, and is arbitrary.

The display control unit 121 controls the display unit 14 to display various pieces of information. In the present embodiment, when the input control unit 124 receives the image designation information, the display control unit 121 reads an image designated by this image designation information from the storage unit 12, and controls the display unit 14 to display the read image on the screen.

By operating the input unit 13 while checking a target image displayed on the display unit 14, the user can input designation information for designating an area to which a surface effect is applied and a type of the surface effect. In addition, a method of inputting designation information is not limited to this, and is arbitrary.

Figure 7:
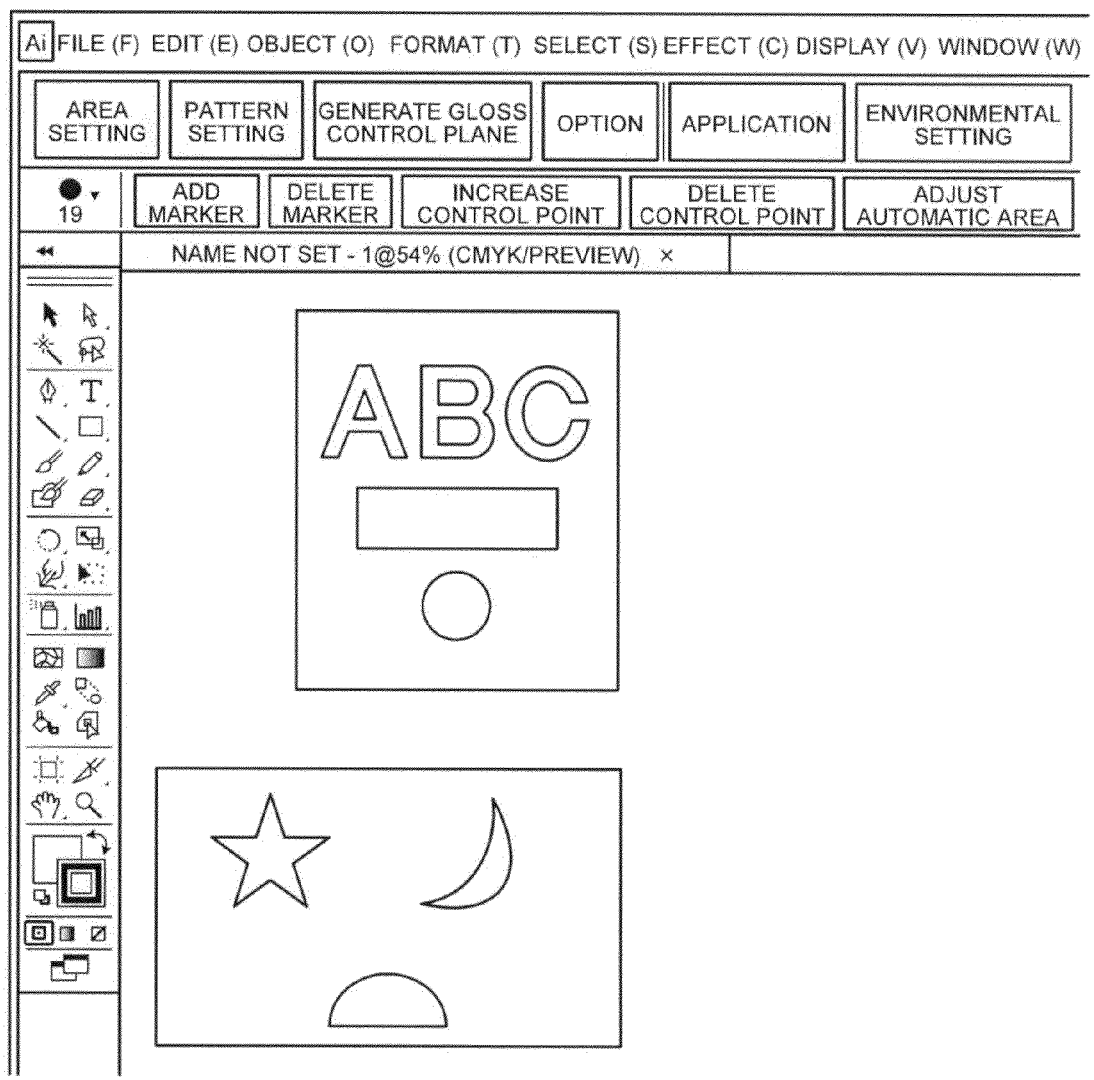
FIG. 7 is a view illustrating an example of a screen displayed by an image processing application.

More specifically, the display control unit 121 has the display unit 14 display, for example, a screen illustrated in FIG. 7. FIG. 7 illustrates an example of a screen displayed when a plug-in is implemented in Illustrator distributed by Adobe Systems Incorporated. On the screen illustrated in FIG. 7, an image represented by target image data of a processing target (colored plane image data) is displayed, and, when the user pushes a marker addition button through the input unit 13 and inputs an operation of designating an area to which a surface effect needs to be applied, the area to which the surface effect needs to be applied is designated. The user inputs an operation for all areas to which the surface effect is applied. Further, the display control unit 121 of the host device 10 has the display unit 14 display a screen illustrated in FIG. 8 per, for example, designated area. On the screen illustrated in FIG. 8, an image of an area is displayed in each designated area to which a surface effect is applied, and, by inputting an operation of designating a type of the surface effect which needs to be applied to the image to the input unit 13, the type of the surface effect to be applied to the area is designated. Types of surface effects include an "inverse mask" in FIG. 8 as mirror gloss or solid gloss in FIG. 3 and other effects other than mirror gloss or solid gloss in FIG. 3 include stained glass, a line pattern, a halftone pattern, a mosaic style, halftone matte and halftone in FIG. 8, and each surface effect can be designated.

Back to FIG. 6, the data processing unit 120 performs various types of image processing of a target image based on a user's instruction through the input unit 13.

The plane data generation unit 122 generates colored plane image data, gloss control plane image data and clear plane image data. That is, when the input control unit 124 receives user's color designation with respect to a drawing object of the target image, the plane data generation unit 122 generates the colored plane image data according to the color designation.

Further, when the input control unit 124 receives designation of a transparent image such as a watermark or a texture other than a surface effect and an area to which the transparent image is applied, the plane data generation unit 122 generates clear plane data for specifying a transparent image and an area on a transfer sheet to which the transparent image is applied, according to user's designation.

Furthermore, when the input control unit 124 receives designation information (the area to which the surface effect is applied and the type of the surface effect), the plane data generation unit 122 generates gloss control plane image data for specifying the area on the transfer sheet to which the surface effect is applied and the type of the surface effect, based on the designation information. Meanwhile, the plane data generation unit 122 generates gloss control plane image data for designating an area to which a surface effect indicated by a gloss control value is applied in units of a drawing object of image data of a target image.

Figures 9, 10:
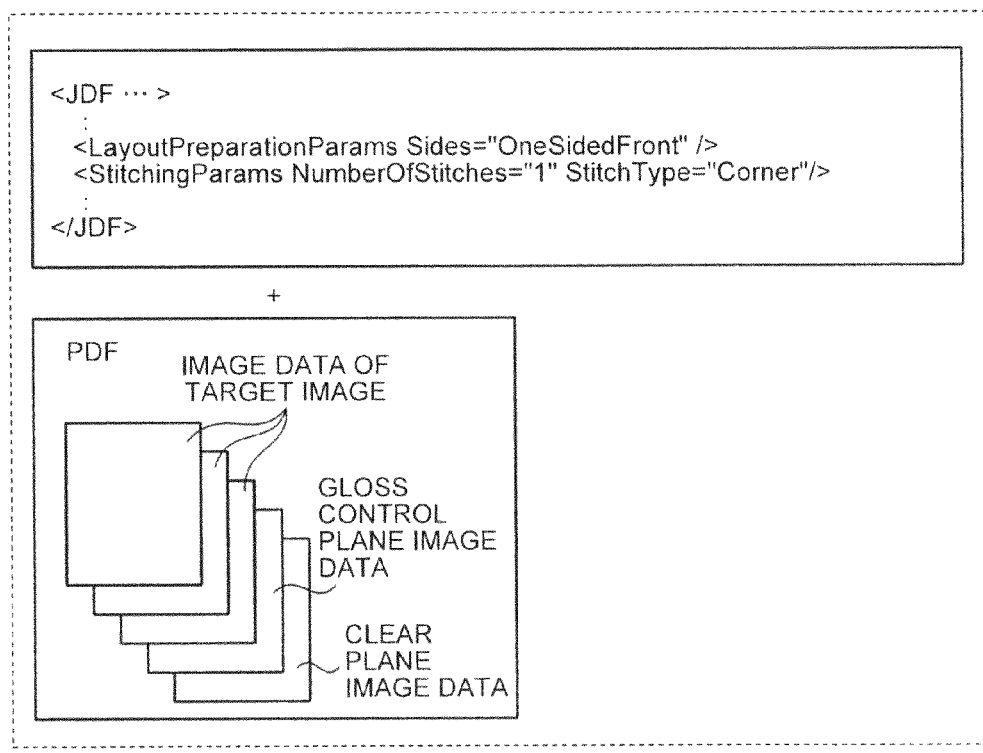
FIG. 9 is a view illustrating an example of a density value selection table.
FIG. 10 is a schematic view conceptually illustrating a configuration example of print data.

Meanwhile, in the storage unit 12, a density value selection table is stored which stores a type of a surface effect designated by the user and a density value of a gloss control plane associated with a type of the surface effect. FIG. 9 is a view illustrating an example of a density value selection table. In an example in FIG. 9, a density value of a gloss control plane associated with an area to which the user designates "PG" (mirror gloss) is "98%", a density value of a gloss control plane associated with an area to which the user designates "G" (solid gloss) is "90%", a density value of a gloss control plane associated with an area to which the user designates "M" (halftone matte) is "16%" and a density value of a gloss control plane associated with an area to which the user designates "PM" (matte) is "6%".

This density value selection table is data which is part of a surface effect selection table (described below) stored in the DFE 50, and the control unit 15 acquires the surface effect selection table at a predetermined operational timing, generates the density value selection table from the acquired surface effect selection table, and stores the density value selection table in the storage unit 12. In addition, a configuration may be employed where the surface effect selection table is stored in a storage server (cloud) on a network such as the Internet, and the control unit 15 acquires the surface effect selection table from the server and generates the density value selection table from the acquired surface effect selection table. Meanwhile, the surface effect selection table stored in the DFE 50 and the surface effect selection table stored in the storage unit 12 need to be the same data.

Back to FIG. 6, the plane data generation unit 122 generates gloss control plane image data by setting a density value (gloss control value) of a drawing object to which a predetermined surface effect is designated by the user, to a value associated with the type of the surface effect referring to the density value selection table illustrated in FIG. 9. A case will be assumed as an example where the user designates to apply "PG" to an area in which "ABC" is displayed, "G" to an oblong area and "M" to a circular area in a target image which is colored plane image data illustrated in FIG. 2. In this case, the plane data generation unit 122 generates gloss control plane image data by setting a density value of the drawing object ("ABC") to which the user designates "PG" to "98%", setting a density value of a drawing object ("oblong") to which the user designates "G" to "90%" and setting a density value of a drawing object ("circular") to which the user designates "M" to "16%". The gloss control plane image data generated by the plane data generation unit 122 is vector graphic data which is represented by a set of coordinates of points, parameters of an equation of lines or planes connecting the coordinates and a drawing object which indicates fill or a special effect. FIG. 4 is a view illustrating an image of the gloss control plane image data. The plane data generation unit 122 generates document data obtained by integrating gloss control plane image data, image data of a target image (colored plane image data) and clear plane image data, and passes the document data to the print data generation unit 123.

The print data generation unit 123 generates print data based on the document data. The print data is configured to include image data of a target image (colored plane image data), gloss control plane image data, clear plane image data and a job command which designates to a printer, for example, a setting of a printer, a setting of aggregation and a setting of duplex. FIG. 10 is a schematic view conceptually illustrating a configuration example of print data. Although, in an example in FIG. 10, JDF (Job Definition Format) is used as a job command, the present invention is not limited to this. The JDF illustrated in FIG. 10 is a command for designating "single printing and stapled" as a setting of aggregation. Further, the print data may be converted into a page description language (PDL) such as PostScript or may keep a PDF format as long as the DFE 50 supports this format.

Figure 11:
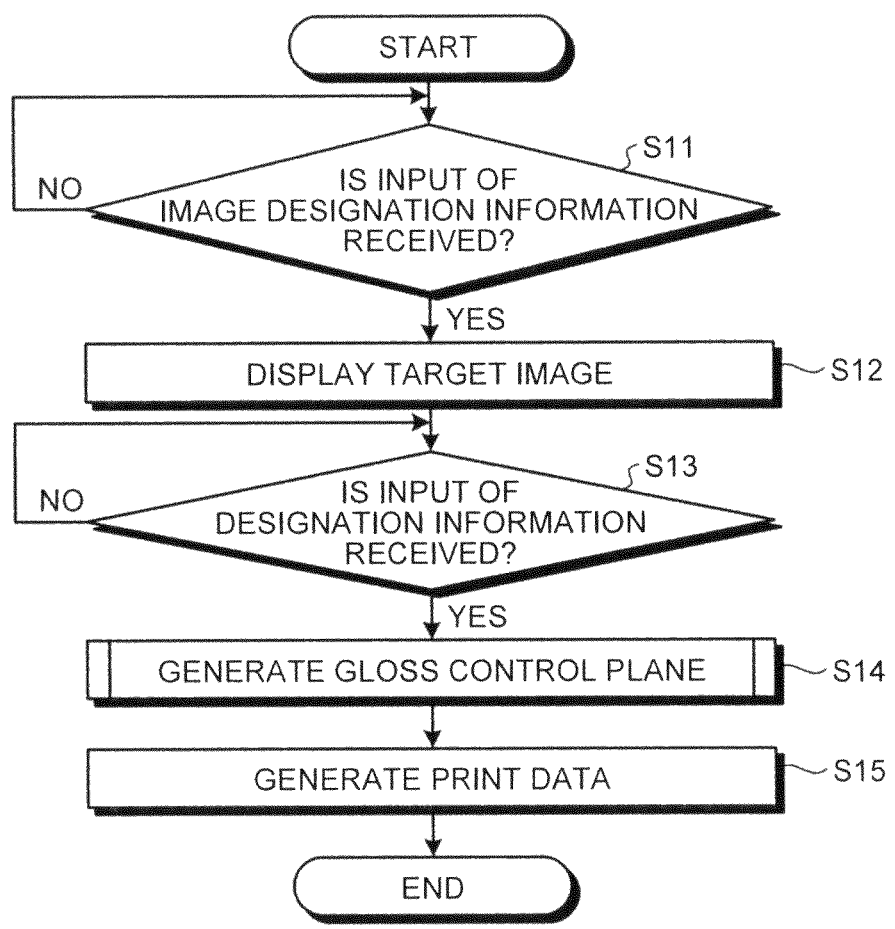
FIG. 11 is a flowchart illustrating process of print data generation processing of the host device according to the first embodiment.

Next, processing of the host device 10 of generating print data employing the above configuration will be described. FIG. 11 is a flowchart illustrating process of print data generation processing of the host device 10 according to the first embodiment. In addition, an example of processing will be described below where a transparent image is not designated and clear plane image data is not generated.

First, when the input control unit 124 receives an input of image designation information (step S11: YES), the display control unit 121 controls the display unit 14 to display an image designated by the received image designation information (step S12). Next, when the input control unit 124 receives an input of designation information of a surface effect (step S13: YES), the plane data generation unit 122 generates gloss control plane image data based on the received designation information (step S14).

Figure 12:
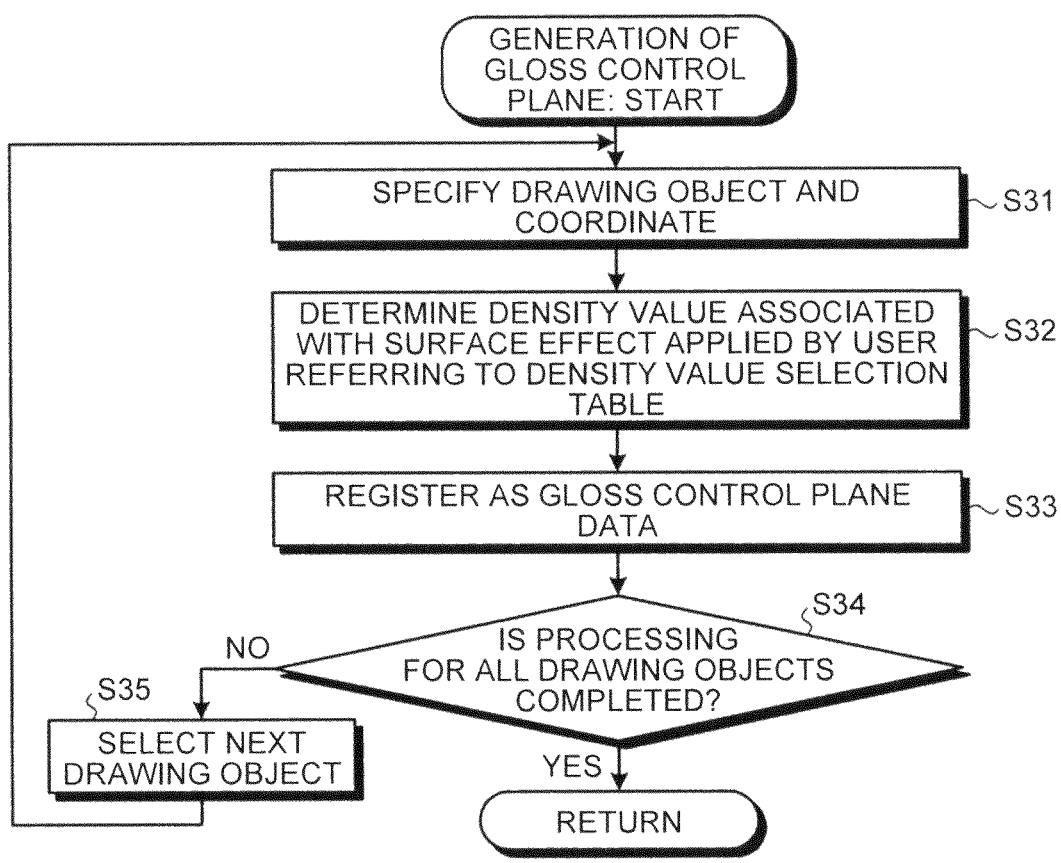
FIG. 12 is a flowchart illustrating process of gloss control plane generation processing.

Meanwhile, gloss control plane generation processing in step S14 will be described in detail. FIG. 12 is a flowchart illustrating process of gloss control plane generation processing. First, the plane data generation unit 122 specifies a drawing object in which the surface effect is applied to a target image according to the designation information, and a coordinate of the drawing object (step S31). The drawing object and the coordinate of the drawing object are specified using, for example, a drawing command provided by, for example, an operating system which the data processing unit 120 uses to draw a drawing object in a target image, and a coordinate value set by the drawing command.

Next, the plane data generation unit 122 determines a density value as a gloss control value associated with a type of a surface effect applied by the user in the designation information referring to the density value selection table stored in the storage unit 12 (step S32).

Further, the plane data generation unit 122 associates and registers the gloss control plane image data (originally empty data), the drawing object and the density value determined in association with the type of the surface effect (step S33).

Next, the plane data generation unit 122 decides whether or not processing in steps S31 to S33 is completed for all drawing objects which exist in the target image (step S34). Further, when the processing is not yet completed (step S34: No), the plane data generation unit 122 selects a next drawing object which is not yet processed in the target image (step S35), and repeatedly execute processing in steps S31 to S33.

Figure 8:
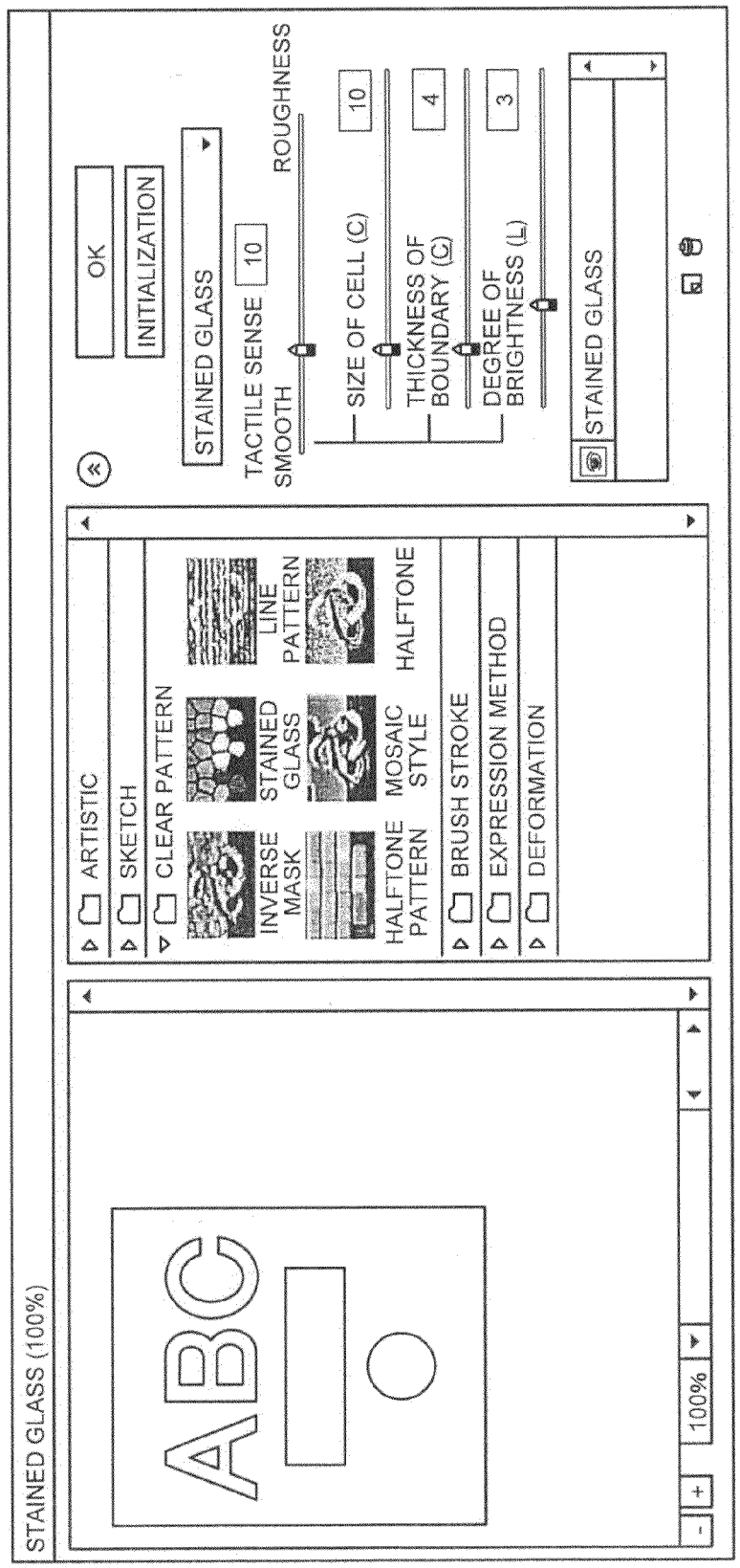
FIG. 8 is a view illustrating an example of a screen displayed by the image processing application.
Figures 13, 14:
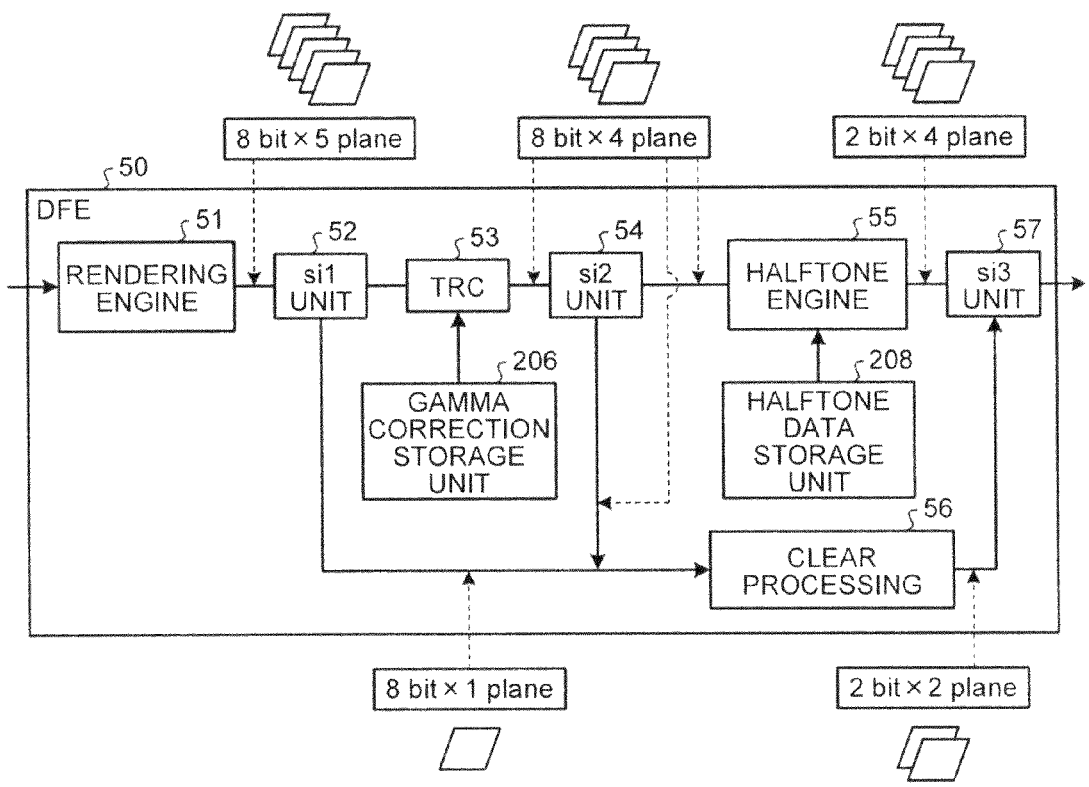
FIG. 13 is a view illustrating a correspondence between a drawing object, a coordinate and a density value of the gloss control plane image data in FIG. 4.
FIG. 14 is a view illustrating a functional configuration of a DFE.

Furthermore, when it is decided in step S34 that the processing in steps S31 to S33 is completed for all drawing objects in the target image (step S34: Yes), the plane data generation unit 122 finishes generating the gloss control plane. By this means, the gloss control plane image data illustrated in FIG. 8 is generated. FIG. 13 is a view illustrating correspondences among a drawing object, a coordinate and a density value of the gloss control plane image data in FIG. 8.

Back to FIG. 11, when the gloss control plane image data is generated, the plane data generation unit 122 generates document data by integrating the gloss control plane image data and the image data of the target image, and passes the document data to the print data generation unit 123. Further, the print data generation unit 123 generates print data based on the document data (step S15). Thus, the print data is generated.

Next, a functional configuration of the DFE 50 will be described. As illustrated in FIG. 14, the DFE 50 has a rendering engine 51, a si1 unit 52, a TRC (Tone Reproduction Curve) 53, a si2 unit 54, a halftone engine 55, a clear processing 56, a si3 unit 57, a gamma correction storage unit 206, a halftone data storage unit 208 and a surface effect selection table (not illustrated). The rendering engine 51, the si1 unit 52, the TRC (Tone Reproduction Curve) 53, the si2 unit 54, the halftone engine 55, the clear processing 56 and the si3 unit 57 are realized when the control unit of the DFE 50 executes various programs stored in a main storage unit or an auxiliary storage unit. The si1 unit 52, the si2 unit 54 and the si3 unit 57 each have a (separate) function of separating image data and an (integrate) function of integrating image data. The surface effect selection table is stored in, for example, an auxiliary storage unit.

The rendering engine 51 receives an input of image data (for example, print data illustrated in FIG. 10) transmitted from the host device 10. The rendering engine 51 interprets the language of the inputted image data and converts the image data represented by the vector graphics into bitmap graphic image data, converts a color space represented by, for example, an RGB graphics into a color space of a CMYK graphics, and outputs each eight bit CMYK color plane image data and eight bit gloss control plane. The si1 unit 52 outputs each eight bit CMYK image data to the TRC 53, and outputs the eight bit gloss control plane to the clear processing 56. Meanwhile, the DFE 50 converts the vector graphic gloss control plane image data outputted from the host device 10 into bitmap graphic image data and, as a result, the DFE 50 sets a type of a surface effect with respect to a drawing object designated by the user using the image processing application as a density value in pixel units and outputs the gloss control plane image data.

The TRC 53 receives an input of each eight bit CMYK image data through the si1 unit 52. The TRC 53 gamma corrects the inputted image data according to a 1D_LUT gamma curve generated by calibration. The gamma correction storage unit 206 stores a plurality of gamma curves which varies per combination of each color of CMYK and a surface effect. Details of gamma correction and calibration will be described below. Image processing includes, for example, total volume control of toner in addition to gamma correction. Total volume control is processing of limiting each gamma corrected eight bit CMYK image data because the amount of toner which can be provided by the printer 70 on one pixel on a recording medium is limited. That is, when printing is performed out of total volume control, image quality deteriorates due to transfer failure or fixing failure. In the present embodiment, only relevant gamma correction is described.

The si2 unit 54 outputs each eight bit CMYK image data gamma corrected by the TRC 53 to the clear processing 56 as data for generating an inverse mask (described below). The halftone engine 55 receives an input of each gamma corrected eight bit CMYK image data through the si2 unit 54. The halftone engine 55 performs halftone processing of converting the inputted image data into a data format of, for example, each two bit CMYK image data to output to the printer 70, and outputs each two bit CMYK image data for which the halftone processing is performed. The halftone data storage unit 208 stores dither data used for the halftone processing of the halftone engine 55. In addition, two bits are exemplary, and the present invention is not limited to this.

The clear processing 56 receives an input of the eight bit gloss control plane converted by the rendering engine 51 through the si1 unit 52, and each eight bit CMYK image data gamma corrected by the TRC 53 through the si2 unit 54. The clear processing 56 decides a surface effect with respect to a density value (pixel value) represented by each pixel which forms the gloss control plane using the inputted gloss control plane and referring to the surface effect selection table described below and determines on or off of the glosser 80 according to this decision, and adequately generates an inverse mask or a solid mask using each inputted eight bit CMYK image data to adequately generate two bit clear toner plane image data for adhering clear toner. Further, according to the decision result of the surface effect, the clear processing 56 adequately generates and outputs clear toner plane image data used by the printer 70 and clear toner plane image data used by the low temperature fixing unit 90, and outputs on/off information which indicates on/off of the glosser 80.

Meanwhile, the inverse mask makes uniform the total amount of adhered CMYK toners and clear toner on each pixel which forms a target area to which a surface effect is applied. More specifically, image data obtained by adding all density values represented by pixels which form the target area in CMYK plane image data, and subtracting this addition value from a predetermined value is the inverse mask. For example, an inverse mask 1 is represented by following equation 1.

$$Clr=100-(C+M+Y+K) \text{ where, when } Clr<0 \text{ is true,} \\ Clr=0 \text{ is true} \quad (1)$$

In equation 1, Clr, C, M, Y and K represent a density percentage converted from a density value in each pixel for clear toner and C, M, Y and K toners. That is, in equation 1, the total amount of adherence is obtained by adding the amount of adhered clear toner to the total amount of adhered C, M, Y and K toners is 100% for all pixels which form a target area to which the surface effect is applied. In addition, when the total amount of adhered C, M, Y and K toners is 100% or more, clear toner is not adhered, and the density percentage of clear toner is 0%. This is because a portion at which the total amount of adhered C, M, Y and K toners exceeds 100% is smoothed by fixing processing. Thus, when the total amount of adherence on all pixels which form a target area to which a surface effect is applied is 100% or more, convexities and concavities of a surface produced by a difference in the total amount of adhering toner in the target area are removed, and, as a result, gloss is produced by regular reflection of light. Meanwhile, the inverse mask is calculated by other than equation 1, and includes a plurality of types of inverse masks.

For example, an inverse mask may uniformly adhere clear toner to each pixel. The inverse mask in this case is also referred to as a "solid mask", and is represented by following equation 2.

$$Clr=100 \quad (2)$$

In addition, solid masks may be associated with density percentages other than 100% among target pixels to which a surface effect is applied, and there is a plurality of solid mask patterns.

Further, for example, an inverse mask may be calculated by being multiplied with a background exposure percentage of each color. The inverse mask in this case is represented by, for example, following equation 3.

$$Clr=100\times\{(100-C)/100\}\times\{(100-M)/100\}\times\{(100-Y)/100\}\times f(100-K)/100\} \quad (3)$$

In above equation 3, (100−C)/100 indicates a background exposure percentage of C, (100−M)/100 indicates a background exposure percentage of M, (100−Y)/100 indicates a background exposure percentage of Y and (100−K)/100 indicates a background exposure percentage of K.

Further, for example, the inverse mask may be calculated by a method which assumes that halftone of a maximum area ratio defines smoothness. An inverse mask in this case is represented by, for example, following equation 4.

$$Clr=100-\max(C,M,Y,K) \quad (4)$$

In above equation 4, max(C,M,Y,K) indicates that a density value of a color which indicates a maximum density value of CMYK is a representative value.

To sum up, the inverse mask is represented by one of above equation 1 to equation 4.

The surface effect selection table is a table which indicates a correspondence between a density value as a gloss control value which indicates a surface effect and a type of the surface effect, and which indicates a correspondence between control information related to a post-processor matching a configuration of the image formation system, clear toner plane image data used by the printer 70 and clear toner image data used by the post-processor. Although there are various configurations of the image formation system, in the present embodiment, the image formation system employs a configuration in which the glosser 80 and the low temperature fixing unit 90 as post-processors are connected to the printer 70. Hence, control information matching the configuration of the image formation system and related to the post-processors is on/off information which indicates on or off of the glosser 80. Further, clear toner plane image data used by a post-processor includes clear toner plane image data used by the low temperature fixing unit 90. FIG. 15 is a view illustrating a data configuration of a surface effect selection table. In addition, although the surface effect selection table can be configured to indicate per configuration of a different image formation system a correspondence between control information related to a post-processor, clear toner plane 1 image data used by the printer 70, clear toner plane 2 image data used by the post-processor, a density value and a type of a surface effect, FIG. 15 illustrates a data configuration matching the configuration of the image formation system according to the present embodiment. In the correspondence between types of surface effects and density values illustrated in FIG. 15, each type of a surface effect is associated per range of a density value. Further, each type of the surface effect is associated in 2% units with a density rate (density percentage) converted from a value (representative value) which is a representative of a range of this density value. More specifically, surface effects (mirror effect and solid effect) which apply gloss are associated with a range of a density value ("212" to "255") the density percentage of which is 84% or more, and surface effects (halftone matte and matte) which suppress gloss are associated with a range of a density value ("1" to "43") the density percentage of which is 16% or less. Further, a range of a density value the density percentage of which is 20% to 80% is associated with surface effects such as a texture or a woven pattern watermark.

More specifically, for example, mirror gloss (PM: Premium Gross) is associated as a surface effect with pixel values of "238" to "255", and, of these values, mirror gloss of different types is associated with three ranges of pixel values of "238" to "242", pixel values of "243" to "247" and pixel values of "248" to "255". Further, solid gloss (G: Gross) is associated with pixel values of "212" to "232", and, of these values, solid gloss of different types is associated with four ranges of pixel values of "212" to "216", pixel values of "217" to "221", pixel values of "222" to "227", and pixel values of "228" to "232". Furthermore, halftone matte (M: Matt) is associated with pixel values of "23" to "43", and, of these values, halftone matte of different types is associated with four ranges of pixel values of "23" to "28", pixel values of "29" to "33", pixel values of "34" to "38" and pixel values of "39" to "43". Still further, matte (PM: Premium Matt) is associated with pixel values of "1" to "17", and, of these values, matte of different types is associated with three ranges of pixel values of "1" to "7", pixel values of "8" to "12" and pixel values of "13" to "17". These different types of an identical surface effect differ in equations of obtaining clear toner plane image data used by the printer 70 or the low temperature fixing unit 90, and operations of a printer main body and a post-processor are the same. In addition, a density value of "0" is associated with that a surface effect is not applied.

Further, FIG. 15 illustrates on/off information which indicates on or off of the glosser 80, and contents of clear toner plane 1 image data (Clr-1 in FIG. 1) used by the printer 70 and clear toner plane 2 image data used by the low temperature fixing unit 90, in association with a pixel value and a type of a surface effect. When, for example, a surface effect is mirror gloss, that the glosser 80 is powered on is indicated, and the clear toner plane 1 image data used by the printer 70 represents an inverse mask and the clear toner plane 2 image data (Clr-2 in FIG. 1) used by the low temperature fixing unit 90 indicates no data. The inverse mask is calculated by, for example, above equation 1. In addition, an example illustrated in FIG. 15 is an example of a case where an area to which mirror effect is designated as a surface effect corresponds to an entire area defined by image data. An example of a case where an area to which a mirror effect is designated as a surface effect corresponds to part of an area defined by image data will be described below.

Further, when the density value is "228" to "232" and the surface effect is solid gloss, that the glosser 80 is powered off is indicated, and the clear toner plane 1 image data used by the printer 70 indicates an inverse mask 1 and the clear toner plane 2 image data used by the low temperature fixing unit 90 indicates no data. In addition, the inverse mask 1 only needs to be represented by one of above equation 1 to equation 4. This means that the glosser 80 is powered off and the total amount of adhering toner to be smoothed is different, so that concavities and convexities on a surface are increased by mirror gloss and, as a result, solid gloss having a lower gloss level than that of the mirror gloss is obtained. Further, when the surface effect is halftone matte, that the glosser 80 is powered off is indicated, and the clear toner plane 1 image data used by the printer 70 indicates a halftone (halftone) and the clear toner plane 2 image data used by the low temperature fixing unit 90 indicates no data. Furthermore, when a surface effect is matte, that the glosser 80 may be either powered on or off, and the clear toner plane 1 image data used by the printer 70 indicates no data and the clear toner plane 2 image data used by the low temperature fixing unit 90 indicates a solid mask. The solid mask is calculated by, for example, above equation 2.

The clear processing 56 decides a surface effect associated with each pixel value indicated by a gloss control plane referring to the above surface effect selection table, decides whether or not the glosser 80 is powered on or off, and decides what clear toner plane image data is used by the printer 70 and the low temperature fixing unit 90. In addition, the clear processing 56 decides whether or not the glosser 80 is powered on or off per page. Further, as described above, the clear processing 56 adequately generates and outputs clear toner plane image data according to the decision result, and outputs on/off information to the glosser 80.

The si3 unit 57 integrates each two bit CMYK image data for which halftone processing is performed and two bit clear toner plane image data generated by the clear processing 56, and outputs the integrated image data to the MIC 60. In addition, the clear processing 56 does not generate in some cases at least one of the clear toner plane image data used by the printer 70 and the clear toner plane image data used by the low temperature fixing unit 90, the clear toner plane image data generated by the clear processing 56 is integrated by the si3 unit 57, and, when the clear processing 56 does not generate both items of clear toner plane image data, the si3 unit 57 outputs the image data obtained by integrating each two bit CMYK image data. As a result, four to six items of two bit image data are sent out from the DFE 50 to the MIC 60. Further, the si3 unit 57 also outputs on/off information of the glosser 80 outputted from the clear processing 56, to the MIC 60.

Figure 16:
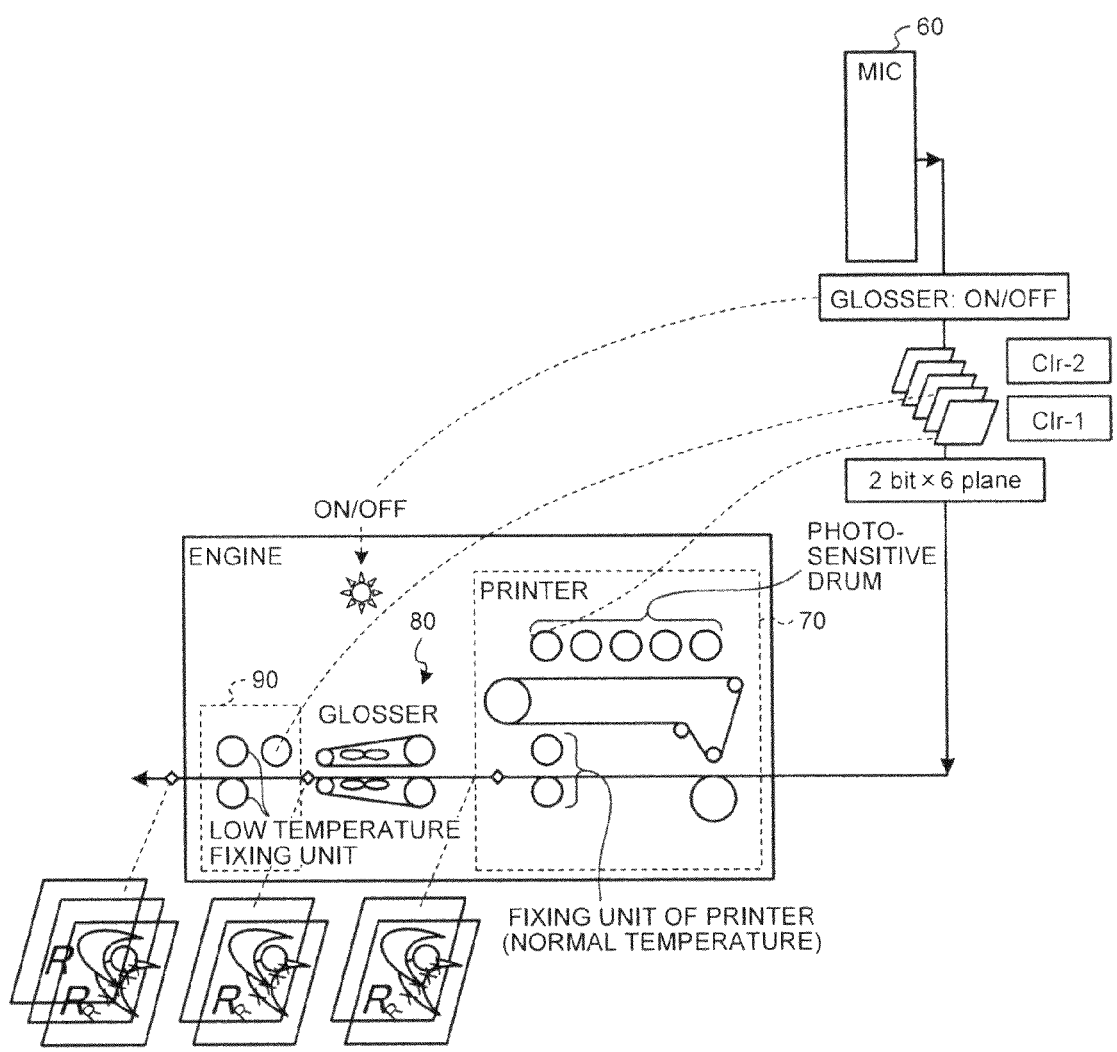
FIG. 16 is a view conceptually illustrating a configuration of a MIC.

The MIC 60 is connected with the DFE 50 and the printer 70, receives color plane image data and clear toner plane image data from the DFE 50, sorts each image data to a corresponding device and controls the post-processor. More specifically, as illustrated in FIG. 16, the MIC 60 outputs to the printer 70 CMYK color plane image data among the image data outputted from the DFE 50, outputs clear toner plane image data to the printer 70 when there is the clear toner plane image data used by the printer 70, powers on or off the glosser 80 using the on/off information outputted from the DFE 50 and outputs clear toner plane image data to the low temperature fixing unit 90 when there is the clear toner plane image data used by the low temperature fixing unit 90. The glosser 80 may switch between a route in which fixing is performed and a route in which fixing is not performed based on the on/off information. The low temperature fixing unit 90 may switch on and off depending on whether or not there is clear toner plane image data or switch between routes in the same manner as that of the glosser 80.

Next, process of gloss control processing performed by the image formation system according to the present embodiment will be described using FIG. 17. When the DFE 50 receives image data from the host device 10 (step S1), the rendering engine 51 interprets the language of the image data and converts the image data represented by the vector graphics into bitmap graphic image data, and converts a color space represented by, for example, an RGB graphics into a CMYK graphic color space and outputs each eight bit CMYK color plane image data and an eight bit gloss control plane (step S2).

Figure 18:
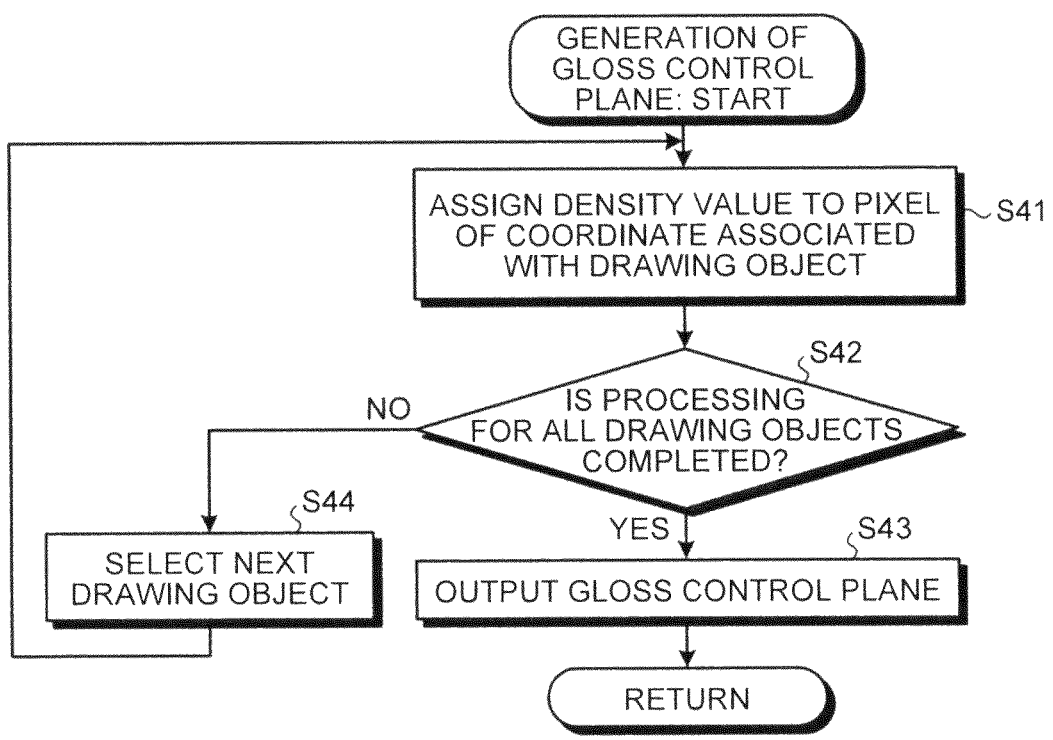
FIG. 18 is a flowchart illustrating process of conversion processing of the gloss control plane image data.

Meanwhile, gloss control plane image data conversion processing in step S2 will be described in detail. FIG. 18 is a flowchart illustrating process of conversion processing of the gloss control plane image data. In this conversion processing, the gloss control plane image data in FIG. 8, that is, gloss control plane image data which is illustrated in FIG. 13 and to which a density value for specifying a surface effect per drawing object is designated, is converted into gloss control plane image data for which a density value is designated per pixel which forms the drawing object.

The rendering engine 51 assigns a density value set to the drawing object, to pixels in a range of the coordinate corresponding to the drawing object of the gloss control plane illustrated in FIG. 13 (step S41), and converts the gloss control plane image data. Further, whether or not this processing for all drawing objects which exist in the gloss control plane image data is completed is decided (step S42).

Furthermore, when the processing is not yet completed (step S42: No), the rendering engine 51 selects a next unprocessed drawing object of the gloss control plane image data (step S44), and repeats processing in step S41.

Meanwhile, when the processing in step S41 for all drawing objects in the gloss control plane image data is completed in step S42 (step S42: Yes), the converted gloss control plane image data is outputted (step S43). According to the above processing, the gloss control plane image data is converted into data to which a surface effect is set per pixel.

Figure 17:
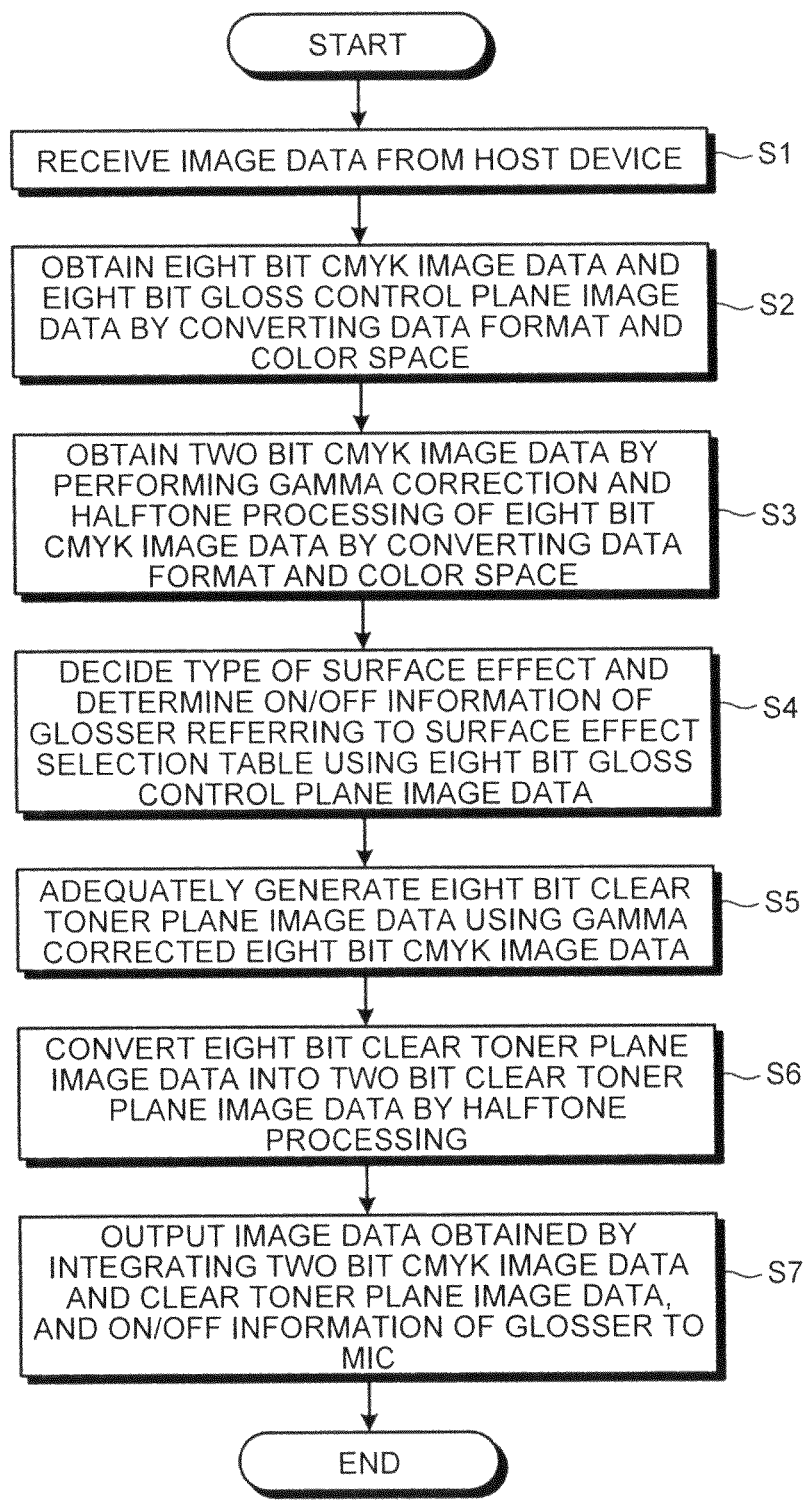
FIG. 17 is a flowchart illustrating process of gloss control processing performed by the image formation system.

Back to FIG. 17, when eight bit gloss control plane image data is outputted, the TRC 53 of the DFE 50 gamma corrects each eight bit CMYK color plane image data according to a 1D_LUT gamma curve generated by calibration, and the halftone engine 55 performs halftone processing of converting the gamma corrected image data into a data format of each two bit CMYK image data to output to the printer 70 and obtains each two bit CMYK image data for which halftone processing is performed (step S3).

Further, the clear processing 56 of the DFE 50 refers to the surface effect selection table using the eight bit gloss control plate, and decides the surface effect designated to each pixel value indicated by the gloss control plane. Furthermore, the clear processing 56 makes such decision on all pixels which form the gloss control plane. In addition, the gloss control plane represents a density value in the basically identical range of all pixels which form an area to which each surface effect is applied. Hence, the clear processing 56 decides that pixels in the vicinity to which the identical surface effect is decided to be applied is included in an area to which the identical surface effect is applied. Thus, the clear processing 56 decides the area to which the surface effect is applied, and the type of the surface effect to be applied to the area. Further, the clear processing 56 determines on or off of the glosser 80 according to this decision (step S4).

Next, the clear processing 56 of the DFE 50 adequately generates eight bit clear toner plane image data for adhering clear toner, adequately using each gamma corrected eight bit CMYK image data (step S5). Further, the clear processing 56 gamma corrects the eight bit clear toner plane image data according to the gamma curve generated by calibration described below, performs halftone processing of the gamma corrected image data and obtains the two bit clear toner plane image data (step S6). This detail content will be described below.

Next, the si3 unit 57 of the DFE 50 integrates each two bit CMYK image data which is obtained in step S3 and for which the halftone processing is performed and the two bit clear toner plane image data generated in step S6, and outputs to the MIC 60 the integrated image data and on/off information which is determined in step S4 and which indicates on or off of the glosser 80 (step S7).

In addition, when the clear toner plane image data is not generated in step S5, the clear processing 56 integrates only each two bit CMYK image data which is obtained in step S3 and for which the halftone processing is performed and outputs the image data to the MIC 60 in step S7.

Hereinafter, a specific example of a type of a surface effect will be described. Hereinafter, types of mirror gloss and solid gloss which apply gloss, and halftone matte and matte which suppress gloss will be specifically described. Further, hereinafter, a case will be described where a surface effect of an identical type is designated in one page. In step S4, the clear processing 56 of the DFE 50 refers to the surface effect selection table illustrated in FIG. 15 using a density value represented by each eight bit pixel of the gloss control plane, and decides that the surface effect designated to pixels the density values of which are "238" to "255" is mirror gloss. In this case, the clear processing 56 of the DFE 50 further decides whether or not an area for which mirror gloss is designated as a surface effect corresponds to an entire area defined by the image data. When the decision result is affirmative, the clear processing 56 of the DFE 50 generates an inverse mask according to, for example, equation 1 using the image data matching the area among each gamma corrected eight bit CMYK image data. The image data which represents the inverse mask is the clear toner plane image data used by the printer 70. In addition, the low temperature fixing unit 90 does not use clear toner plane image data for the area, and therefore the DFE 50 does not generate clear toner plane image data used by the low temperature fixing unit 90. Further, in step S7, the si3 unit 57 of the DFE 50 integrates the clear toner plane image data used by the printer 70 and each two bit CMYK image data which is obtained in step S3 and for which the halftone processing is performed, and outputs to the MIC 60 the integrated image data and the on/off information which indicates on of the glosser 80. The MIC 60 outputs to the printer 70 the CMYK color plane image data which is the image data outputted from the DFE 50 and the clear toner plane image data used by the printer 70, and powers on the glosser 80 using the on/off information outputted from the DFE 50. The printer 70 emits an optical beam from the exposing unit using the CMYK color plane image data outputted from the MIC 60 and the clear toner plane image data, forms a toner image on a photosensitive element matching toner, transfers the toner image to a transfer sheet and fixes the toner image thereon by way of heating and pressing at a normal temperature. By this means, CMYK toners and, in addition, clear toners are adhered to the transfer sheet, and the image is formed thereon. Subsequently, the glosser 80 presses the transfer sheet at a high temperature and a high pressure. The clear toner plane image data is not outputted to the low temperature fixing unit 90, and the low temperature fixing unit 90 discharges the transfer sheet without clear toner adhered. As a result, the total amount of adhered CMYK toners and clear toner is uniformly compressed in the entire area defined by the image data, so that strong gloss is provided on the surface of the area.

Meanwhile, when the area to which mirror gloss is designated as a surface effect corresponds to part of the area defined by the image data, the following situation occurs. First, for the area to which mirror gloss is designated, the clear toner plane image data which represents the above inverse mask is used. However, when predetermined total adherence values of CMYK toners or more are set for all of the other pixels, if toners are pressed by the glosser 80, the total amount of adherence in the area to which the mirror gloss is designated, and the total amount of CMYK toners and clear toner in the area to which mirror gloss is designated and the area to which the predetermined total adherence values of CMYK toners or more are set eventually become uniform.

When, for example, predetermined total adherence values of CMYK toners or more are set to all pixels which form the area defined by the image data, the same result as that mirror gloss is designated to the entire area defined by the image data is brought about.

Hence, when the area to which mirror gloss is designated as a surface effect corresponds to part of the area defined by the image data, the DFE 50 generates the same clear toner plane image data as image data obtained by designating mirror gloss to the entire area defined by the image data, and adheres clear tone to a transfer sheet and the glosser 80 presses the transfer sheet. Next, in order to apply a surface effect of matte to an area other than the area to which a mirror effect is designated as a surface effect, to a transfer sheet pressed by the glosser 80, clear toner plane image data used by the low temperature fixing unit 90 is generated.

More specifically, the DFE 50 generates the inverse mask according to equation 1 in the same way as described above as the clear toner plane image data used by the printer 70. Further, the DFE 50 generates a solid mask according to equation 2 for the area other than the area to which a mirror effect is designated as a surface effect as the clear toner plane image data used by the low temperature fixing unit 90. Furthermore, in step S7, the si3 unit 57 of the DFE 50 integrates the clear toner plane image data used by the printer 70, the clear toner plane image data used by the low temperature fixing unit 90 and each two bit CMYK image data which is obtained in step S3 and for which is the halftone processing is performed, and outputs to the MIC 60 the integrated image data and the on/off information which indicates on of the glosser 80.

The MIC 60 outputs to the printer 70 CMYK color plane image data among the image data outputted from the DFE 50 and the clear toner plane image data used by the printer 70, powers on the glosser 80 using the on/off information outputted from the DFE 50 and outputs to the low temperature fixing unit 90 clear toner plane image data used by the low temperature fixing unit 90 among the image data outputted from the DFE 50. The printer 70 forms on a transfer sheet an image to which CMYK toners and clear toner are adhered, using the CMYK color plane image data and the clear toner plane image data outputted from the MIC 60. Subsequently, the glosser 80 presses the transfer sheet at a high temperature and a high pressure. The low temperature fixing unit 90 forms a toner image of clear toner using the clear toner plane image data outputted from the MIC 60, superimposes the toner image on the transfer sheet which passes through the glosser 80 and fixes the toner image on the transfer sheet by way of heating and pressing at a low temperature. As a result, the total amount of adhered CMYK toners and clear toner is uniformly compressed in the area to which mirror gloss is designated, so that strong gloss is provided on the surface of the area. Meanwhile, in an area other than the area to which mirror gloss is designated, clear toner of the solid mask adheres after pressing by the glosser 80 and concavities and convexities are produced on a surface, so that gloss on the surface of the area is suppressed.

Further, in step S4, the clear processing 56 of the DFE 50 refers to the surface effect selection table using a density value represented by each eight bit pixel of the gloss control plane, and decides that the surface effect designated to pixels the density values of which are "212" to "232" is solid gloss and, in particular, decides solid gloss type 1 for pixels the density values of which are "228" to "232". In this case, the clear processing 56 of the DFE 50 generates the inverse mask 1 using image data matching the area in each gamma corrected eight bit CMYK image data. The image data which represents the inverse mask 1 is the clear toner plane image data used by the printer 70. In addition, the low temperature fixing unit 90 does not use clear toner plane image data for the area, and therefore the DFE 50 does not generate clear toner plane image data used by the low temperature fixing unit 90. Further, in step S7, the si3 unit 57 of the DFE 50 integrates the clear toner plane image data used by the printer 70 and each two bit CMYK image data which is obtained in step S3 and for which the halftone processing is performed, and outputs to the MIC 60 the integrated image data and the on/off information which indicates off of the glosser 80. The MIC 60 outputs to the printer 70 the CMYK color plane image data which is the image data outputted from the DFE 50 and the clear toner plane image data used by the printer 70, and powers off the glosser 80 using the on/off information outputted from the DFE 50. The printer 70 forms on a transfer sheet an image to which CMYK toners and clear toner are adhered, using the CMYK color plane image data outputted from the MIC 60 and the clear toner plane image data used by the printer 70. The glosser 80 is powered off, and therefore the transfer sheet is not subsequently pressed at a high temperature and a high pressure. Further, the clear toner plane image data is not outputted to the low temperature fixing unit 90, and then the low temperature fixing unit 90 discharges the transfer sheet without clear toner adhered. As a result, in the area for which solid gloss is designated as a surface effect, the total amount of adhered CMYK toners and clear toner are comparatively uniform, so that it is possible to provide strong gloss on the surface of the area.

Further, in step S4, the clear processing 56 of the DFE 50 refers to the surface effect selection table using a density value represented by each eight bit pixel of the gloss control plane, and decides that the surface effect designated to pixels the density values of which are "23" to "43" is halftone matte. In this case, the clear processing 56 of the DFE 50 generates image data which represents halftone as the clear toner plane image data used by the printer 70. In addition, the low temperature fixing unit 90 does not use clear toner plane image data for the area, and therefore the DFE 50 does not generate clear toner plane image data used by the low temperature fixing unit 90. Further, in step S7, the si3 unit 57 of the DFE 50 integrates the clear toner plane image data used by the printer 70 and each two bit CMYK image data which is obtained in step S3 and for which the halftone processing is performed, and outputs to the MIC 60 the integrated image data and the on/off information which indicates on of the glosser 80. The MIC 60 outputs to the printer 70 the CMYK color plane image data which is the image data outputted from the DFE 50 and the clear toner plane image data used by the printer 70, and powers off the glosser 80 using the on/off information outputted from the DFE 50. The printer 70 forms on a transfer sheet an image to which CMYK toners and clear toner are adhered, using the CMYK color plane image data and the clear toner plane image data outputted from the MIC 60. The glosser 80 is powered off, and therefore the transfer sheet is not subsequently pressed at a high temperature and a high pressure. Further, the clear toner plane image data is not outputted to the low temperature fixing unit 90, and then the low temperature fixing unit 90 discharges the transfer sheet without clear toner adhered. As a result, halftone is applied by clear toner to the area to which halftone matte is designated as a surface effect, so that concavities and convexities are produced on the surface and gloss on the surface of the area is suppressed a little.

Further, in step S4, the clear processing 56 of the DFE 50 refers to the surface effect selection table using a density value represented by each eight bit pixel of the gloss control plane, and decides that the surface effect designated to pixels the density values of which are "1" to "17" is matte. In this case, when another surface effect is designated in one page (described below), the clear processing 56 of the DFE 50 powers on or off the glosser 80 according to this setting, and, irrespectively of on or off, generates a solid mask as clear toner plane image data used by the low temperature fixing unit 90 without generating the clear toner plane image data used by the printer 70. Further, in step S7, the si3 unit 57 of the DFE 50 integrates the clear toner plane image data used by the low temperature fixing unit 90 and each two bit CMYK image data which is obtained in step S3 and for which the halftone processing is performed, and outputs to the MIC 60 the integrated image data and the on/off information which indicates on of the glosser 80. The MIC 60 outputs to the printer 70 CMYK color plane image data among the image data outputted from the DFE 50, and outputs to the low temperature fixing unit 90 the clear toner plane image data used by the low temperature fixing unit 90 among the image data outputted from the DFE 50. The printer 70 forms on a transfer sheet an image to which CMYK toners and clear toner are adhered, using the CMYK color plane image data outputted from the MIC 60. When the glosser 80 is powered on, the transfer is pressed by the glosser 80 at a high temperature and at a high pressure and, when the glosser 80 is powered off, the transfer sheet is not pressed at a high temperature and a high pressure. The low temperature fixing unit 90 forms a toner image of clear toner using the clear toner plane image data outputted from the MIC 60, superimposes the toner image on the transfer sheet which passes through the glosser 80 and fixes the toner image on the transfer sheet by way of heating and pressing at a low temperature. As a result, in an area to which matte is designated as a surface effect, clear toner of the solid mask adheres and concavities and convexities are produced on a surface, so that gloss on the surface of the area is suppressed.

Although a case has been described above where the identical surface effect is designated in one page, even when different types of surface effects are designated in one page, the surface effects can be realized likewise by the above processing. That is, when a plurality of surface effects are designated in one page, each density value of gloss control plane image data associated with the type of the surface effect illustrated in FIG. 15 is set to a pixel in the area to which various surface effects are applied. That is, an area to which a surface effect is applied is designated in the gloss control plane per type of the surface effect, so that the DFE 50 only needs to decide a range of pixels to which the identical density value is set in the gloss control plane image data as an area to which the identical surface effect is applied and, consequently, it is possible to easily realize each surface effect in one page.

However, when a plurality of types of surface effects is designated in one page by density values of gloss control plane image data, the glosser 80 cannot be powered on or off in the identical page, and therefore there are types of surface effects which can be simultaneously realized and types of surface effects which cannot be simultaneously realized.

As illustrated in FIG. 1, in the present embodiment which employs a configuration including the printer 70, the glosser 80 and the low temperature fixing unit 90, when surface effects of mirror gloss (PG) and matte (PM) are designated in one page, as illustrated in FIG. 15, the glosser 80 is powered on upon mirror gloss (PG) and the glosser 80 is powered on or off upon matte (PM) according to designation of another surface effect, so that it is possible to simultaneously realize these two types of surface effects in one page.

In this case, in step S4, the clear processing 56 of the DFE 50 refers to the surface effect selection table illustrated in FIG. 15 using a density value represented by each eight bit pixel of the gloss control plane, and decides that the surface effect designated to an area of pixels the density values of which are "238" to "255" is mirror gloss (PG). Further, the clear processing 56 of the DFE 50 generates an inverse mask according to, for example, equation 1 using the image data matching the area among each gamma corrected eight bit CMYK image data. The image data which represents the inverse mask is the clear toner plane image data used by the printer 70 for the area to which the surface effect of mirror gloss (PG) is designated. In addition, the low temperature fixing unit 90 does not use clear toner plane image data for the area to which mirror gloss is designated, and therefore the DFE 50 does not generate clear toner plane image data used by the low temperature fixing unit 90 for the area to which mirror gloss is designated.

Further, in step S4, the clear processing 56 of the DFE 50 refers to the surface effect selection table likewise in the above identical page, and decides that the surface effect designated to the area of pixels the density values of which are "1" to "17" is matte (PM). In this case, the clear processing 56 of the DFE 50 sets to on/off information on of the glosser 80 according to a setting of mirror gloss which is another surface effect in one page, and generates a solid mask for the area to which matte is designated, as clear toner plane image data used by the low temperature fixing unit 90 without generating the clear toner plane image data used by the printer 70 for the area to which matte is designated.

Further, in step S7, the si3 unit 57 of the DFE 50 integrates the clear toner plane image data used by the printer 70 for the area to which mirror gloss is designated, the clear toner plane image data used by the low temperature fixing unit 90 for the area to which matte is designated and each two bit CMYK image data which is obtained in step S3 and for which is the halftone processing is performed, and outputs to the MIC 60 the integrated image data and the on/off information which indicates on of the glosser 80.

The MIC 60 outputs to the printer 70 the CMYK color plane image data among the image data outputted from the DFE 50 and the clear toner plane image data used by the printer 70 for the area to which mirror gloss is designated. Further, the MIC 60 outputs to the low temperature fixing unit 90 the clear toner plane image data used by the low temperature fixing unit 90 for the area to which matte is designated among the image data outputted from the DFE 50, and powers on the glosser 80 using the on/off information outputted from the DFE 50.

The printer 70 emits an optical beam from the exposing unit using the CMYK color plane image data outputted from the MIC 60 and the clear toner plane image data for the area to which mirror gloss is designated, forms a toner image on a photosensitive element matching toner, transfers the toner image to a transfer sheet and fixes the toner image thereon by way of heating and pressing at a normal temperature. By this means, CMYK toners and, in addition, clear toners are adhered to the transfer sheet, and the image is formed thereon. Subsequently, the glosser 80 presses the transfer sheet at a high temperature and a high pressure.

The low temperature fixing unit 90 forms a toner image of clear toner using the clear toner plane image data outputted from the MIC 60 for the area to which matte is designated, superimposes the toner image on the transfer sheet which passes through the glosser 80 and fixes the toner image on the transfer sheet by way of heating and pressing at a low temperature. As a result, it is possible to provide strong gloss on the surface of the area to which mirror gloss is designated as a surface effect, and clear toner of the solid mask adheres and concavities and convexities are produced on a surface in the area to which matte is designated as a surface effect, so that gloss on the surface of the area is suppressed.

Further, in addition, when surface effects of solid gloss (G), halftone matte (M) and matte (PM) are designated in one page in the configuration of the present embodiment, as illustrated in FIG. 15, the glosser 80 is powered off upon solid gloss (G) and halftone matte (M), and the glosser 80 is powered on or off upon matte (PM) according to designation of other surface effects in the page, so that it is possible to simultaneously realize these three types of surface effects in one page.

This case will be more specifically described. Further, in step S4, the clear processing 56 of the DFE 50 refers to the surface effect selection table using a density value represented by each eight bit pixel of the gloss control plane, and decides that the surface effect designated to the area of pixels the density values of which are "212" to "232" is solid gloss and, in particular, decides solid gloss type 1 for pixels the density values of which are "228" to "232". In this case, the clear processing 56 of the DFE 50 generates the inverse mask 1 using image data matching the area in each gamma corrected eight bit CMYK image data. The image data which represents the inverse mask 1 is the clear toner plane image data used by the printer 70 for the area to which solid gloss is designated. In addition, the low temperature fixing unit 90 does not use clear toner plane image data for the area to which solid gloss is designated, and therefore the DFE 50 does not generate clear toner plane image data used by the low temperature fixing unit 90.

Further, in step S4, the clear processing 56 of the DFE 50 refers to the surface effect selection table likewise in the above identical page, and decides that the surface effect designated to the area of pixels the density values of which are "23" to "43" is halftone matte (M). In this case, the clear processing 56 of the DFE 50 generates image data which represents halftone as the clear plane image data used by the printer 70 for the area to which halftone matte is designated. In addition, the low temperature fixing unit 90 does not use clear toner plane image data for the area to which this halftone matte is designated, and therefore the DFE 50 does not generate clear toner plane image data used by the low temperature fixing unit 90.

Further, in step S4, the clear processing 56 of the DFE 50 refers to the surface effect selection table likewise in the above identical page, and decides that the surface effect designated to the area of pixels the density values of which are "1" to "17" is matte (PM). In this case, the clear processing 56 of the DFE 50 powers off the glosser 80 according to settings of solid gloss and halftone matte which are other surface effects designated in one page, and generates a solid mask for the area to which matte is designated, as clear toner plane image data used by the low temperature fixing unit 90 without generating the clear toner plane image data used by the printer 70 for the area to which matte is designated.

Further, in step S7, the si3 unit 57 of the DFE 50 integrates the clear toner plane image data used by the printer 70 for the area to which solid gloss is designated, the clear toner plane image data used by the printer 70 for the area to which halftone matte is designated, the clear toner plane image data used by the low temperature fixing unit 90 for the area to which matte is designated and each two bit CMYK image data which is obtained in step S3 and for which is the halftone processing is performed, and outputs to the MIC 60 the integrated image data and the on/off information which indicates off of the glosser 80.

The MIC 60 outputs to the printer 70 the CMYK color plane image data which is the image data outputted from the DFE 50, the clear toner plane image data used by the printer 70 for the area to which solid gloss is designated and the clear toner plane image data used by the printer 70 for the area to which halftone matte is designated, and powers off the glosser 80 using the on/off information outputted from the DFE 50. Further, the MIC 60 outputs to the low temperature fixing unit 90 the clear toner plane image data used by the low temperature fixing unit 90 for the area to which matte is designated among the image data outputted from the DFE 50.

The printer 70 forms on a transfer sheet an image to which CMYK toners and clear toner are adhered, using the CMYK color plane image data outputted from the MIC 60, the clear toner plane image data used by the printer 70 for the area to which solid gloss is designated and the clear toner plane image data used by the printer 70 for the area to which halftone matte is designated. The glosser 80 is powered off, and therefore the transfer sheet is not subsequently pressed at a high temperature and a high pressure.

Further, the low temperature fixing unit 90 forms a toner image of clear toner on the matte area using the clear toner plane image data outputted from the MIC 60 for the area to which matte is designated, superimposes the toner image on the transfer sheet and fixes the toner image on the transfer sheet by way of heating and pressing at a low temperature.

As a result, in the area to which solid gloss is designated as a surface effect in one page, the total amount of adhered CMYK toners and clear toner are comparatively uniform, so that it is possible to provide strong gloss on the surface of the area. Further, halftone is applied by clear toner to the area to which halftone matte is designated as a surface effect in one page, so that concavities and convexities are produced on the surface and gloss on the surface of the area is suppressed. Furthermore, in an area to which matte is designated as a surface effect in one page, clear toner of the solid mask adheres and concavities and convexities are produced on a surface, so that gloss on the surface of the area is suppressed.

Although, when a plurality of types of different surface effects is designated in an identical page, if the glosser 80 does not need to be powered on or off according to a surface effect, it is possible to realize a plurality of different surface effects in one page, a plurality of different surface effects for which the glosser 80 needs to be switched between on and off in the identical page cannot be realized in one page.

For example, in the present embodiment employing a configuration including the printer 70, the glosser 80 and the low temperature fixing unit 90, when mirror gloss (PG) and solid gloss (G) are designated in one page, as illustrated in FIG. 15, the glosser 80 is powered on upon mirror gloss (PG) and the glosser 80 is powered off upon solid gloss (G), so that two types of surface effects of mirror gloss (PG) and solid gloss (G) cannot be realized in one page.

Thus, when different types of surface effects cannot be realized in one page even though the different types of surface effects are designated in one page, in the present embodiment, the DFE 50 substitutes part of types of surface effects of surface effects which cannot be simultaneously realized, with surface effects other than the designated surface effects.

Figure 19:
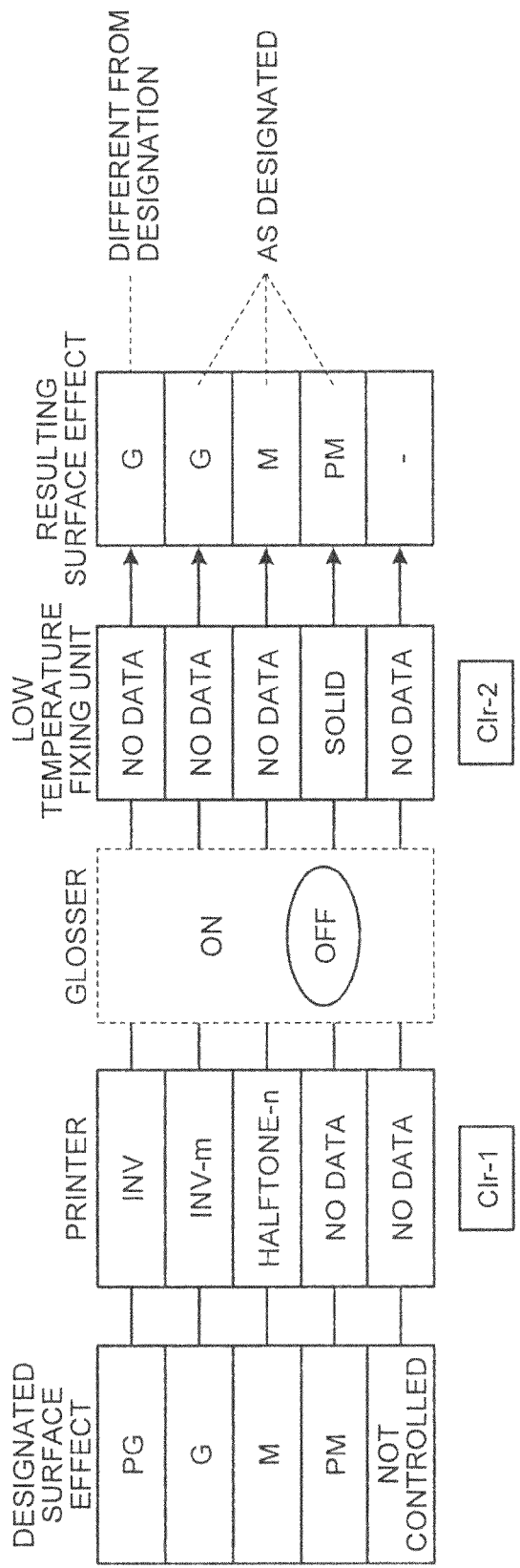
FIG. 19 is a view illustrating contrasts among a type of a designated surface effect, clear toner plane image data used by a printer, clear toner plane image data used by a low temperature fixing unit and a surface effect which is actually obtained.

When, for example, four effects of mirror gloss (PG), solid gloss (G), halftone matte (M) and matte (PM) are designated in one page as illustrated in FIG. 19, the DFE 50 powers off the glosser 80, and realizes each surface effect for the area the surface effect of which is decided to be solid gloss, the area the surface effect of which is decided to be halftone matte and the area the surface effect of which is decided to be matte according to density values of the gloss control plane, and selects solid gloss as an alternate surface effect for the area the surface effect of which is decided to be mirror gloss. Further, similar to the case of solid gloss, the DFE 50 generates for the area the surface effect of which is decided to be mirror solid one of inverse masks A, B and C as the clear toner plane image data used by the printer 70 (corresponding to INV in FIG. 19) using the image data matching the area in each gamma corrected eight bit CMYK image data. The clear toner plane image data used by the low temperature fixing unit 90 is not generated. In FIG. 15, when the density value is "248" to "255", the DFE 50 decides an effect of the density value as mirror floss type A, and uses the inverse mask A. Further, INV-m in FIG. 19 corresponds to inverse masks 1 to 4 in FIG. 15, and halftone-n in FIG. 19 corresponds to halftones 1 to 4 in FIG. 15. Furthermore, on the transfer sheet discharged through the printer 70, the powered off glosser 80 and the low temperature fixing unit 90 as described above, a surface effect of solid gloss is applied to an area to which mirror gloss is designated and an area to which solid gloss is designated, a surface effect of halftone matte is applied to an area to which halftone matte is designated and a surface effect of matte is applied to an area to which matte is designated. In addition, no surface effect is applied to an area which is not designated as an area to which a surface effect is applied.

As described above, the DFE 50 decides whether or not the post-processors perform post-processing according to whether or not there are post-processors such as the glosser 80 and the low temperature fixing unit 90 subsequent to the printer 70 and types of the glosser 80 and the low temperature fixing unit 90 using the gloss control plane to which a density value is set according to a type of a surface effect designated by the user, and adequately generates clear toner plane image data for adhering clear toner. By this means, it is possible to generate clear toner plane image data for applying a common surface effect in image formation systems employing various configurations, and apply various surface effects by adhered clear toner to an image formed by CMYK toner images using the clear toner plane image data. Consequently, it is possible to apply a desired surface effect using clear toner to a printed material on which an image is formed, without requiring user's labor.

Further, in the present embodiment, a density value for specifying a surface effect is set per pixel of gloss control plane image data, so that a plurality of types of surface effects can be applied in one page of a transfer sheet.

Next, detail content of gamma correction performed by the TRC 53 will be described. Meanwhile, the si1 unit 52 according to the present embodiment decides a surface effect which is designated to each pixel which forms a gloss control plane using an eight bit gloss control plane converted by the rendering engine 51 and referring to the above-described surface effect selection table. Each pixel which forms the gloss control plane corresponds to each pixel which forms each CMYK color plane image data (color plane data), and the si1 unit 52 can specify for each CMYK color plane data an area to which a surface effect is designated and a type of the surface effect designated to the area.

Further, the si1 unit 52 outputs to the TRC 53 each eight bit CMYK color plane data, the area to which the surface effect is designated and information (referred to as "surface effect information") which allows a type of the surface effect designated to the area to be specified, while outputting the eight bit gloss control plane to the clear processing 56. For each CMYK color plane data, the TRC 53 can specify the area to which the surface effect is designated and the type of the surface effect designated to the area based on each CMYK color plane data and surface effect information inputted from the si1 unit 52. In addition, although the si1 unit 52 generates surface effect information in this example, the present invention is not limited to this, and, for example, the rendering engine 51 may generate surface effect information. Further, for example, a configuration may be employed where the si1 unit 52 outputs to the TRC 53 each CMYK color plane data and, in addition, an eight bit gloss control plane converted by the rendering engine 51, and the TRC 53 decides for each CMYK color plane data an area to which a surface effect is designated and a type of the surface effect designated to the area, using the inputted gloss control plane and the above-described surface effect selection table.

Per combination of each color of CMYK and a surface effect, the gamma correction storage unit 206 stores a first gamma curve (a gamma curve used to gamma correct color plane data) which varies according to this combination. More specifically, the gamma correction storage unit 206 stores a first gamma curve which indicates a relationship between a density value of color plane data of a color which is not yet gamma corrected by the TRC 53 and a density value of color plane data of a color which is gamma corrected by the TRC 53 per combination of each color of CMYK and a density value of a gloss control plate for applying a surface effect. The first gamma curves stored in the gamma correction storage unit 206 can be changed by calibration processing described below. In this example, for each of 12 types of combinations of C (cyan)+PG (mirror gloss), C (cyan)+G (solid gloss), C (cyan)+M (halftone matte), M (magenta)+PG (matte), M (magenta)+G (solid gloss), M (magenta)+M (halftone matte), Y (yellow)+PG (mirror gloss), Y (yellow)+G (solid gloss), Y (yellow)+M (halftone matte), K (black)+PG (mirror gloss), K (black)+G (solid gloss), K (black)+M (halftone matte), the gamma correction storage unit 206 stores at least one first gamma curve associated with this combination. Further, the gamma correction storage unit 206 also stores each CMYK gamma curve (also referred to as a "default gamma curve")

which is not used in combination with surface effects. The default gamma curve can be generated by the same calibration as conventional calibration. The gamma correction storage unit 206 according to the present embodiment corresponds to a "second storage unit" in the claims.

The TRC 53 specifies the area to which the surface effect is designated and a type of the surface effect for each inputted color plane of CMYK, reads from the gamma correction storage unit 206 a default gamma curve associated with the color plane data for an area to which the surface effect is not designated among the color plane data, and performs gamma correction according to the read default gamma curve. Meanwhile, for the area to which a surface effect is designated in each color plane data, a first gamma curve determined according to a combination of a color of the color plane data and a density value of the gloss control plane in the area is read from the gamma correction storage unit 206, and gamma correction (an example "first gradation correction") is performed according to the read first gamma curve. The TRC 53 according to the present embodiment corresponds to a "first gradation correction unit" in the claims.

That is, the TRC 53 performs different gamma correction of each CMYK color plane data according to the combination of the color of the color plane data and the surface effect. By this means, it is possible to realize adequate color representation according to a combination with the surface effect.

Figure 20:
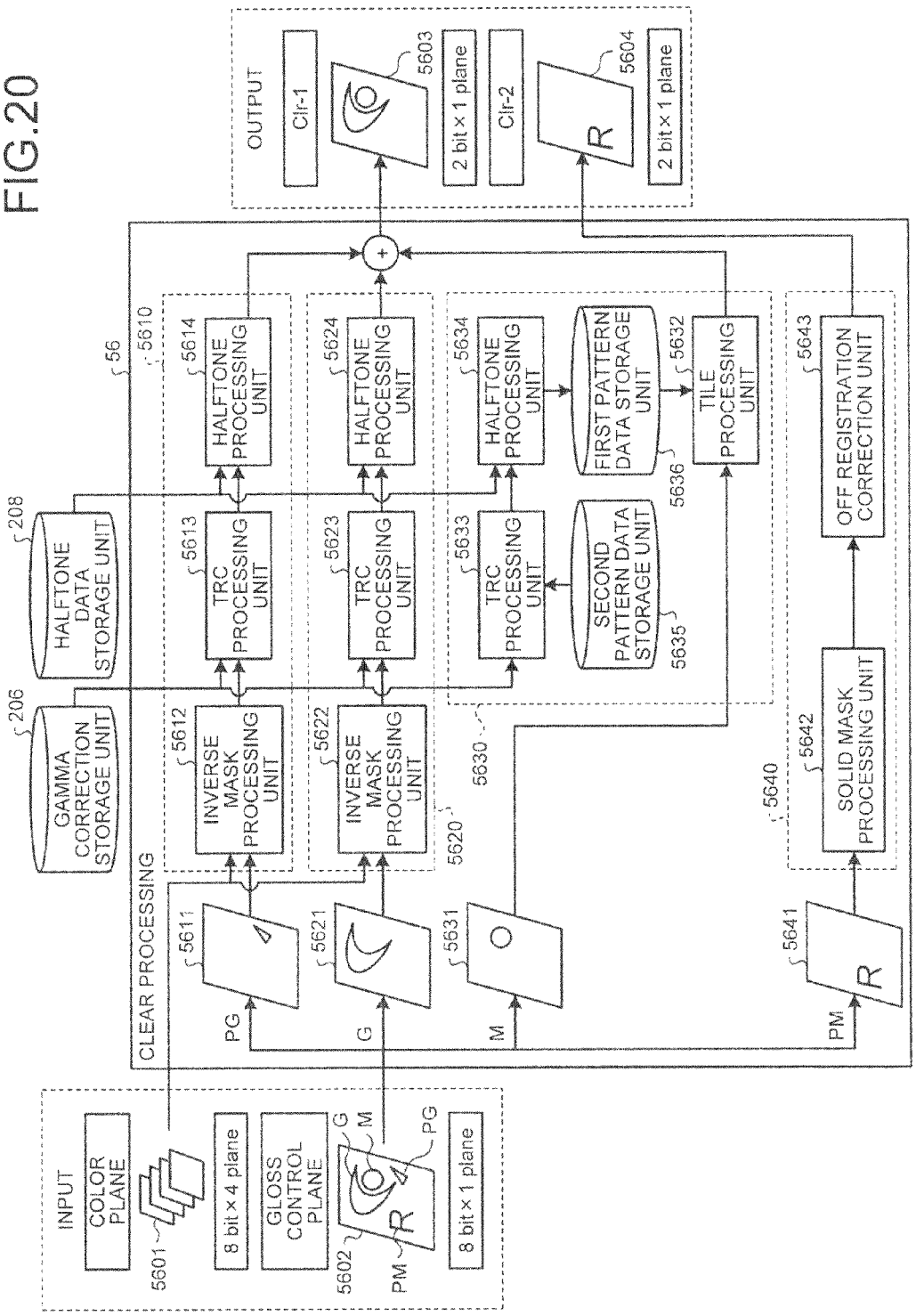
FIG. 20 is a view conceptually illustrating a function of a clear processing.

Next, a detail function of the clear processing 56 will be described. FIG. 20 is a view conceptually illustrating a function of the clear processing 56. As described above, the clear processing 56 receives an input of an eight bit gloss control plane 5602 converted by the rendering engine 51 through the si1 unit 52, and receives an input of each eight bit image data (referred to as "color plane" below) 5601 of CMYK gamma corrected by the TRC 53 through the sit unit 54. Hereinafter, the gloss control plane 5602 to which four effects of mirror gloss (PG), solid gloss (G), halftone matte (M) and matte (PM) are designated in an identical page will be described as an example.

Different processing is performed per area to which each of the four surface effects (PG, G, M and PM) are designated, and the gloss control plane 5602 is converted into image data Clr-1 of a clear toner plane used by the printer 70 and image data Clr-2 of a clear toner plane used by the low temperature fixing unit 90. More details will be described below.

The clear processing 56 refers to the surface effect selection table, and specifies a PG area which is a PG designated area, a G area which indicates a G designated area, an M area which indicates an M designated area and a PM area which indicates a PM designated area in the gloss control plane 5602. Further, the clear processing 56 generates a PG gloss control plane 5611, a G gloss control plane 5621, an M gloss control plane 5631 and a PM gloss control plane 5641 from the gloss control plate 5602.

Although each pixel which forms the PG gloss control plane 5611 corresponds to each pixel of the gloss control plane 5602, and density values (or density percentages) of pixels in the PG area of the PG gloss control plane 5611 are identical to density values of pixels in the PG area of the original gloss control plane 5602, density values of pixels in an area other than the PG area of the PG gloss control plane 5611 are set to "0".

Although each pixel which forms the G gloss control plane 5621 corresponds to each pixel of the gloss control plane 5602, and density values of pixels in the G area of the G gloss control plane 5621 are identical to density values of pixels in the G area of the original gloss control plane 5602, density values of pixels in an area other than the G area of the G gloss control plane 5621 are set to "0".

Although each pixel which forms the M gloss control plane 5631 corresponds to each pixel of the gloss control plane 5602, and density values of pixels in the M area of the M gloss control plane 5631 are identical to density values of pixels in the M area of the original gloss control plane 5602, density values of pixels in an area other than the M area of the M gloss control plane 5631 are set to "0".

Although each pixel which forms the PM gloss control plane 5641 corresponds to each pixel of the gloss control plane 5602, and density values of pixels in the PM area of the PM gloss control plane 5641 are identical to density values of pixels in the PM area of the original gloss control plane 5602, density values of pixels in an area other than the PM area of the PM gloss control plane 5641 are set to "0".

Further, as illustrated in FIG. 20, the clear processing 56 has a PG convert unit 5610 which converts the PG gloss control plane 5611 into a two bit Clr-PG plane, a G convert unit 5620 which converts the G gloss control plane 5621 into a two bit Clr-G plane, the M convert unit 5630 which converts the M gloss control plane 5631 into a two bit Clr-M plane and a PM convert unit 5640 which converts the PM gloss control plane 5641 into a two bit Clr-PM plane.

First, processing of converting the PG gloss control plane 5611 into the Clr-PG plane will be described. As illustrated in FIG. 20, the PG convert unit 5610 has an inverse mask processing unit 5612, a TRC processing unit 5613 and a halftone processing unit 5614.

The inverse mask processing unit 5612 performs processing (inverse mask processing) of converting a density value of each pixel in the PG area included in the PG gloss control plane 5611 into a density value represented by a PG inverse mask (one of the inverse masks A, B and C) using image data of a portion matching the PG area of the color plane 5601. By this means, the PG gloss control plane 5611 is converted into eight bit clear toner plane image data. The eight bit clear toner plane image data obtained by the inverse mask processing of the inverse mask processing unit 5612 can also be regarded as clear toner plane image data matching a PG designated area (PG area) of the gloss control plane 5611.

The TRC processing unit 5613 performs TRC processing of the PG gloss control plane 5611 for which the inverse mask processing is performed by the inverse mask processing unit 5612 (eight bit clear toner plane image data obtained by the inverse mask processing of the inverse mask processing unit 5612). More specifically, the TRC processing unit 5613 reads per color of CMYK from the gamma correction storage unit 206 a second gamma curve which is determined according to a combination of the color and the density value of the PG gloss control plane 5611 (the density value associated with PG), and gamma corrects (an example of "second gradation correction") the PG gloss control plane 5611 for which the inverse mask processing is performed, according to the second gamma curve obtained by a weighted average of four types of the second gamma curves read from the gamma correction storage unit 206. In addition, the present invention is not limited to this, and a configuration may be employed where, for example, gamma correction is performed using a second gamma curve which is determined according to a combination of one of CMYK and PG.

Per combination of each color of CMYK and a surface effect, the gamma correction storage unit 206 stores the second gamma curve which varies per combination. More specifically, per combination of each color of CMYK and a density value of a gloss control plane, the gamma correction storage unit 206 stores a second gamma curve which indicates a relationship between a density value of the gloss control plane, a density value of color plane data of the color and a gloss level. The second gamma curves stored in the gamma correction storage unit 206 can be changed by calibration processing described below. In this example, per combination of 12 types of C+PG, C+G, C+M, M+PG, M+G, M+M, Y+PG, Y+G, Y+M, K+PG, K+G and K+M, the gamma correction storage unit 206 stores at least one second gamma curve associated with this combination. The gamma correction storage unit 206 in the present embodiment corresponds to a "fourth storage unit" in the claims. In addition, although the first gamma curves and the second gamma curves are stored in the gamma correction storage unit 206 in the present embodiment, the present invention is not limited to this, and a configuration may be employed where, for example, the first gamma curves and the second curves are stored in different storage devices.

Further, the halftone processing unit 5614 reads dither data from the halftone data storage unit 208, and performs halftone processing of the gamma corrected image data using the read dither data. Thus, the PG gloss control plane 5611 is converted into two bit image data (Clr-PG plane).

Next, processing of converting the G gloss control plane 5621 into the Clr-PG plane will be described. As illustrated in FIG. 20, the G convert unit 5620 has an inverse mask processing unit 5622, a TRC processing unit 5623 and a halftone processing unit 5624.

The inverse mask processing unit 5622 performs processing (inverse mask processing) of converting a density value of each pixel in the G area included in the G gloss control plane 5621 into a density represented by a G inverse mask (one of the inverse masks 1, 2, 3 and 4) using image data of a portion matching the G area of the color plane 5601. By this means, the G gloss control plane 5621 is converted into eight bit clear toner plane image data. The eight bit clear toner plane image data obtained by the inverse mask processing of the inverse mask processing unit 5622 can also be regarded as clear toner plane image data matching a G designated area (G area) of the gloss control plane 5611.

The TRC processing unit 5623 performs TRC processing of the G gloss control plane 5621 for which the inverse mask processing is performed by the inverse mask processing unit 5622 (eight bit clear toner plane image data obtained by the inverse mask processing of the inverse mask processing unit 5622). More specifically, the TRC processing unit 5623 reads per color of CMYK from the gamma correction storage unit 206 a second gamma curve which is determined according to a combination of the color and the density value of the G gloss control plane 5621 (the density value associated with G), and gamma corrects the G gloss control plane 5621 for which the inverse mask processing is performed, according to the second gamma curve obtained by a weighted average of four types of the second gamma curves read from the gamma correction storage unit 206.

Further, the halftone processing unit 5624 reads dither data from the halftone data storage unit 208, and performs halftone processing of the gamma corrected image data using the read dither data. Thus, the G gloss control plane 5621 is converted into two bit image data (Clr-G plane).

Next, processing of converting the M gloss control plane 5631 into the Clr-M plane will be described. As illustrated in FIG. 20, the M convert unit 5630 has a tile processing unit 5632, a first pattern data storage unit 5636, a second pattern data storage unit 5635, a TRC processing unit 5633 and a halftone processing unit 5634. The tile processing unit 5632 reads from the first pattern data storage unit 5636 the M pattern data associated with the density value of the pixel in the M area included in the M gloss control plane 5631 referring to the surface effect selection table, and performs tile processing using the read pattern data.

In this example, the M pattern data stored in the first pattern data storage unit 5636 is image data obtained by performing image processing of the original pattern data, and each pixel is represented by two bits.

The original pattern data is eight bit image data, and a plurality of types of items of original pattern data associated with a density value of a gloss control plane is stored in the second pattern data storage unit 5635. The TRC processing unit 5633 performs TRC processing of the original pattern data stored in the second pattern data storage unit 5635. More specifically, the TRC processing unit 5623 reads per color of CMYK from the gamma correction storage unit 206 a second gamma curve which is determined according to a combination of the color and the density value of the gloss control plane (the density value associated with M) associated with a processing target original pattern data, and gamma corrects the original pattern data, according to the second gamma curve obtained by a weighted average of four types of the second gamma curves read from the gamma correction storage unit 206. Further, the halftone processing unit 5634 reads dither data from the halftone data storage unit 208, and performs halftone processing of the gamma corrected image data using the read dither data. By this means, two bit pattern data (M pattern data) is obtained. The M pattern data is associated with the density value of the gloss control plane, and is stored in the first pattern data storage unit 5636.

Figure 21:
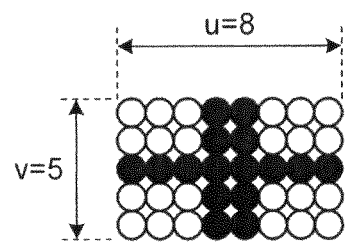
FIG. 21 is a view illustrating an example of a pattern image.
Figure 22:
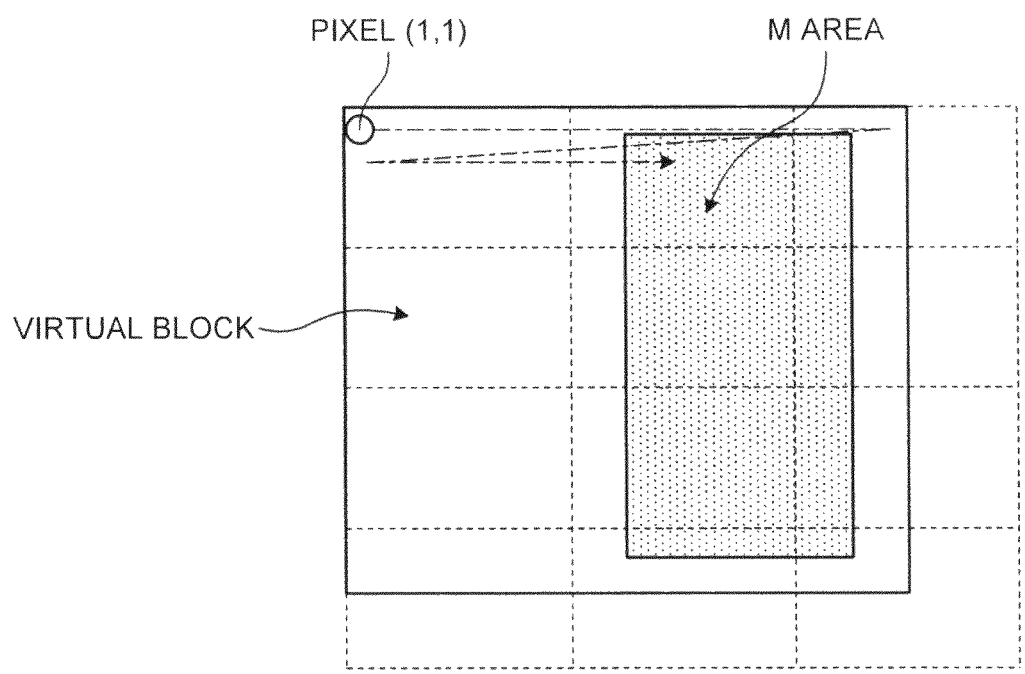
FIG. 22 is a view for explaining tile processing.

Hereinafter, specific content of the tile processing will be described. Hereinafter, a case will be described as an example where a pattern image in FIG. 21 is used. The tile processing unit 5632 reads from the first pattern data storage unit 5636 pattern data (the pattern image in FIG. 21) associated with density values of pixels in the M area included in the M gloss control plane 5631, and divides the M gloss control plane 5631 in virtual blocks of a size of the read pattern image. In the example in FIG. 22, the M gloss control plane 5631 is configured with a plurality of pixels aligned in a matrix pattern of 17 rows×20 columns. In other words, a width w of the M gloss control plane 5631 corresponds to 20 pixels, and a height h corresponds to 17 pixels. In the example in FIG. 22, 2.5 (=20/8) virtual blocks are included in a row direction (horizontal direction) of the M gloss control plane 5631, and 3.4 (=17/5) virtual blocks are included in a column direction (vertical direction). Hereinafter, a pixel positioned at a y-th (1≤y≤17) column of an x-th (1≤x≤20) of the M gloss control plane 5631 is represented as a pixel (x, y).

Next, the tile processing unit 5632 executes processing ("tile processing") of calculating a density value of each pixel in the M area when the pattern image is allocated to each divided area. By this means, the M gloss control plane 5631 is converted into two bit image data. This two bit image data is referred to as a "Clr-M plane". This tile processing is performed per pixel sequentially from an upper left pixel (1,1) positioned in FIG. 22 according to an order indicated by a chain line arrow. Hereinafter, using a pixel (12,12) included in the M area as an example, the tile processing executed with respect to the pixel will be described. In addition, density values of pixels included in an area other than the M area are set to "0".

Figure 23:
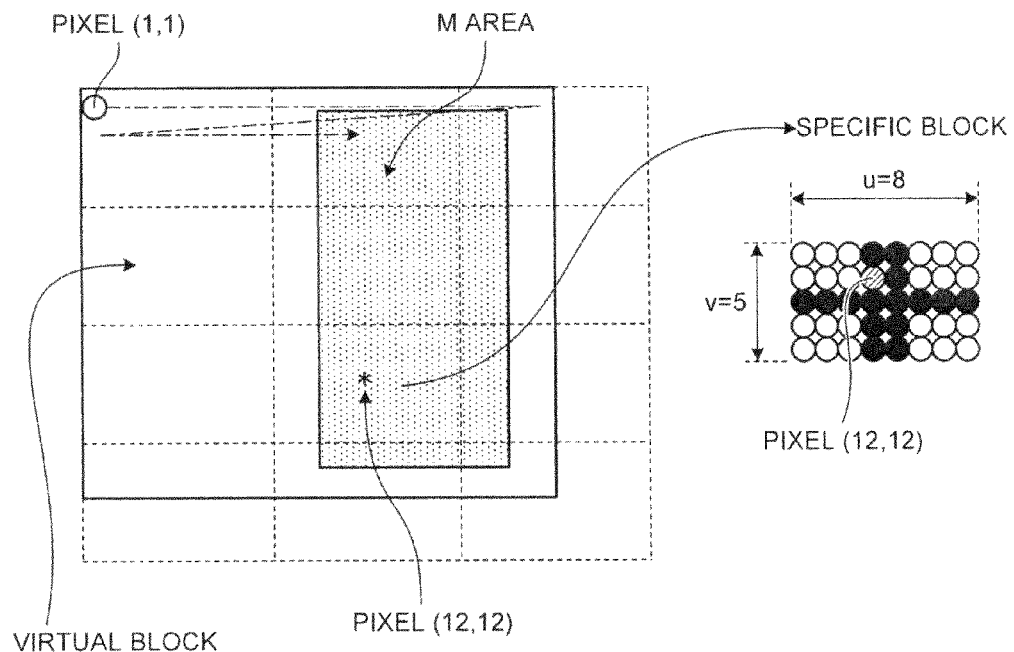
FIG. 23 is a view for explaining the tile processing.

First, the tile processing unit 5632 specifies the position of the pixel (12,12) in the virtual block (referred to as a "specific block" for ease of description) to which the pixel belongs. The pixel (12,12) is positioned in the 12th row in the row direction and the number of rows (the height v) of one virtual block is 5 (see FIG. 21), and "2" which is a remainder of 12/5 is specified as the position of the pixel in the row direction in the specific block. Similarly, the pixel (12,12) is positioned in the 12th column in the column direction and the number of columns (width u) in one virtual block is 8 (see FIG. 21), and "4" which is a remainder of 12/8 is specified as the position of the pixel in the column direction in the specific block. Hence, in this case, as illustrated in FIG. 23, the position of the pixel (12,12) is specified as the second row and the fourth column in the specific block. Further, as is understood from FIG. 21, a density value of the pixel positioned in the second row and the second column among a plurality of pixels which forms a pattern image is "255", and the density value of the pixel (12,12) is determined as "255".

Figure 24:
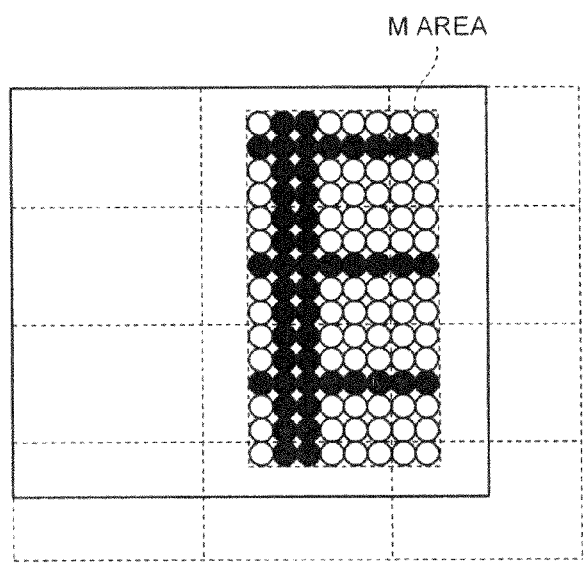
FIG. 24 is a view illustrating an example of two bit image data obtained by the tile processing.

FIG. 24 is a view illustrating a density value of each pixel in the M area calculated by repeating the above tile processing, and white circle pixels indicate pixels to which the density value "0" is set and black circle pixels indicate pixels to which the density value "255" is set. Thus, the Clr-M plane is generated.

The clear processing 56 generates and outputs a clear toner plane Clr-1 (a clear toner plane 5603) used by the printer 70 by synthesizing the Clr-PG plane, Clr-G plane and Clr-M plane generated as described above.

Next, processing of converting the PM gloss control plane 5641 into the Clr-PM plane will be described. As illustrated in FIG. 20, the PM convert unit 5640 has a solid mask processing unit 5642 and an off registration correction unit 5643. The solid mask processing unit 5642 performs solid mask processing of image data of the PM area included in the PM gloss control plane 5641. By this means, the PM gloss control plane 5641 is converted into two bit image data (Clr-PM plane). The Clr-PM plane obtained by the solid mask processing can also be regarded as the clear toner plane image data associated with a PM designated area (PM area) of the gloss control plane 5611.

Although the solid mask processing is basically processing of assigning "11 (binary)" to a processing target pixel (each pixel in the PM area), the solid mask processing includes a plurality of patterns of assigning "01" to part of pixels and changing a condition of solid. In addition, although the Clr-PM plane obtained by solid mask processing is not gamma corrected, a second gamma curve associated with a combination of each color of CMYK and PM is not necessary.

Further, the Clr-PM plane is sent out to the low temperature fixing unit 90 which is separated from the printer 70, and therefore there is a likelihood that off registration from a color plane occurs depending on conveyance precision. Hence, in the present embodiment, the off registration correction unit 5643 performs off registration correction of moving the Clr-PM plane in parallel. Further, the Clr-PM plane after off registration correction is outputted as a clear toner plane Clr-2 (a clear toner plane 5604) used by the low temperature fixing unit 90.

As described above, the clear processing 56 gamma corrects the clear toner plane image data associated with the PG area of the gloss control plane 5611 (eight bit clear toner plane image data obtained by inverse mask processing of the inverse mask processing unit 5612) according to a second gamma curve determined according to a combination of each color of CMYK and a density value of the gloss control plane for applying PG, gamma corrects the clear toner plane image data associated with the G area (eight bit clear toner plane image data obtained by inverse mask processing of the inverse mask processing unit 5622) according to a second gamma curve determined according to a combination of each color of CMYK and a density value of the gloss control plane for applying G, and gamma corrects the clear toner plane image data associated with the M area (the original pattern data associated with the density value of each pixel in the M area) according to a second gamma curve determined according to a combination of each color of CMYK and a density value of the gloss control plane for applying M. That is, it can be regarded that the clear processing 56 has second gradation correction units (TRC processing units 5613, 5623 and 5633) which perform gamma correction (an example of "second gradation correction") which varies per combination of a color of color plane data and a surface effect, with respect to an area of the gloss control plane 5602 to which a surface effect is designated. By this means, it is possible to realize an adequate gloss level according to a combination of the color of the color plane data and the surface effect.

Figure 25:
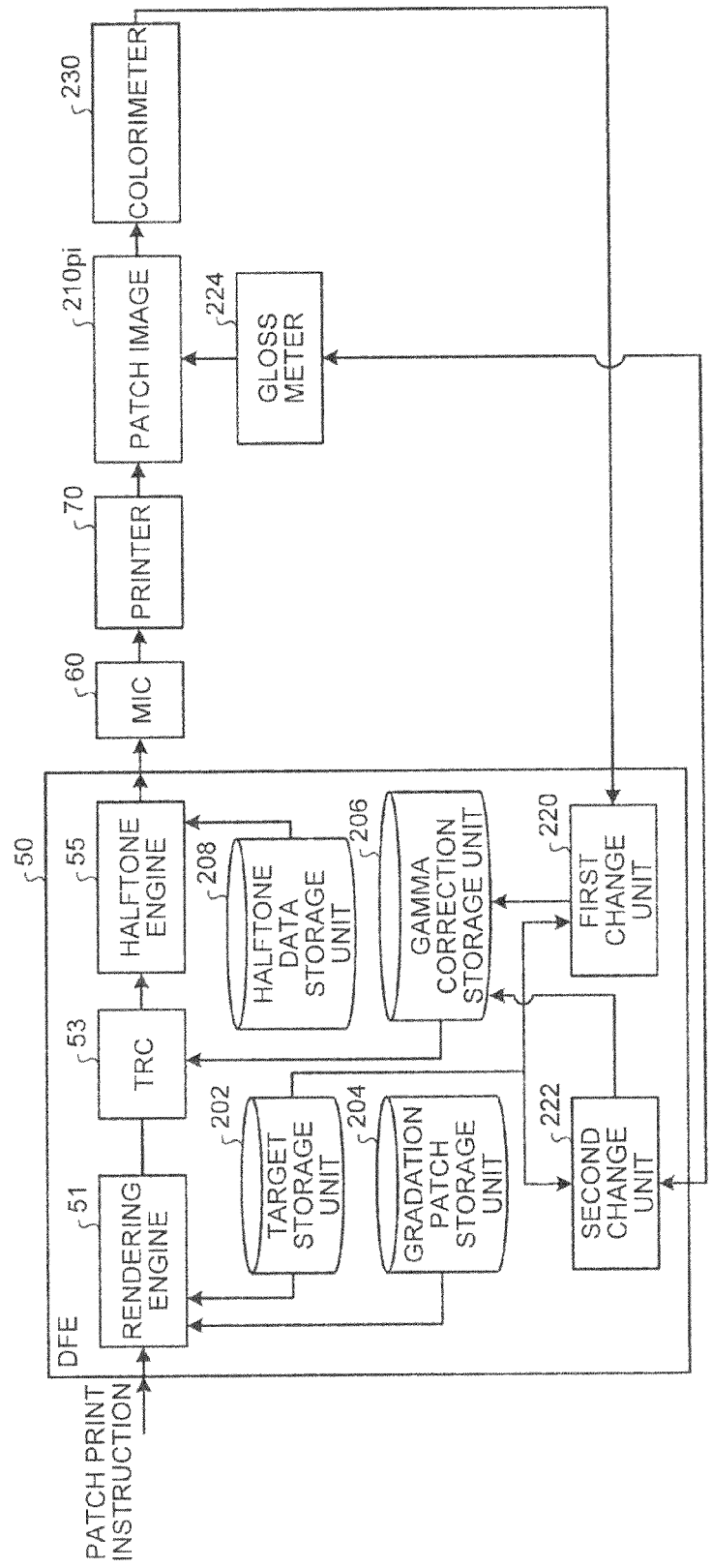
FIG. 25 is a view illustrating a detail functional configuration example of the clear processing.

Next, calibration processing performed by the image formation system according to the present embodiment will be described. The calibration processing refers to processing of setting gradation correction parameters, and, in this example, refers to processing of setting a first gamma curve and a second gamma curve. FIG. 25 is a view illustrating a configuration of the image formation system required for calibration processing. As illustrated in FIG. 25, the image formation system further has a gloss meter 224 which can measure a gloss level of an image formed on a transfer sheet and a colorimeter 230 which can measure a density value (which can also be regarded as a "color value") of a color of an image formed on a transfer sheet. Although the colorimeter 230 is formed with, for example, a spectroscopic colorimeter, the colorimeter 230 is not limited to this.

FIG. 25 illustrates only functions required for the calibration processing among the functions of the DFE 50. As illustrated in FIG. 25, the DFE 50 has the above-described rendering engine 51, TRC 53, halftone engine 55, gamma correction storage unit 206 and halftone data storage unit 208, and, in addition, a target storage unit 202, a gradation patch storage unit 204, a first change unit 220 and a second change unit 222.

Per combination of each color of CMYK and a surface effect, the target storage unit 202 stores first target information which indicates a relationship between a density value of color plane data of the color and a density value (first target) of the color which results from a printing result of this combination. More specifically, per combination of each color of CMYK and a density value of the gloss control plane, the target storage unit 202 stores the first target information associated with this combination. Per combination of 12 types of C+PG, C+G, C+M, M+PG, M+G, M+M, Y+PG, Y+G, Y+M, K+PG, K+G and K+M, the target storage unit 202 stores at least one first target information associated with this combination. The target storage unit 202 corresponds to a "first storage unit" in the claims. Further, the first target information corresponds to "first information" in the claims.

Further, per combination of each color of CMYK and a surface effect, the target storage unit 202 stores second target information which indicates a relationship between a density value of color plane data of the color and a gloss level (second target) which results from a printing result of this combination. More specifically, per combination of each color of CMYK and a density value of the gloss control plane, the target storage unit 202 stores the second target information. Per combination of 12 types of C+PG, C+G, C+M, M+PG, M+G, M+M, Y+PG, Y+G, Y+M, K+PG, K+G and K+M, the target storage unit 202 stores at least one second target information associated with this combination. The target storage unit 202 according to the present embodiment corresponds to a "third storage unit" in the claims. In addition, although the first target information and the second target information are stored in the target storage unit 202 in the present embodiment, the first target information and the second target information are not limited to this and, for example, may be configured to be stored in separate storage devices. Further, the second target information corresponds to "second information" in the claims.

Figure 26:
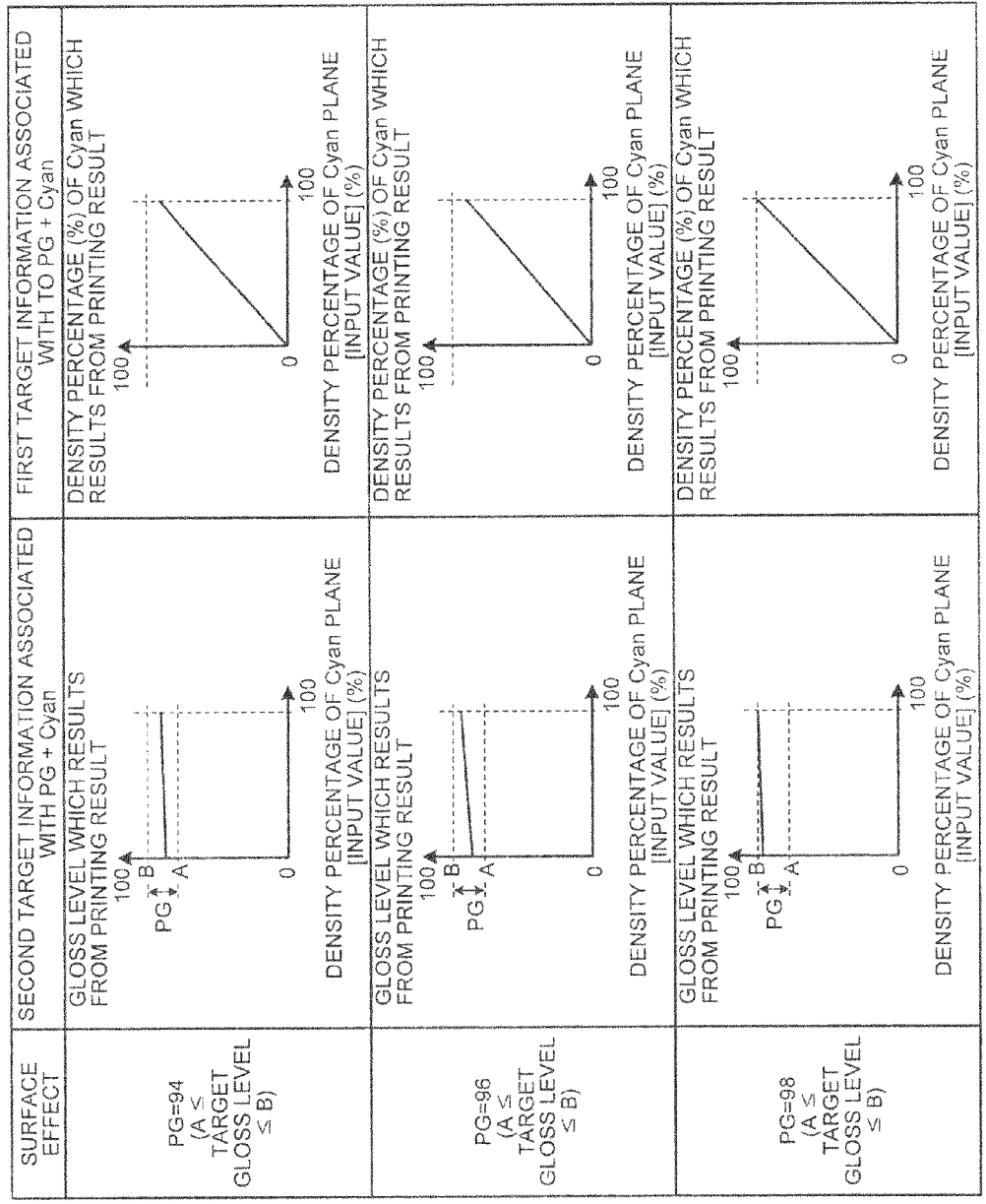
FIG. 26 is a view illustrating an example of first target information and second target information stored in a target storage unit.

FIG. 26 is a view illustrating an example of the first target information and the second target information associated with C (cyan)+PG (mirror gloss). As described above, in the present embodiment, each type of a surface effect is associated with a density percentage of a gloss control plane in 2% units, and, as is understood from FIG. 15, a density percentage of a gloss control plane associated with PG is 94% to 100%. FIG. 26 illustrates an example of first target information and second target information associated with a combination of C (cyan) and 94% of a density percentage of a gloss control plane, first target information and second target information associated with a combination of C (cyan) and 96% of a density percentage of a gloss control plane and first target information and second target information associated with a combination of C (cyan) and 98% of a density percentage of a gloss control plane. In addition, in the example in FIG. 26, a range of a density percentage of a gloss control plane associated with PG is defined by the surface selection table in FIG. 15, the range is not limited to this. In addition, the first target information and the second target information associated with other combinations (combinations other than C+PG) are defined likewise by the surface effect selection table, and will not be described in detail.

Per combination of each color of CMYK and a surface effect, the gradation patch storage unit 204 stores layout information which can specify a layout (a position and a shape of a patch image in a page) of a patch image used to set the above-described first gamma curve and second gamma curve (a gradation image used for calibration matching a combination of each color and a surface effect). Although detail content will be described below, when receiving a patch print instruction of instructing execution of printing of a patch image, the DFE 50 generates image data (referred to as "patch image data" below) of a patch image per combination of each color of CMYK and a surface effect, and outputs the generated patch image data to the printer 70 through the MIC 60. The printer 70 forms an image of mixed color adhered on a transfer sheet by superimposing colored toners and clear tone using the patch image data outputted from the MIC 60. By this means, a patch image 210pi is formed on the transfer sheet 210.

Figure 27:
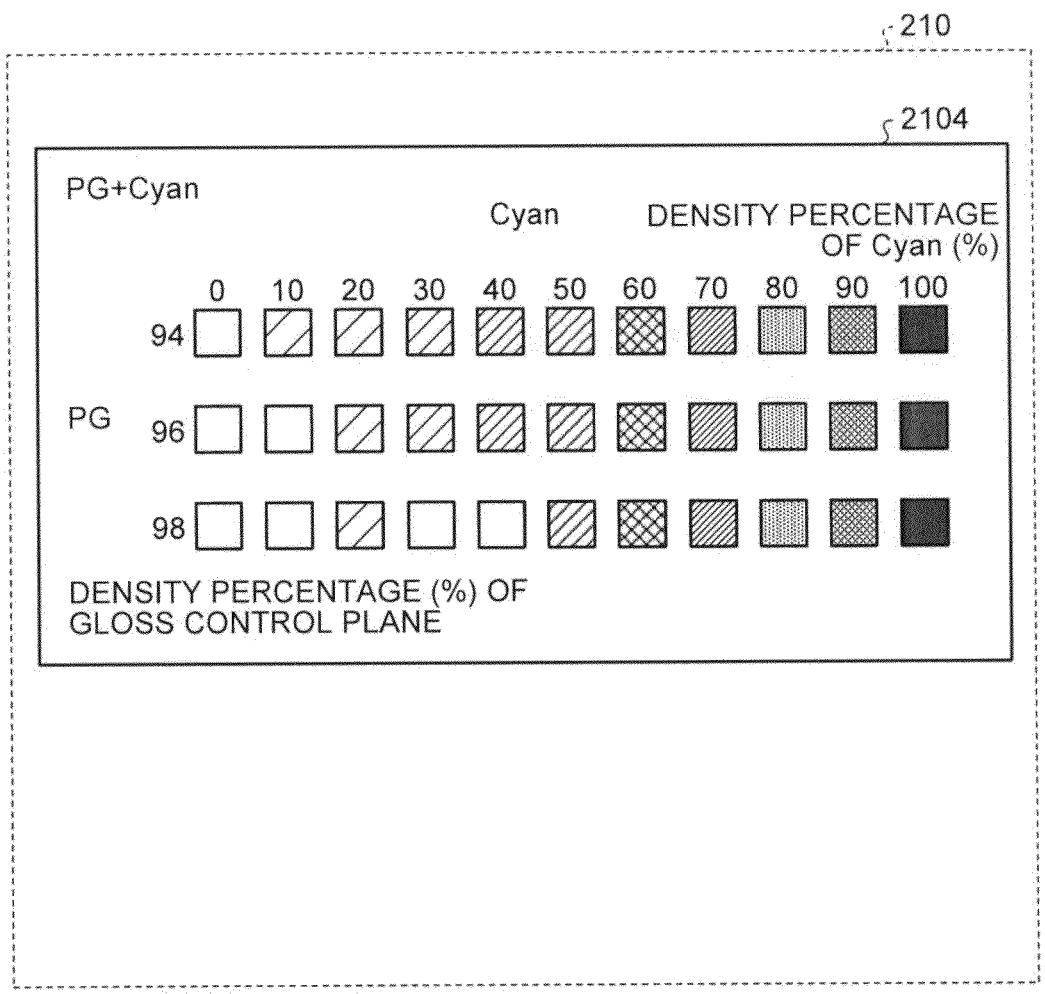
FIG. 27 is a view illustrating an example of a patch image printed on a transfer sheet.

FIG. 27 is a view illustrating an example of a patch image formed on one transfer sheet 210. In the example of FIG. 27, in an area 2104 of one transfer sheet (sheet) 210, a patch image matching a combination of C (cyan) and PG (mirror gloss) is formed. For ease of description, patch images matching other combinations are not illustrated. Meanwhile, although an example will be described where patch images matching all combinations are formed on one sheet, the present invention is not limited to this, and, for example, the patch images matching respective combinations may be formed on different sheets.

As illustrated in FIG. 27, the patch image matching the combination of C (cyan) and PG (mirror gloss) is a gradation image of mixed colors obtained by changing and superimposing a density percentage of a gloss control plane for applying PG as a surface effect and a density percentage of C plane image data. In the example in FIG. 27, the patch image matching the combination of C and PG is configured with a gloss control plane with 94% of a density percentage and 11 types of images on which C plane image data which changes at a density percentage in 10% units is superimposed (which can also be regarded as patch images matching combinations of cyan and 94% of the density percentage of the gloss control plane), a gloss control plane with 96% of a density percentage and 11 types of images on which C plane image data is superimposed (which can also be regarded as patch images matching combinations of cyan and 96% of the density percentage of the gloss control plane), and a gloss control plane with 98% of a density percentage and 11 types of images on which C plane image data is superimposed (which can also be regarded as patch images matching combinations of cyan and 98% of the density percentage of the gloss control plane).

Back to FIG. 25 again, the present invention will be described. Per combination of each color of CMYK and a surface effect (a density value of a gloss control plane) using a result obtained by the colorimeter 230 by measuring a density of a color of the patch image 210pi and first target information stored in the target storage unit 202, the first change unit 220 changes (updates) a first gamma curve stored in the gamma correction storage unit 206 such that a relationship (characteristics) indicated by the first target information is obtained.

Further, per combination of each color of CMYK and a surface effect (a density value of a gloss control plane) using a result obtained by the gloss meter 224 by measuring a gloss level of a patch image and second target information stored in the target storage unit 202, the second change unit 222 changes (updates) a second gamma curve stored in the gamma correction storage unit 206 such that a relationship (characteristics) indicated by the second target information is obtained.

Figure 28:
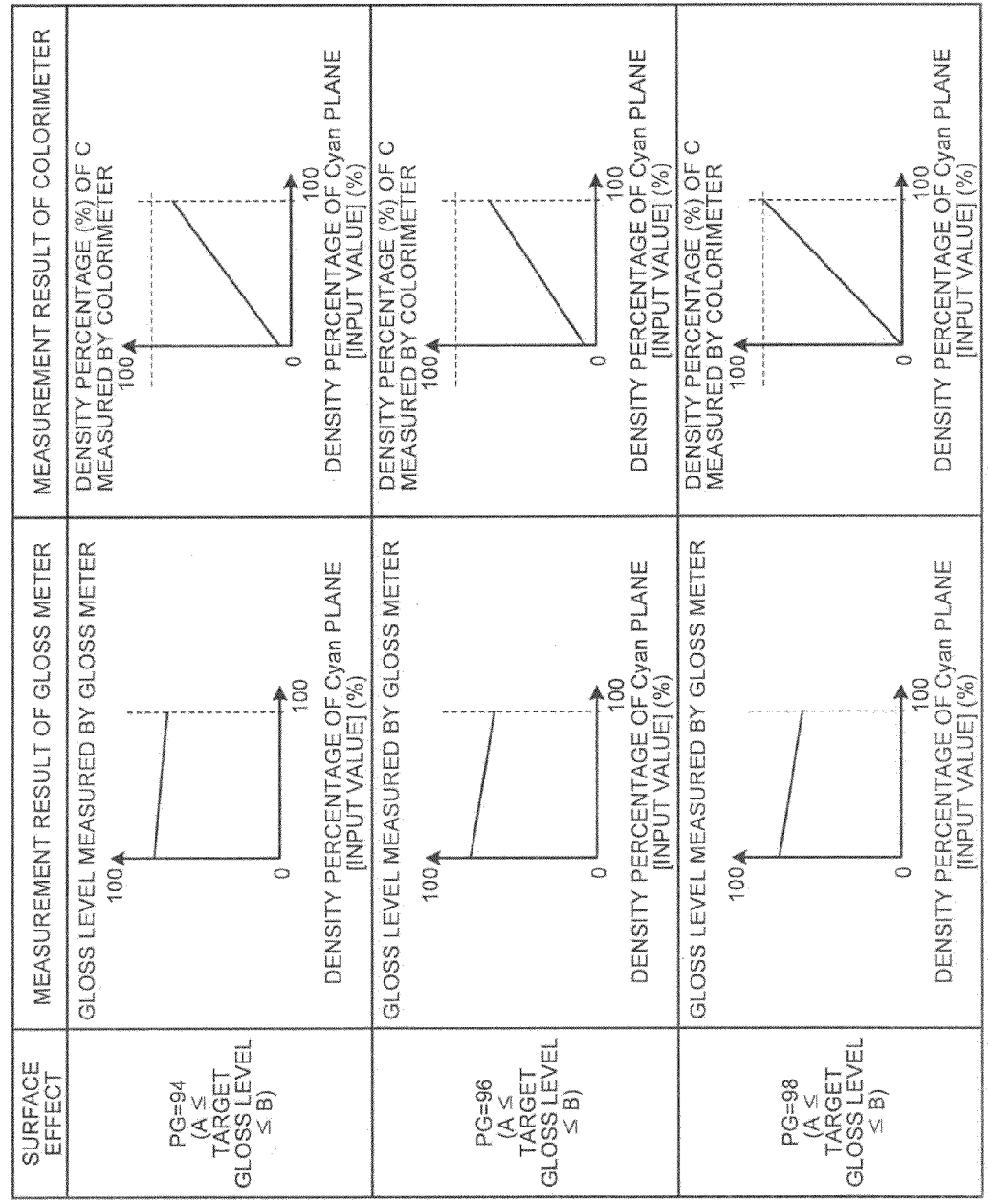
FIG. 28 is a view illustrating an example of a measurement result of a colorimeter and a measurement result of a gloss meter.

FIG. 28 is a view illustrating an example of a measurement result of the gloss meter 224 of the patch image matching C (cyan) and PG (mirror gloss) and a measurement result of the colorimeter 230. In this example, the measurement result of the gloss meter 224 is illustrated as data associating a density percentage of C plane image data and a gloss level measured by the gloss meter 224 per density percentage (94%, 96% and 98%) of the gloss control plane for applying PG in 2% units. For example, the second change unit 222 can also generate data associating the density percentage of C plane image data and a gloss level measured by the gloss meter 224 per density percentage (94%, 96% and 98%) of the gloss control plane for applying PG in 2% units, based on the measurement value of the gloss level passed from the gloss meter 224.

Further, for example, FIG. 28 illustrates the measurement result of the colorimeter 230 as data associating a density percentage of C plane image data and a density percentage of cyan (C) measured by the colorimeter 230 per density percentage (94%, 96% and 98%) of the gloss control plane for applying PG in 2% units. For example, the first change unit 220 can also generate data associating the density percentage of C plane image data and a density percentage of cyan (C) measured by the colorimeter 230 per density percentage (94%, 96% and 98%) of the gloss control plane for applying PG in 2% units, based on the measurement value of the color passed from the colorimeter 230.

Figure 29:
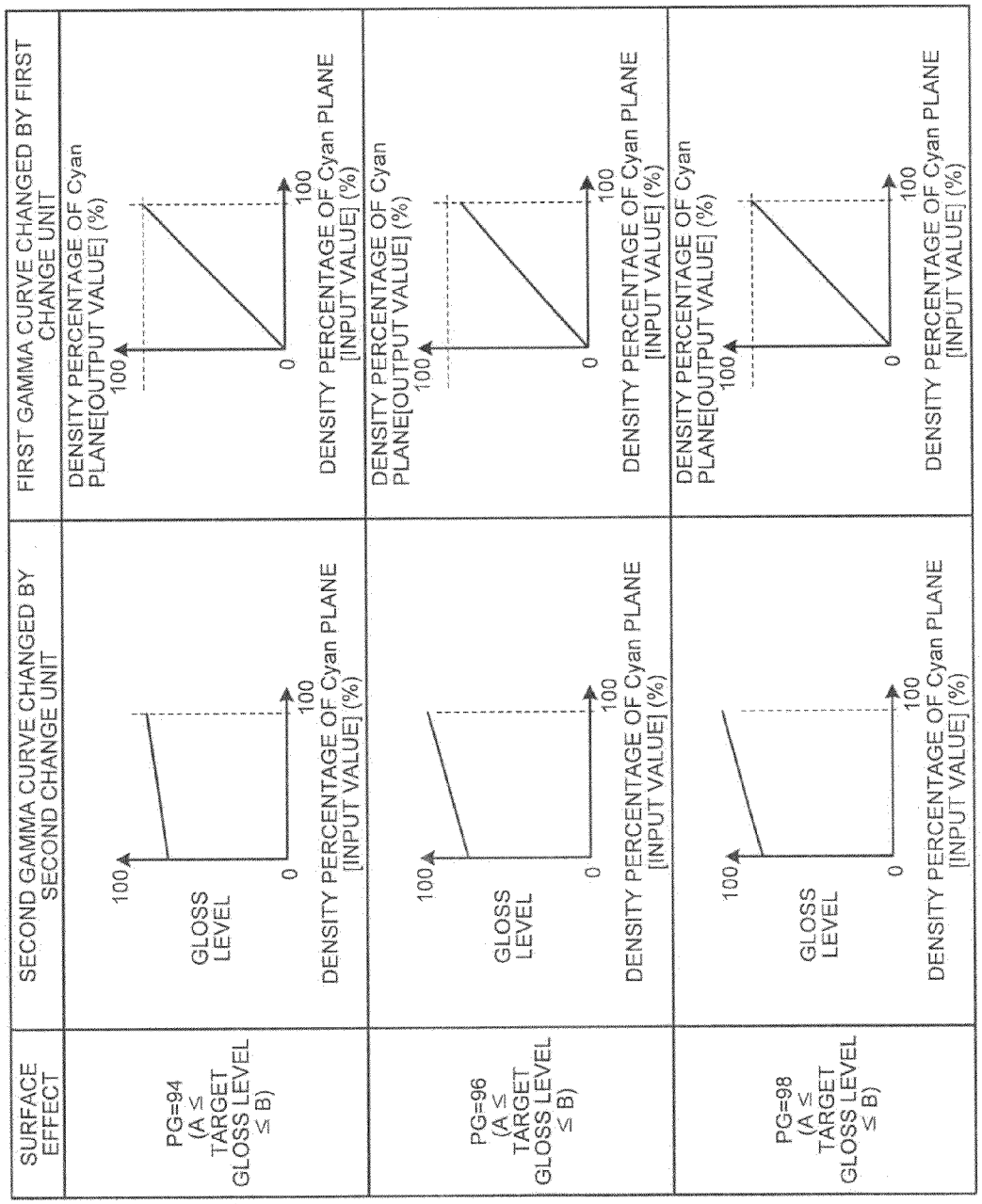
FIG. 29 is a view illustrating an example of a first gamma curve changed by a first change unit and a second gamma curve changed by a second change unit.

FIG. 29 is a view illustrating an example of a first gamma curve changed by the first change unit 220 and a second gamma curve changed by the second change unit 222. As is understood from FIGS. 26, 28 and 29, per combination of each color of CMYK and a density value of a gloss control plane using a measurement result of the colorimeter 230 and the first target information stored in the target storage unit 202, the first change unit 220 generates a first gamma curve associated with this combination such that a relationship indicated by the first target information associated with this combination is obtained. Further, instead of the first gamma curve registered in the gamma correction storage unit 206 so far, the first change unit 220 registers a newly generated first gamma curve.

Furthermore, as is understood from FIGS. 26, 28 and 29, per combination of each color of CMYK and a density value of a gloss control plane using a measurement result of the gloss meter 224 and the second target information stored in the target storage unit 202, the second change unit 222 generates a second gamma curve associated with this combination such that a relationship indicated by the second target information associated with this combination is obtained. Still further, instead of the second gamma curve registered in the gamma correction storage unit 206 so far, the second change unit 222 registers a newly generated second gamma curve.

Figure 30:
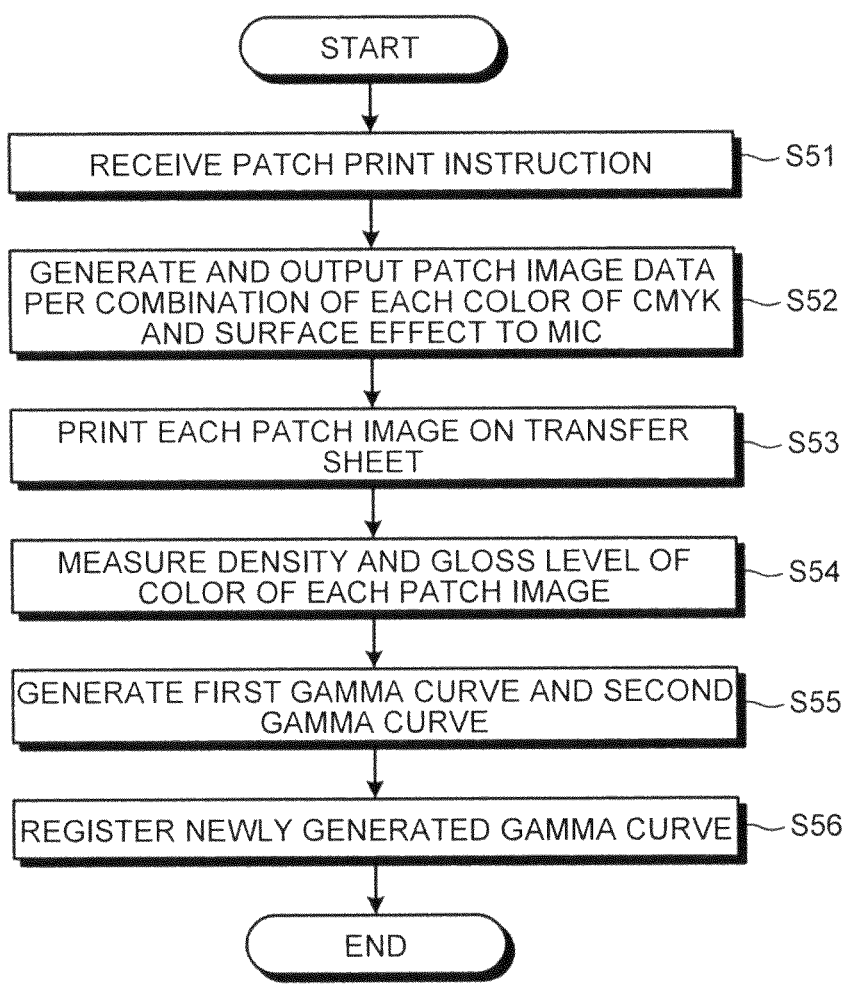
FIG. 30 is a flowchart illustrating an example of calibration processing.

Next, the calibration processing of the image formation system according to the present embodiment will be described with reference to FIG. 30. FIG. 30 is a flowchart illustrating an example of calibration processing of the image formation system according to the present embodiment. As illustrated in FIG. 30, the DFE 50 first receives a patch print instruction from, for example, the host device 10 (step S51).

In addition, although a patch print instruction is directed to instructing printing of patch images matching all combinations of each color of CMYK and a surface effect, the present invention is not limited to this, and, for example, the patch print instruction may be directed to instructing printing of a patch image matching a combination of one of colors and one of surface effects. That is, although a case will be described as an example where calibration is simultaneously performed for each of all combinations of each color of CMYK and a surface effect, the present invention is not limited to this, and, for example, it is also possible to perform only calibration matching a combination of one of colors and one of surface effects. When, for example, calibration matching only a combination of one of colors and PG, a patch print instruction may include on/off information which indicates on of the glosser 80 which is not illustrated and this on/off information may be outputted to the MIC 60 together with patch image data. Further, a patch image formed on a transfer sheet by the printer 70 is pressed at a high temperature and a high pressure by the glosser 80, so that a patch image of strong gloss is obtained.

Next, per combination of each color of CMYK and a surface effect, the DFE 50 generates patch image data using first target information and second target information stored in the target storage unit 202, and layout information stored in the gradation patch storage unit 204, and outputs the patch image data to the MIC 60 (step S52). Specific content will be described below. As illustrated in FIG. 25, when the patch print instruction is received, per combination of each color of CMYK and a surface effect, the rendering engine 51 reads first target information and second target information associated with this combination from the target storage unit 202, and reads layout information associated with this combination from the gradation patch storage unit 204. Further, per combination of each color of CMYK and a surface effect, the rendering engine 51 reads first target information and second target information associated with this combination, and generates patch image data using layout information associated with this combination.

Next, per combination of each color of CMYK and a surface effect (a density value of a gloss control plane), the TRC 53 reads a first gamma curve and a second gamma curve associated with this combination from the gamma correction storage unit 206. Further, per combination of each color of CMYK and a surface effect, the TRC 53 gamma corrects color plane image data of patch image data associated with this combination, according to a first gamma curve associated with this combination. Furthermore, the TRC 53 gamma corrects color plane image data of patch image data associated with this combination, according to a second gamma curve associated with this combination. Next, the halftone engine 55 reads dither data stored in the halftone data storage unit 208, and performs halftone processing for each of the color plane image data and the clear toner plane image data which configure each patch image data using the read dither data. By this means, the eight bit color plane image data and the eight bit clear toner plane image data which configure each patch image are each converted into two bit image data. That is, each patch image data is outputted to the MIC 60 as image data obtained by synthesizing the two bit color plane image data and the two bit clear toner plane image data. Content of step S52 has been described above.

As described above, it can be regarded that the DFE 50 has patch image generation units (the rendering engine 51, the TRC 53 and the halftone engine 55 in this example) which generate image data of patch images (patch image data) used to set a first gamma curve and a second gamma curve per combination of each color of CMYK and a surface effect.

Back to FIG. 30 again, the present invention will be described. Each patch image data outputted to the MIC 60 is outputted to the printer 70. The printer 70 prints each patch image on the transfer sheet 210 using each patch image data passed from the MIC 60 (step S53). Next, the gloss meter 224 measures a gloss level of each patch image formed on a transfer sheet, and the colorimeter 230 measures a density of a color of each patch image formed on a transfer sheet (step S54). The measurement result of the density of the color of each patch image is outputted to the first change unit 220, and the measurement result of the gloss level of each patch image is outputted to the second change unit 222. Next, the first change unit 220 generates a first gamma curve, and the second change unit 222 generates a second gamma curve (step S55).

More specifically, per combination of each color of CMYK and a surface effect (a density value of a gloss control plane) using a measurement result of a density of a color of a patch image associated with this combination and first target information associated with this combination, the first change unit 220 generates a first gamma curve associated with this combination such that characteristics indicated by the first target information associated with this combination is obtained. Further, per combination of each color of CMYK and a surface effect (a density value of a gloss control plane) using a measurement result of a gloss level of a patch image associated with this combination and second target information associated with this combination, the second change unit 222 generates a second gamma curve associated with this combination such that characteristics indicated by the second target information associated with this combination is obtained. Content of step S55 has been described above.

Next, the first change unit 220 registers a newly generated first gamma curve instead of the first gamma curve registered in the gamma correction storage unit 206 so far, and the second change unit 222 registers a newly generated second gamma curve instead of the second gamma curve registered in the gamma correction storage unit 206 so far (step S56).

As described above, in the present embodiment, per combination of each color of CMYK and a surface effect using a measurement result of a density of a color of a patch image associated with this combination and first target information associated with this combination, a first gamma curve associated with this combination is changed such that characteristics indicated by the first target information associated with this combination is obtained, so that it is possible to provide an advantageous effect of realizing adequate color representation matching the combination with a surface effect. Further, in the present embodiment, per combination of each color of CMYK and a surface effect using a measurement result of a gloss level of a patch image associated with this combination and second target information associated with this combination, a second gamma curve associated with this combination is changed such that characteristics indicated by the second target information associated with this combination is obtained, so that it is possible to provide an advantageous effect of realizing an adequate gloss level matching the combination of a color and a surface effect.

Second Embodiment

Although a configuration has employed with the first embodiment where a host device 10 has a plane data generation unit 122 and a print data generation unit 123, a DFE 50 has a clear processing 56, the host device 10 performs plane data generation processing of generating colored plane data, clear plane data and gloss control plane data and print data generation processing and the DFE 50 performs clear data plane data, the present invention is not limited to this.

That is, a configuration may be employed where one of a plurality of processing performed by one device is performed by one or more other devices connected with one device through a network.

For example, in an image formation system according to the second embodiment, part of functions of a host device and a DFE are implemented on a server device on a network.

Figure 31:
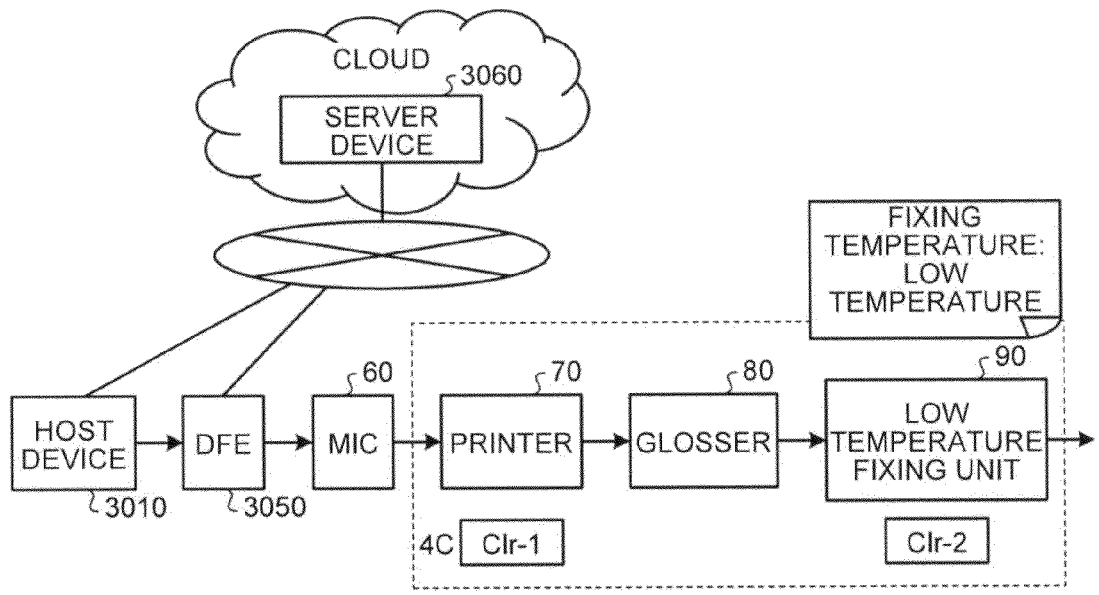
FIG. 31 is a view illustrating a configuration of an image formation system according to a second embodiment.

FIG. 31 is a view illustrating a configuration of the image formation system according to the second embodiment. As illustrated in FIG. 31, the image formation system according to the present embodiment has a host device 3010, a DFE 3050, a MIC 60, a printer 70, a glosser 80, a low temperature fixing unit 90, and a server device 3060 on a cloud. Post-processors such as the glosser 80 and the low temperature fixing unit 90 are not limited to these.

A configuration is employed with the present embodiment in which the host device 3010 and the DFE 3050 are connected with the server device 3060 through a network such as the Internet. Further, a configuration is employed with the present embodiment where a plane data generation unit and a print data generation unit of the host device 10 according to the first embodiment, and a clear processing of the DFE 50 according to the first embodiment are provided on the server device 3060.

Meanwhile, a connection configuration of the host device 3010, the DFE 3050, the MIC 60, the printer 70, the glosser 80 and the low temperature fixing unit 90 are the same as those in the first embodiment.

That is, more specifically, a configuration is employed with the second embodiment where the host device 3010 and the DFE 3050 are connected with the single server device 3060 through a network (cloud) such as the Internet, the server device 3060 has a plane data generation unit 3062, a print data generation unit 3063 and a clear processing 3066 and the server device 3060 performs plane data generation processing of generating colored plane data, clear plane data and gloss control plane data, print data generation processing and clear toner plane data generation processing.

Figure 32:
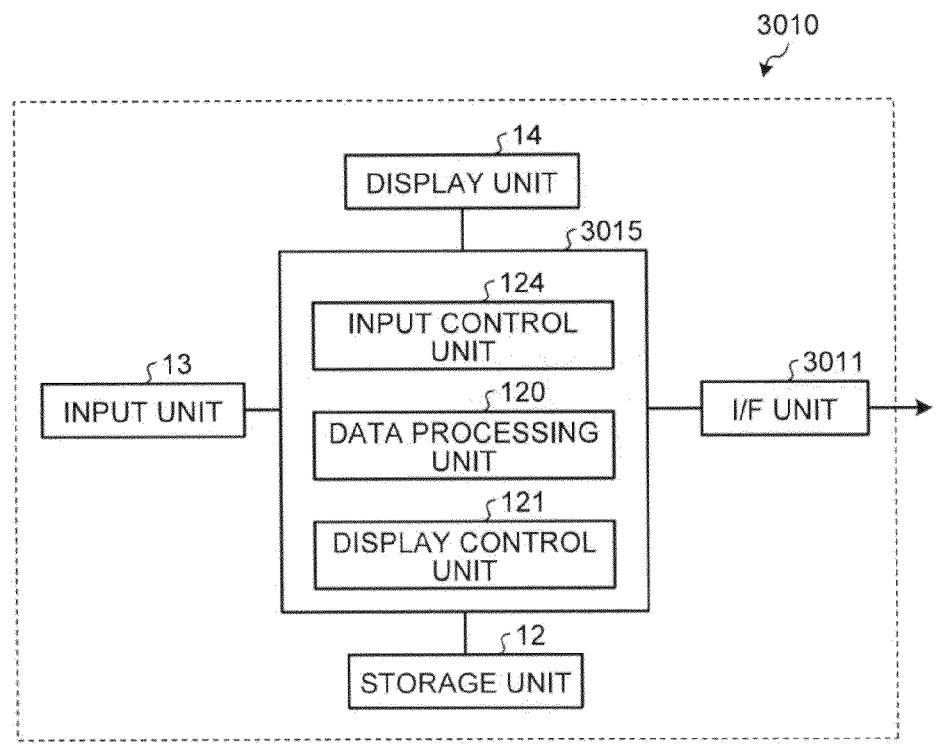
FIG. 32 is a block diagram illustrating a functional configuration of a host device according to the second embodiment.

First, the host device 3010 according to the present embodiment will be described. FIG. 32 is a block diagram illustrating a functional configuration of the host device 3010 according to the second embodiment. As illustrated in FIG. 32, the host device 3010 according to the present embodiment is configured to have an I/F unit 3011, a storage unit 12, an input unit 13, a display unit 14 and a control unit 3015. The I/F unit 3011 is an interface device which performs communication between the server device 3060 and the DFE 50. Functions and configurations of the storage unit 12, the input unit 13 and the display unit 14 are the same as those of the host device 10 according to the first embodiment.

The control unit 3015 is a computer which controls the entire host device 3010, and includes a CPU, ROM and RAM. As illustrated in FIG. 32, the control unit 3015 mainly has an input control unit 124, a data processing unit 120 and a display control unit 121. The input control unit 124 and the display control unit 121 of these units are realized when the CPU of the control unit 3015 reads a program of an operating system stored in, for example, the ROM, expands on the RAM and executes the program. The data processing unit 120 is realized when the CPU of the control unit 3015 reads the program of the image processing application stored in, for example, the ROM, expands the program on the RAM and executes the program. In addition, at least part of these units can also be realized by a dedicated circuit (hardware). Functions and configurations of the input control unit 124, the display control unit 121 and the data processing unit 120 are the same as those according to the present embodiment.

Similar to the first embodiment, when a user checks an image to which a surface effect needs to be applied among various images (for example, pictures, letters, figures and images obtained by synthesizing these) stored in the storage unit 12, that is, image designation information for designating colored plane image data (target image), and a target image displayed on the display unit 14, and operates the input unit 13, the host device 3010 according to the present embodiment receives at the input control unit 124 designation information including a designation of an area to which a surface effect is applied and a type of the surface effect and a designation of a transparent image such as a watermark or a texture and an area to which the transparent image is assigned. Among these pieces of designation information, the server device 3060 generates gloss control plane image data based on the designation of the area to which a surface effect is applied and the type of the surface effect. Further, the server device 3060 generates clear plane image data based on the designation of a transparent image such as a watermark or a texture and the area to which the transparent image is assigned among the designation information. In addition, each plane image data will be described below.

Further, a designation of an area to which a surface effect is assigned and a type of the surface effect in designation information will be simply referred to as a "designation of a surface effect". Further, a designation of a transparent image such as a watermark or a texture and an area to which the transparent image is assigned in the designation information are simply referred to as a "designation of a transparent image".

The I/F unit 3011 transmits a print data generation request to the server device 3060 together with image designation information and designation information. Further, the I/F unit 3011 receives print data generated by the server device 3060 according to this generation request, from the server device 3060. Meanwhile, gloss control plane image data, colored plane image data and clear plane image data are the same as those of each image data according to the first embodiment. Further, the print data is obtained by synthesizing colored plane image data, gloss control plane image data, clear plane image data and a job command, and is the same as print data according to the first embodiment illustrated in FIG. 10.

Figure 33:
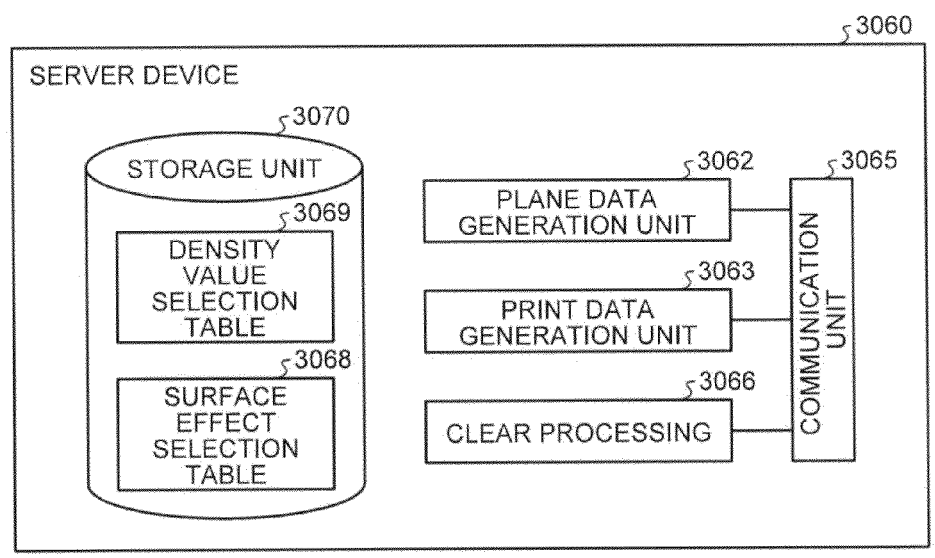
FIG. 33 is a block diagram illustrating a functional configuration of a server device according to the second embodiment.

Next, the server device 3060 will be described. FIG. 33 is a block diagram illustrating a functional configuration of the server device 3060 according to the second embodiment. As illustrated in FIG. 33, the server device 3060 mainly has a storage unit 3070, a plane data generation unit 3062, a print data generation unit 3063, a clear processing 3066 and a communication unit 3065.

The storage unit 3070 is a storage medium such as a HDD or memory, and stores a density value selection table 3069 and a surface effect selection table 3068. The density value selection table 3069 is the same as a density value selection table 3069 according to the first embodiment as described using FIG. 9. The surface effect selection table 3068 is the same as a surface effect selection table according to the first embodiment described using FIG. 11.

The communication unit 3065 transmits and receives requests of various items of data between the host device 3010 and the DFE 3050. More specifically, the communication unit 3065 receives image designation information, designation information and a print data generation request from the host device 3010, and transmits the generated print data to the host device 301. Further, the communication unit 3065 receives eight bit gloss control plane image data, eight bit colored plane image data and a clear toner plane generation request from the DFE 3050, and transmits the generated clear toner plane image data and on/off information to the DFE 3050.

The plane data generation unit 3062 has the same function as a plane data generation unit of the host device 10 according to the first embodiment, and generates colored plane image data, gloss control plane image data and clear plane image data.

More specifically, the plane data generation unit 3062 generates colored plane image data based on image designation information. That is, when the image designation information includes user's color designation of a target image drawing object, the plane data generation unit 3062 generates colored plane image data according to the color designation.

Further, when the designation information includes a designation of a transparent image such as a watermark or a texture other than a surface effect and an area to which the transparent image is applied, the plane data generation unit 3062 generates clear plane image data for specifying a transparent image and an area on a transfer sheet to which the transparent image is assigned, according to user's designation of the designation information.

Furthermore, the plane data generation unit 3062 refers to the density value selection table 3069, and generates gloss control plane image data for specifying an area on a transfer sheet to which a surface effect is applied and a type of the surface effect, based on the designation of the area to which the surface effect is applied and the type of the surface effect in the designation information. Meanwhile, the plane data generation unit 3062 generates gloss control plane image data (see FIGS. 4 and 13) specifying an area to which a surface effect indicated by a gloss control value is applied in units of a drawing object of image data of a target image.

The print data generation unit 123 according to the present embodiment generates print data illustrated in FIG. 10 similar to a print data generation unit of the host device 10 according to the first embodiment.

The clear processing 3066 has the same function as that of a clear processing of the DFE 50 according to the first embodiment. More specifically, the clear processing 3066 decides a surface effect with respect to a density value (pixel value) represented by each pixel which forms the gloss control plane using gloss control plane image data received by the communication unit 3065 from the DFE 3050 and referring to the surface effect selection table 3068, determines on or off of the glosser 80 according to this decision and adequately generates an inverse mask or a solid mask using each inputted eight bit CMYK image data to adequately generate two bit clear toner plane image data for adhering clear toner. Further, according to a decision result of a surface effect, the clear processing 3066 adequately generates and outputs clear toner plane image data used by the printer 70 and clear toner plane image data used by the low temperature fixing unit 90, and generates on/off information which indicates on or off of the glosser 80.

Figure 34:
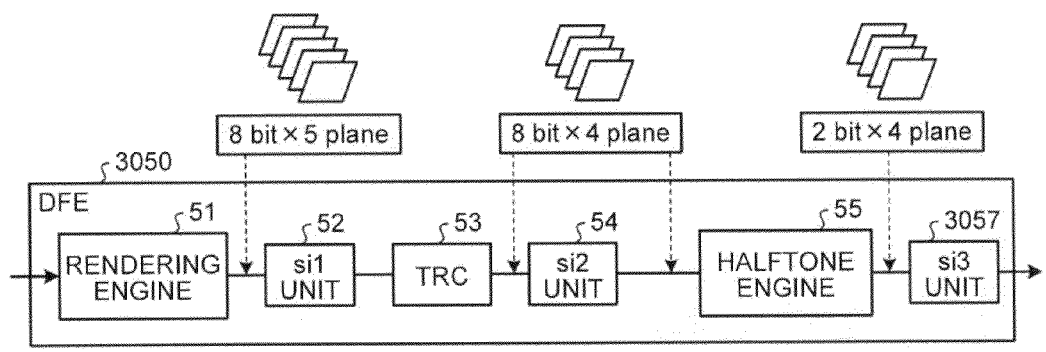
FIG. 34 is a block diagram illustrating a functional configuration of a DFE according to the second embodiment.

Next, the DFE 3050 will be described. FIG. 34 is a block diagram illustrating a functional configuration of the DFE 3050 according to the second embodiment. The DFE 3050 according to the present embodiment mainly has a rendering engine 51, a si1 unit 52, a TRC 53, a si2 unit 3054, a halftone engine 55 and a si3 unit 3057. Meanwhile, functions and configurations of the rendering engine 51, the si1 unit 52, the TRC 53 and the halftone engine 55 are the same as those of the DFE 50 according to the first embodiment.

The si2 unit 3054 according to the present embodiment transmits the eight bit gloss control plane converted by the rendering engine 51, eight bit CMYK colored plane image data gamma corrected by the TRC 53 and a clear toner generation request to the server device 3060. The si3 unit 3057 receives clear toner plane image data and on/off information from the server device 3060.

Figure 35:
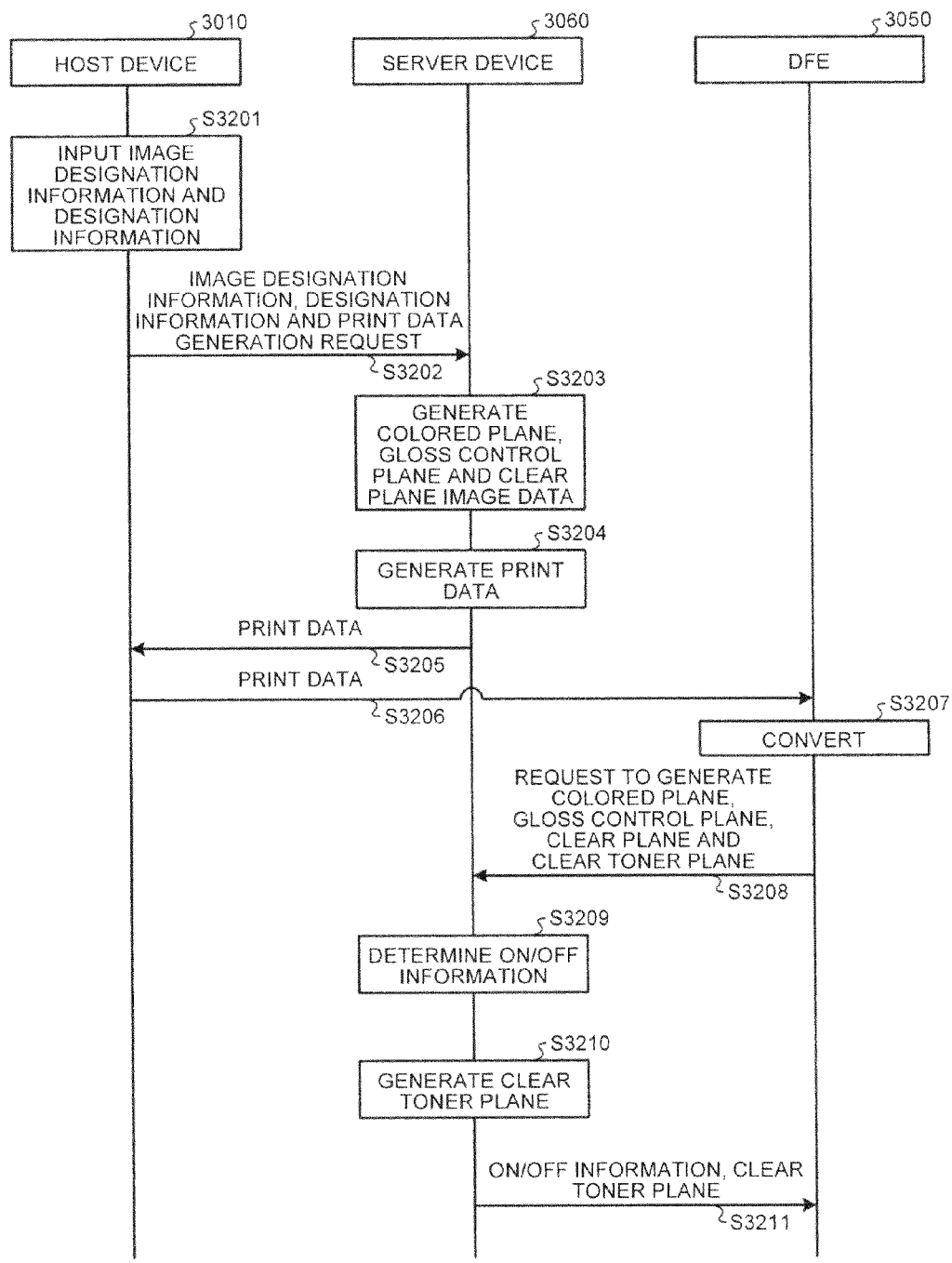
FIG. 35 is a sequence diagram illustrating an overall flow of clear toner plane generation processing according to the second embodiment.

Next, clear toner plane generation processing required for print processing of the image formation system according to the present embodiment employing the above configuration will be described. First, an entire flow of the clear toner plane generation processing will be described. FIG. 35 is a sequence diagram illustrating an overall flow of clear toner plane generation processing according to the second embodiment.

First, the host device 3010 receives an input of image designation information and designation information from a user (step S3201), and transmits a print data generation request together with the image designation information and the designation information to the server device 3060 (step S3202).

The server device 3060 receives the print data generation request together with the image designation information and the designation information, and generates colored plane image data, gloss control plane image data and clear plane image data (step S3203). Further, the server device 3060 generates print data from these items of image data (step S3204), and transmits the generated print data to the host device 301 (step S3205).

When receiving the print data, the host device 3010 transmits this print data to the DFE 3050 (step S3206).

When receiving the print data from the host device 3010, the DFE 3050 analyzes the print data, obtains the colored plane image data, the gloss control plane image data and the clear plane image data, and convert or corrects these items of image data (step S3207). Further, the DFE 3050 transmits the colored plane image data, the gloss control plane image data, the clear plane image data and the toner clear plane generation request to the server device 3060 (step S3208).

When receiving the colored plane image data, the gloss control plane image data, the clear plane image data and the clear toner plane generation request, the server device 3060 determines on/off information (step S3209), and generates clear toner plane image data (step S3210). Further, the server device 3060 transmits the generated clear toner plane image data to the DFE 3050 (step S3211).

Figure 36:
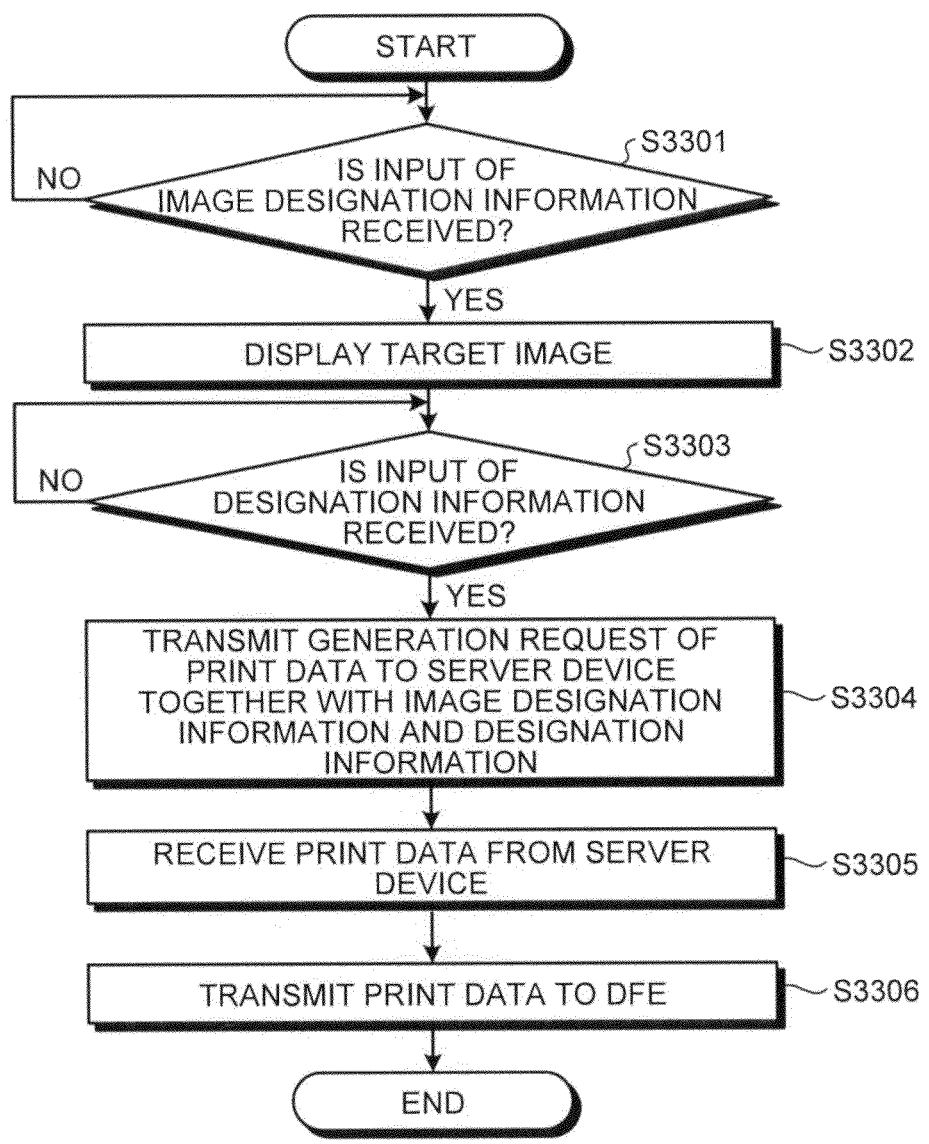
FIG. 36 is a flowchart illustrating process of processing of the host device according to the second embodiment.

Hereinafter, details of each processing performed by the host device 3010, the server device and the DFE 3050 in combination in the above entire flow will be described. First, gloss control plane and print data generation processing of the host device 3010 and the server device 3060 will be described. FIG. 36 is a flowchart illustrating process of processing of the host device 3010 according to the second embodiment.

First, when the input control unit 124 receives an input of image designation information (step S3301: YES), the display control unit 121 controls the display unit 14 to display an image designated by the received image designation information (step S3302). Next, when the input control unit 124 receives an input of a surface effect and designation information of a transparent image (step S3303: YES), the I/F unit 3011 transmits the print data generation request, and the inputted image designation information and designation information to the server device 3060 (step S3304).

Further, when the server device 3060 generates print data, the I/F unit 3011 receives these items of data (step S3305). Further, the I/F unit 3011 transmits the print data to the DFE 3050 (step S3306).

Figure 37:
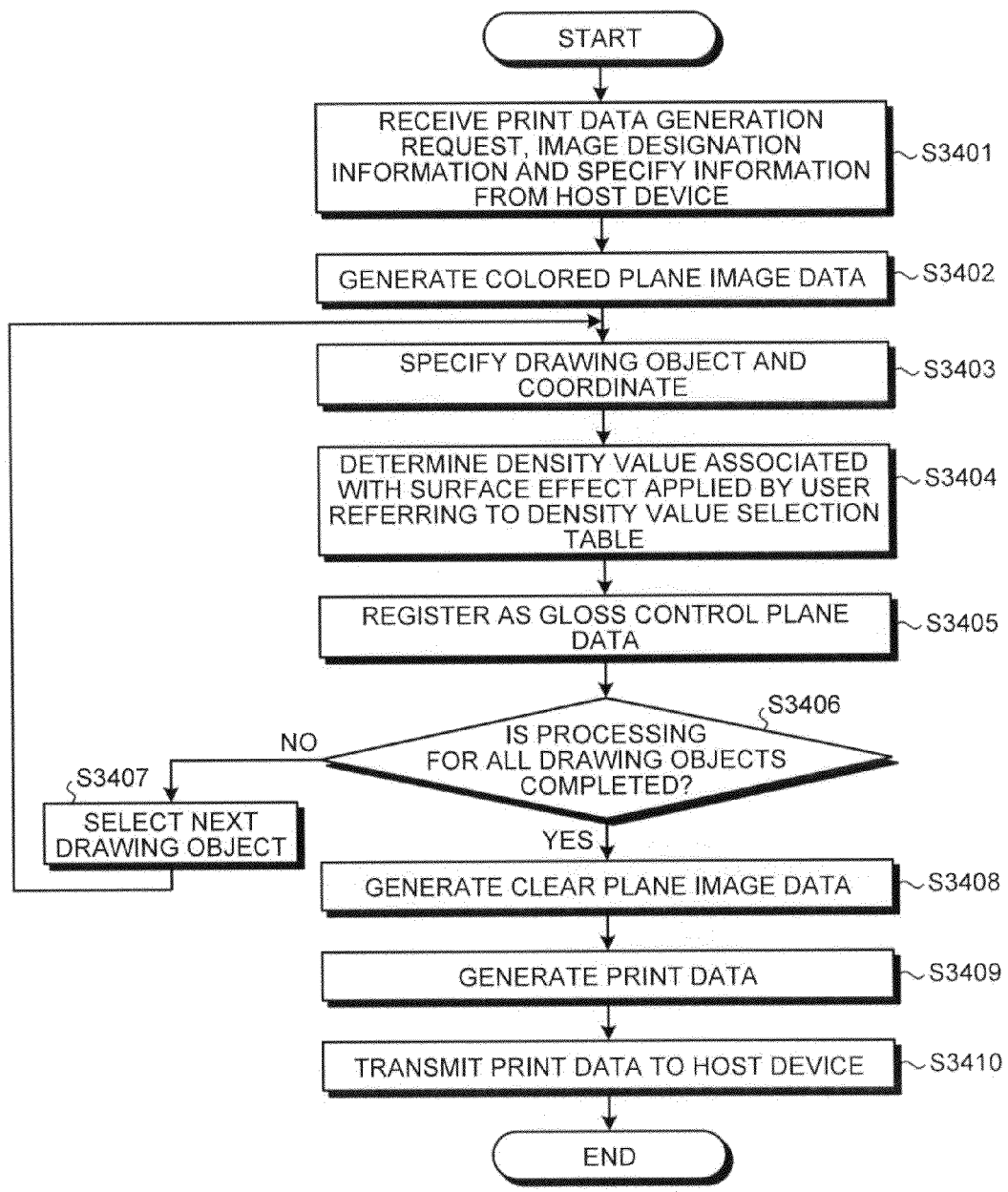
FIG. 37 is a flowchart illustrating process of processing of the server device of generating gloss control plane image data and print data according to the second embodiment.

FIG. 37 is a flowchart illustrating process of processing of the server device 3060 of generating gloss control plane image data and print data according to the second embodiment. When the communication unit 3065 receives the print data generation request, the image designation information and the designation information from the host device 3010 (step S3401), the plane data generation unit 3062 first generates colored plane image data based on image designation information (step S3402).

Next, the plane data generation unit 3062 specifies a drawing object obtained by applying a surface effect to a target image by designation information and a coordinate of the drawing object using, for example, a drawing command provided by, for example, an operating system and a coordinate value set by the drawing command (step S3403).

Next, the plane data generation unit 3062 determines a density value as a gloss control value associated with a surface effect which the user applies in the designation information, referring to the density value selection table 3069 stored in the storage unit 3070 (step S3404).

Further, the plane data generation unit 3062 associates and registers the gloss control plane image data (originally empty data), the drawing object and the density value determined in relation to the surface effect (step S3405).

Next, the plane data generation unit 3062 decides whether or not processing in above steps S3402 to S3404 is completed for all drawing objects which exist in the target image (step S3406). Further, when the processing is not yet completed (step S3406: No), the plane data generation unit 3062 selects a next drawing object which is not yet processed in the target image (step S3407), and repeatedly executes processing in steps S3403 to S3405.

Furthermore, when it is decided in step S3406 that the processing in steps S3403 to S3405 is completed for all drawing objects in the target image (step S3406: Yes), generation of the gloss control plane image data is completed and the gloss control plane image data illustrated in FIGS. 8 and 13 is obtained.

Next, the plane data generation unit 3062 generates clear plane image data based on designation of a transparent image in designation information (step S3408).

Further, the print data generation unit 3063 generates document data obtained by integrating the colored plane image data, the gloss control plane image data and the clear plane image data, adds a job command to this integrated document data and generates the print data of the PDF format illustrated in FIG. 10 (step S3409). Furthermore, the communication unit 3065 transmits the generated print data to the host device 3010 (step S3410).

Figure 38:
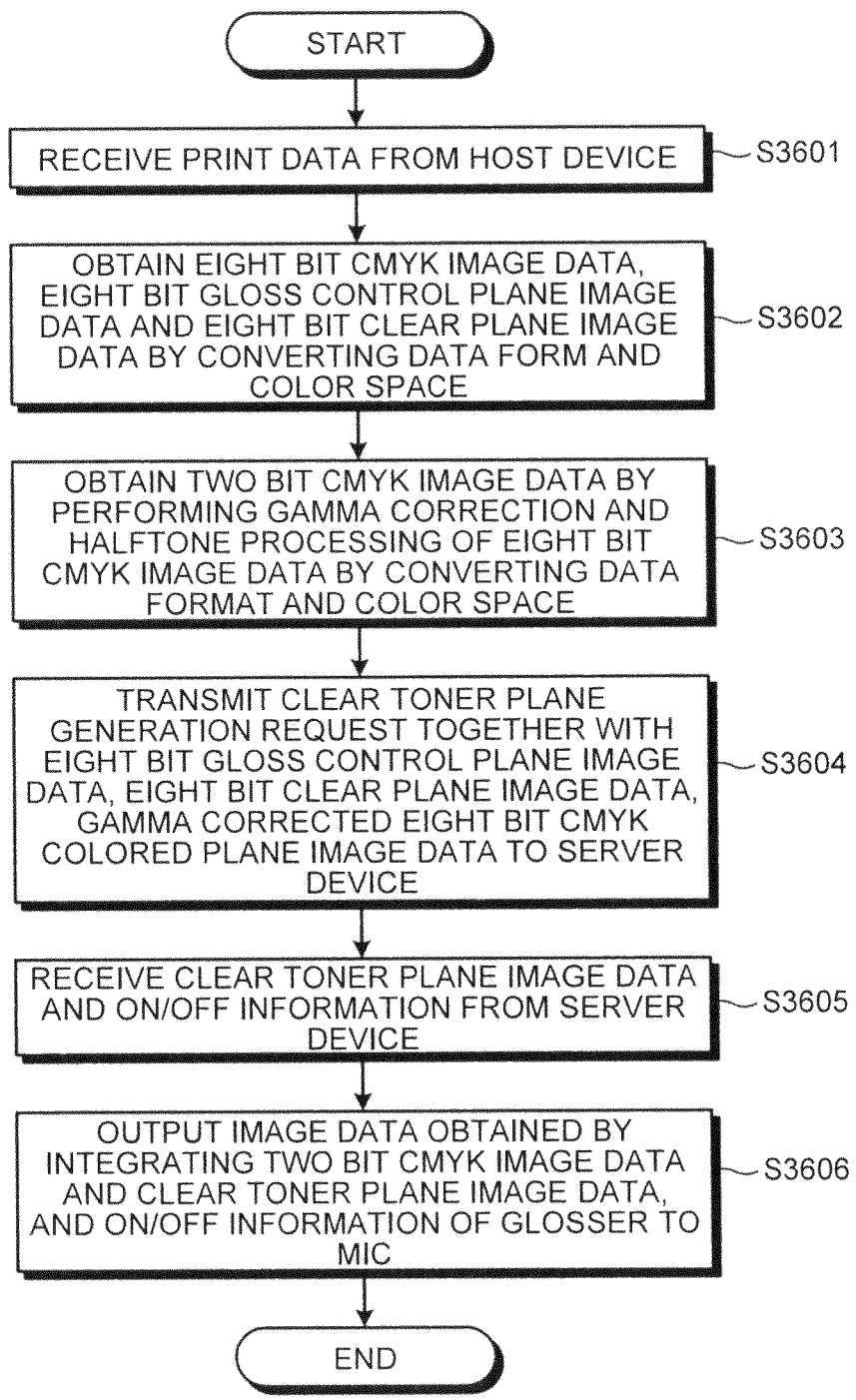
FIG. 38 is a flowchart illustrating process of processing of a DFE according to the second embodiment.

Next, processing of the DFE 3050 and the server device 3060 of generating clear toner plane image data will be described. FIG. 38 is a flowchart illustrating process of processing of the DFE 3050.

When the DFE 50 receives print data from the host device 10 (step S3601), the rendering engine 51 analyzes a language of this print data and converts the gloss control plate image data represented by the vector graphics into bitmap graphic image data, and converts a color space represented by, for example, an RGB graphics into a CMYK graphic color space and obtains each eight bit CMYK color plane image data, eight bit gloss control plane image data and eight bit clear toner image data (step S3602).

Details of processing of converting gloss control plane image data in this step S3602 is the same as processing of converting gloss control plane image data according to the first embodiment described using FIG. 18. According to the conversion processing, the gloss control plane image data is converted into data to which a surface effect is set per pixel.

When eight bit gloss control plane image data is outputted, the TRC 53 of the DFE 3050 gamma corrects each eight bit CMYK colored plane image data according to a 1D_LUT gamma curve generated by calibration, the halftone engine 55 performs halftone processing of converting the gamma corrected image data into a data format of each two bit CMYK image data to output to the printer 70 and obtains each two bit CMYK image data for which halftone processing is performed (step S3603).

Further, the sit unit 3054 transmits the eight bit gloss control plane image data, each gamma corrected eight bit CMYK colored plane image data and the eight bit clear plane image data, and the clear toner plane generation request, to the server device 3060 (step S3604).

Figure 39:
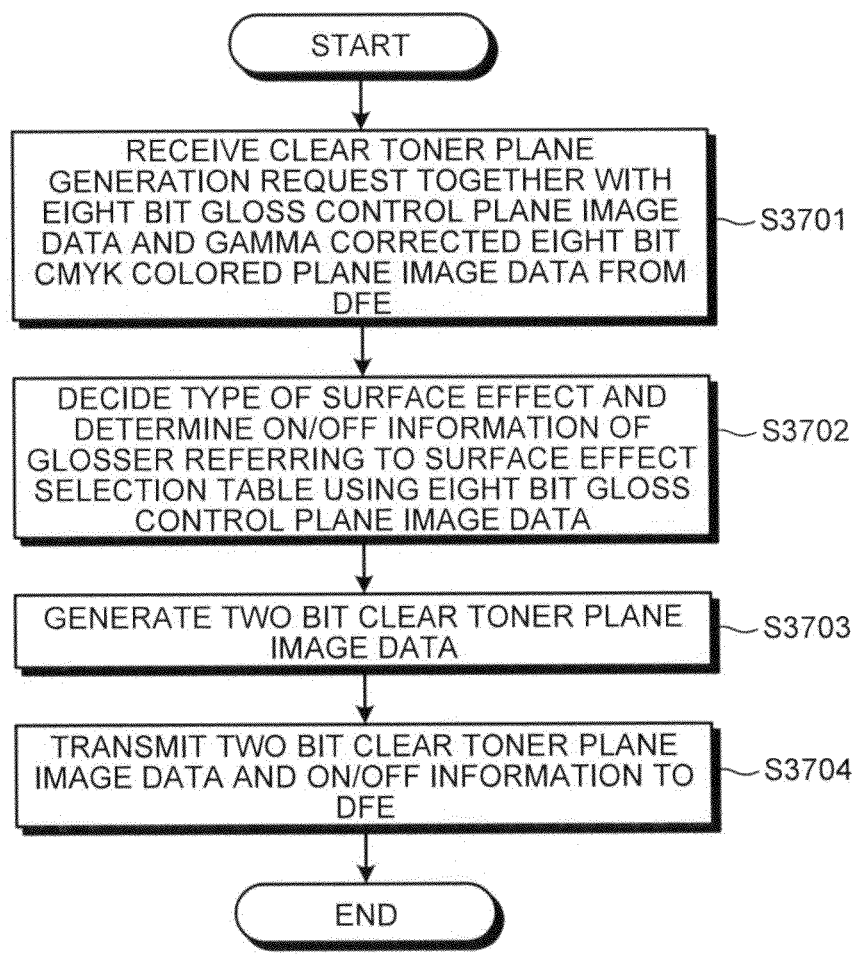
FIG. 39 is a flowchart illustrating process of clear toner plane generation processing of the server device according to the second embodiment.

Hereinafter, clear toner plane generation processing of the server device 3060 will be described. FIG. 39 is a flowchart illustrating process of clear toner plane generation processing of the server device 3060.

In the server device 3060, the communication unit 3065 receives the eight bit gloss control plane image data, each eight bit CMYK colored plane image data and a clear toner plane generation request from the DFE 3050 (step S3701).

Further, the clear processing 3066 decides a surface effect designated with respect to each pixel value indicated by the gloss control plane image data using the eight bit gloss control plane image data and referring to the surface effect selection table 3068 of the storage unit 3070. Furthermore, the clear processing 3066 makes such decision on all pixels which configure the gloss control plane image data. In addition, the gloss control plane image data represents a density value in the basically identical range of all pixels which form an area to which each surface effect is applied. Hence, the clear processing 3066 decides that pixels in the vicinity to which the identical surface effect is decided to be applied is included in an area to which the identical surface effect is applied. Thus, the clear processing 3066 decides the area to which the surface effect is applied, and the type of the surface effect to be applied to the area, and determines on or off of the glosser 80 according to this decision (step S3702).

Further, the clear processing 3066 generates a PG gloss control plane, a G gloss control plane, an M gloss control plane and a PM gloss control plane from the eight bit gloss control plate image data. Furthermore, the clear processing generates two bit clear toner plane image data by converting the PG gloss control plane into a two bit Clr-PG plane, converting the G gloss control plane into a two bit Clr-G plane, converting the M gloss control plane into a two bit Clr-M plane, converting the PM gloss control plane 5641 into a two bit Clr-PM plane and adequately synthesizing the converted image data (step S3703). The above content is the same as content described in the first embodiment. In addition, the gamma correction storage unit 206 and the halftone data storage unit 208 may be stored in the storage unit 3070 of the server device 3060, or may be stored on the DFE 3050 side.

The communication unit 3065 transmits the two bit clear toner image data generated by the clear processing 3066 and on/off information to the DFE 3050 (step S3704).

Back to FIG. 38, the DFE 3050 transmits the clear toner plane generation request to the server device 3060, and then the si3 unit 3057 receives the two bit clear toner plane image data and the on/off information from the server device 3060 (step S3605).

Further, the si3 unit 3057 integrates each two bit CMYK image data which is obtained in step S3603 and for which halftone processing is performed and the two bit clear toner plane image data received in step S3605, and outputs to the MIC 60 the integrated image data and the on/off information which is received in step S3605 and which indicates on or off of the glosser 80 (step S3606).

In addition, when the server device 3060 does not generate clear toner plane image data, in step S3607, only each two bit CMYK image data which is obtained in step S3603 and for which halftone processing is performed is integrated and outputted to the MIC 60.

Subsequent processing of the MIC 60, the printer 70, the glosser 80 and the low temperature fixing unit 90 are performed in the same way as that in the first embodiment.

As described above, in the present embodiment, the server device 3060 on the cloud generates colored plane image data, gloss control plane image data, clear plane image data, print data and clear toner plane image data, even if there is a plurality of host devices 3010 and DFEs 3050, it is possible to collectively change a density value selection table and a surface effect selection table, which is convenient for an administrator.

In addition, although a configuration has been employed with the present embodiment where the single server device 3060 on the cloud has the plane data generation unit 3062, the print data generation unit 3063 and the clear processing 3066, and the server device 3060 performs plane data generation processing of generating colored plane data, clear plane data and gloss control plane data, print data generation processing and clear toner plane data generation processing, the present invention is not limited to this. For example, a configuration may be employed where the single server device 3060 on the cloud has the TRC 53 and the halftone engine 55, and the server device 3060 performs gamma correction processing of the TRC 53 and halftone processing by the halftone engine 55.

Figure 40:
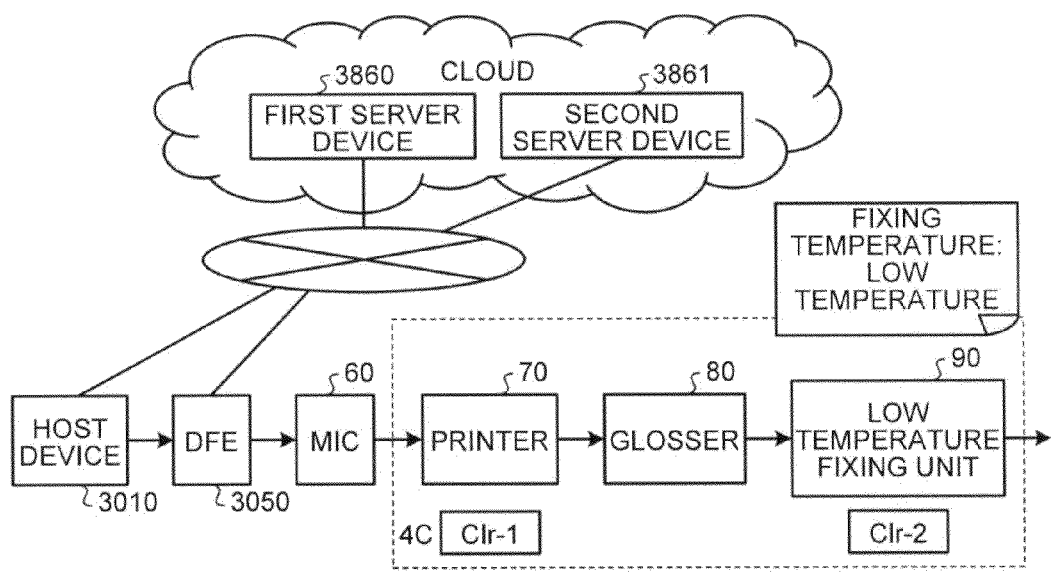
FIG. 40 is a network configuration diagram in which two servers are provided on a cloud.

Further, for example, a configuration may be employed where two or more server devices are provided on the cloud and each of the above processing is distributed and executed by the two or more server devices. FIG. 40 is a network configuration diagram in which two servers (a first server device 3860 and a second server device 3861) are provided on a cloud. A configuration is employed with an example in FIG. 40 where, between the first server device 3860 and the second server device 3861, plane data generation processing of generating colored plane data, clear plane data and gloss control plane data, print data generation processing and clear toner plane data generation processing is dispersed and performed.

For example, it is possible to employ a configuration where the first server device 3860 has the plane data generation unit 3062 and the print data generation unit 3063 and the first server device 3860 performs plane data generation processing and print data generation processing, and it is possible to employ a configuration where the second server device 3861 has the clear processing 3066 and the second server device 3861 executes clear toner plane data generation processing. In addition, a mode to disperse each processing to each server device is not limited to this, and can be performed arbitrarily. For example, a configuration may be employed where the first server device 3860 has the TRC 53 and the first server device 3860 performs gamma correction processing by the TRC 53, and a configuration may be employed where the second server device 3861 has the halftone engine 55 and the second server device 3861 performs halftone processing by the halftone engine 55. By contrast with this, a configuration may be employed where the first server device 3860 has the halftone engine 55 and the second server device 3861 has the TRC 53.

That is, when a minimum configuration of providing in the host device 10 the input unit 13, the input control unit 124, the data processing unit 120, the display control unit 121 and the display unit 14 is employed, it is possible to collectively provide part or all of functions of the plane data generation unit 3062, the print data generation unit 3063 and the DFE 3050 in one server device on the cloud or arbitrarily disperse and provide part or all of functions in a plurality of server devices.

In other words, as described above, it is possible to employ a configuration where one of a plurality of processing performed by one device is performed by one or more other devices connected with one device through a network.

Further, in case of the above "configuration where processing is performed by one or more other devices connected with one device through a network", the configuration includes processing of outputting data (information) generated by processing performed by one device from one device to another device and processing of receiving at another device an input of this data and data input/output processing performed between one device and another device and between other devices.

That is, when there is one other device, the configuration includes data input/output processing performed between one device and the other device and, when there are two or more other devices, the configuration includes data input/output processing performed between one device and the other device and between the other devices such as the first other device and the second other device.

Further, in the second embodiment, although the server device 3060 and a plurality of server devices such as the first server device 3860 and the second server device 3861 are provided on the cloud, the present invention is not limited to this. For example, a configuration may be employed where the server device 3060 or a plurality of server devices such as the first server device 3860 and the second server device 3861 are provided on any network such as Intranet.

Figure 41:
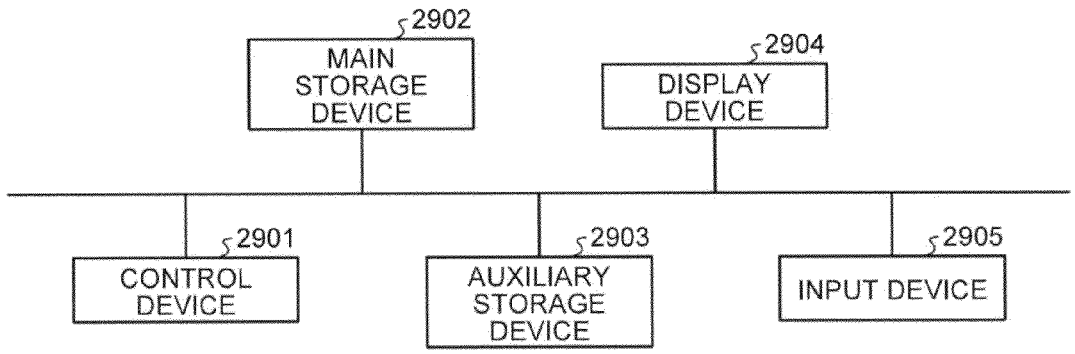
FIG. 41 is a hardware configuration diagram of a host device, a DFE and a server device.

Hardware configurations of the host devices 10, 3010, the DFEs 50 and 3050, the server device 3060, the first server device 3860 and the second server device 3861 according to the above embodiment will be described. FIG. 41 is a hardware configuration diagram of the host devices 10 and 3010, the DFEs 50 and 3050 and the server device 3060. The host devices 10 and 3010, the DFEs 50 and 3050, the server device 3060, the first server device 3860 and the second server device 3861 mainly have as hardware configurations a control device 2901 such as a CPU which controls the entire device, a main storage device 2902 such as ROM or RAM which stores various items of data and various programs, an auxiliary storage device 2903 such as a HDD which stores various items of data and various programs, an input device 2905 such as a keyboard or a mouse, and a display device 2904 such as a display device, and employ a hardware configuration using a common computer.

An image processing program (including the image processing applications. The same applies below) executed by the host devices 10 and 3010 according to the above embodiment is recorded in a computer-readable recording medium such as a CD-ROM, a flexible disk (FD), a CD-R or a DVD (Digital Versatile Disk) as an installable format or an executable format and provided as a computer program product.

Further, a configuration may be employed where the image processing program executed by the host devices 10 and 3010 according to the above embodiment is provided by being stored in the computer connected to a network such as the Internet, and downloaded through the network. Furthermore, a configuration may be employed where the image processing program executed by the host device 10 according to the above embodiment is provided or distributed through the network such as the Internet.

Still further, a configuration may be employed where an image processing program executed by the host devices 10 and 3010 according to the above embodiment is pre-installed in, for example, the ROM and provided.

The image processing program executed by the host devices 10 and 3010 according to the above embodiment employs a module configuration including the above units (the data processing unit, the plane data generation unit, the print data generation unit, the input control unit and the display control unit), and the above units are loaded onto a main storage device as actual hardware when the CPU (processor) reads the image processing program from the storage medium and executes the image processing program and are generated on the main storage device as the data processing unit, the plane data generation unit, the print data generation unit, the input control unit and the display control unit.

Further, print control processing executed by the DFEs 50 and 3050 according to the above embodiment may be realized by hardware and, in addition, a print control program as software. In this case, the print control program executed by the DFEs 50 and 3050 according to the above embodiment is pre-installed in, for example, the ROM and provided.

A print control program executed by the DFEs 50 and 3050 according to the above embodiment is recorded in a computer-readable recording medium such as a CD-ROM, a flexible disk (FD), a CD-R or a DVD (Digital Versatile Disk) as an installable format or an executable format and provided as a computer program product.

Further, a configuration may be employed where the print control program executed by the DFEs 50 and 3050 according to the above embodiment is provided by being stored in the computer connected to a network such as the Internet, and downloaded through the network. Furthermore, a configuration may be employed where the print control program executed by the DFE 50 according to the above embodiment is provided or distributed through the network such as the Internet.

The print control program executed by the DFEs 50 and 3050 according to the above embodiment employs a module configuration including the above units (a rendering engine, a halftone engine, a TRC, a si1 unit, a si2 unit, a si3 unit and a clear processing), and the above units are loaded onto the main storage device as actual hardware when the CPU (processor) reads the print control program from the ROM and executes the print control program and are generated on the main storage device as the rendering engine, the halftone engine, the TRC, the si1 unit, the si2 unit, the si3 unit and the clear processing.

Further, each data generation processing executed by the server device 3060 according to the above embodiment may be realized by hardware and, in addition, a generation program as software. In this case, the generation program executed by the server device 3060 according to the above embodiment is pre-installed in, for example, the ROM and provided.

A configuration may be employed where each data generation processing program executed by the server device 3060 according to the above embodiment is recorded in a computer-readable recording medium such as a CD-ROM, a flexible disk (FD), a CD-R or a DVD (Digital Versatile Disk) as an installable format or an executable format and provided as a computer program product.

Further, a configuration may be employed where each data generation processing program executed by the server device 3060 according to the above embodiment is provided by being stored in the computer connected to a network such as the Internet, and downloaded through the network. Furthermore, a configuration may be employed where each data generation processing program executed by the server device 3060 according to the above embodiment is provided or distributed through the network such as the Internet.

Each data generation processing program executed by the server device 3060 employs a module configuration including the above units (the plane data generation unit, the print data generation unit and the clear processing), and the above units are loaded onto the main storage device as actual hardware when the CPU (processor) reads the generation program from the ROM and executes the generation program and are generated on the main storage device as the plane data generation unit, the print data generation unit and the clear processing.

A configuration has been employed with the above embodiment where the image formation system has the host devices 10 and 3010, the DFEs 50 and 3050, the MIC 60, the printer 70, the glosser 80 and the low temperature fixing unit 90, the present invention is not limited to this. For example, a configuration may be employed where one image formation device is formed by integrally forming the DFEs 50 and 3050, the MIC 60 and the printer 70, and a configuration may be employed where an image formation device which has the glosser 80 and the low temperature fixing unit 90 is further formed.

Although the image formation system according to the above embodiment forms an image using a plurality of colors of CMYK toners, an image may be formed using toner of one color.

In addition, although a printer system according to the above embodiment employs a configuration including the MIC 60, the present invention is not limited to this. A configuration may be employed where processing and a function performed by the MIC 60 may be provided in another device such as the DFE 50, and the MIC 60 is not provided.

The present invention can realize adequate color representation matching a combination with a surface effect.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A printing control device that generates image data which comprises colored plane data for adhering colored toner and clear toner plane data for adhering colorless clear toner, the printing control device comprising:
- a generation unit configured to generate the clear toner plane data based on a type of a surface effect that is applied to a recording medium and gloss control plane data for specifying an area in the recording medium to which the surface effect is applied;
- a first gradation correction unit configured to perform first gradation correction that varies per combination of a color of the colored plane data and the surface effect, with respect to each of a plurality of items of colored plane data that configures the colored plane data; and
- an output unit configured to output the image data generated based on the clear toner plane data generated by the generation unit and the colored plane data to which the first gradation correction is applied.

2. The printing control device according to claim 1, further comprising:
- a first storage unit configured to store, per combination of the color of the colored plane data and the surface effect, first information which indicates a relationship between a density value of the colored plane data of the color and a density value of the color which results from a printing result of the combination;
- a second storage unit configured to store a parameter of the first gradation correction per combination of the color of the colored plane data and the surface effect;
- a patch image generation unit configured to generate image data of a patch image used to set the parameter of the first gradation correction per combination of the color of the colored plane data and the surface effect; and
- a first change unit configured to change the parameter of the first gradation correction such that the relationship indicated by the first information is obtained, using a measurement result of a color of the patch image formed on the recording medium and the first information per combination of the color of the colored plane data and the surface effect.

3. The printing control device according to claim 1, wherein the generation unit comprises a second gradation correction unit configured to perform second correction that varies per combination of the color of the colored plane data and the surface effect, with respect to an area of the gloss control plane data to which the surface effect is designated.

4. The printing control device according to claim 3, further comprising:
- a third storage unit configured to store, per combination of the color of the colored plane data and the surface effect, second information that indicates a relationship between a density value of the colored plane data of the color and a gloss level which results from a printing result of the combination;
- a fourth storage unit configured to store a parameter of the second gradation correction per combination of the color of the colored plane data and the surface effect; and
- a second change unit configured to change the parameter of the second gradation correction such that the relationship indicated by the second information is obtained, using a measurement result of a gloss level of a patch image, image data of which used to set a parameter of the first gradation correction per combination of the color of the colored plane data and the surface effect, formed on the recording medium and the second information per combination of the color of the colored plane data and the surface effect.

5. An image formation system comprising:
- a printing control device configured to generate image data that comprises colored plane data for adhering colored toner and clear toner plane data for adhering colorless clear toner; and
- a printing device configured to perform printing based on the image data, wherein
the printing control device comprises:
- a generation unit configured to generate the clear toner plane data based on a type of a surface effect which is applied to a recording medium and gloss control plane data for specifying an area in the recording medium to which the surface effect is applied;
- a first gradation correction unit configured to perform first gradation correction that varies per combination of a color of the colored plane data and the surface effect, with respect to each of a plurality of items of colored plane data that configures the colored plane data; and
- an output unit configured to output the image data generated based on the clear toner plane data generated by the generation unit and the colored plane data to which the first gradation correction is applied.

6. The image formation system according to claim 5, wherein the printing control device further comprising:
- a first storage unit configured to store, per combination of the color of the colored plane data and the surface effect, first information which indicates a relationship between a density value of the colored plane data of the color and a density value of the color which results from a printing result of the combination;
- a second storage unit configured to store a parameter of the first gradation correction per combination of the color of the colored plane data and the surface effect;
- a patch image generation unit configured to generate image data of a patch image used to set the parameter of the first gradation correction per combination of the color of the colored plane data and the surface effect; and
- a first change unit configured to change the parameter of the first gradation correction such that the relationship indicated by the first information is obtained, using a measurement result of a color of the patch image formed on the recording medium and the first information per combination of the color of the colored plane data and the surface effect.

7. The image formation system according to claim 5, wherein
the generation unit comprises a second gradation correction unit configured to perform second correction that varies per combination of the color of the colored plane data and the surface effect, with respect to an area of the gloss control plane data to which the surface effect is designated.

8. The image formation system device according to claim 7, wherein, the printing control device further comprising:
- a third storage unit configured to store, per combination of the color of the colored plane data and the surface effect, second information that indicates a relationship between a density value of the colored plane data of the color and a gloss level which results from a printing result of the combination;
- a fourth storage unit configured to store a parameter of the second gradation correction per combination of the color of the colored plane data and the surface effect; and
- a second change unit configured to change the parameter of the second gradation correction such that the relationship indicated by the second information is obtained, using a measurement result of a gloss level of a patch image, image data of which used to set a parameter of the first gradation correction per combination of the color of the colored plane data and the surface effect, formed on the recording medium and the second information per combination of the color of the colored plane data and the surface effect.

9. An image formation system comprising:

a printing device configured to perform printing based on image data that comprises colored plane data for adhering colored toner and clear toner plane data for adhering colorless clear toner;

a printing control device configured to control the printing device; and a server device configured to be connected with the printing control device through a network, wherein the printing control device comprising:

a generation unit configured to generate the clear toner plane data based on a type of a surface effect that is applied to a recording medium and gloss control plane data for specifying an area in the recording medium to which the surface effect is applied;

a first gradation correction unit configured to perform first gradation correction that varies per combination of a color of the colored plane data and the surface effect, with respect to each of a plurality of items of colored plane data that configures the colored plane data; and an output unit configured to output the image data generated based on the clear toner plane data generated by the generation unit and the colored plane data to which the first gradation correction is applied.

* * * * *